US012804387B2

(12) United States Patent
Luo et al.

(10) Patent No.: US 12,804,387 B2
(45) Date of Patent: Nov. 17, 2026

(54) WIRELESS COMMUNICATION METHOD AND WIRELESS COMMUNICATIONS DEVICE

(71) Applicant: GUANGDONG OPPO MOBILE TELECOMMUNICATIONS CORP., LTD., Dongguan (CN)

(72) Inventors: Chaoming Luo, Dongguan (CN); Hui Zhu, Dongguan (CN); Xuan Zhang, Dongguan (CN); Huimin Yang, Dongguan (CN); Lei Huang, Singapore (SG)

(73) Assignee: GUANGDONG OPPO MOBILE TELECOMMUNICATIONS CORP., LTD., Dongguan (CN)

( * ) Notice: Subject to any disclaimer, the term of this patent is extended or adjusted under 35 U.S.C. 154(b) by 85 days.

(21) Appl. No.: 18/965,418

(22) Filed: Dec. 2, 2024

(65) Prior Publication Data

US 2025/0097695 A1 Mar. 20, 2025

Related U.S. Application Data

(63) Continuation of application No. PCT/CN2022/096969, filed on Jun. 2, 2022.

(51) Int. Cl.
*H04W 12/02* (2009.01)
*H04W 48/16* (2009.01)

(52) U.S. Cl.
CPC ........... *H04W 12/02* (2013.01); *H04W 48/16* (2013.01)

(58) Field of Classification Search
CPC ...... H04W 12/02; H04W 48/14; H04W 48/16
See application file for complete search history.

(56) References Cited

U.S. PATENT DOCUMENTS

| | | | | |
|---|---|---|---|---|
| 10,292,047 | B1 * | 5/2019 | Jiang | H04W 8/26 |
| 2012/0033568 | A1 * | 2/2012 | Park | H04W 76/14 370/252 |
| 2012/0213211 | A1 * | 8/2012 | Remaker | H04L 63/0421 370/338 |
| 2012/0257753 | A1 * | 10/2012 | Ochikubo | H04W 12/02 380/270 |
| 2013/0301441 | A1 * | 11/2013 | Russell | H04L 1/1621 370/252 |

(Continued)

FOREIGN PATENT DOCUMENTS

| | | | | |
|---|---|---|---|---|
| CN | 1838671 A | | 9/2006 | |
| CN | 107786973 A | * | 3/2018 | H04W 12/02 |

(Continued)

OTHER PUBLICATIONS

Han, Xiu-Ping et al. CN 107786973 A (machine translation), published Mar. 9, 2018. (Year: 2018).*

(Continued)

*Primary Examiner* — Michael Simitoski
(74) *Attorney, Agent, or Firm* — Quarles & Brady LLP

(57) ABSTRACT

Embodiments of this application provide a wireless communication method and a wireless communications device. The method includes: autonomously updating, by an access point AP, a service set identifier SSID and a basic service set identifier BSSID of the AP. In addition, a method for protecting a PNL of a STA is provided.

16 Claims, 14 Drawing Sheets

(56) References Cited

U.S. PATENT DOCUMENTS

| | | | | |
|---|---|---|---|---|
| 2014/0010223 | A1* | 1/2014 | Wang | H04W 48/12 370/338 |
| 2014/0337950 | A1* | 11/2014 | Yang | H04L 9/3297 726/7 |
| 2015/0195710 | A1* | 7/2015 | Bar-Niv | H04W 12/12 726/23 |
| 2018/0310133 | A1* | 10/2018 | Ramasamy | G01S 19/48 |
| 2019/0045451 | A1* | 2/2019 | Huang | H04L 5/0053 |
| 2022/0182818 | A1* | 6/2022 | Williams | H04W 12/61 |
| 2023/0084715 | A1* | 3/2023 | Lumbatis | H04W 12/75 726/26 |
| 2023/0098093 | A1* | 3/2023 | Hawkes | H04W 12/06 370/338 |
| 2023/0147562 | A1* | 5/2023 | Kneckt | H04W 12/06 380/270 |
| 2023/0262465 | A1* | 8/2023 | Ficara | H04W 12/122 455/411 |
| 2023/0319943 | A1* | 10/2023 | Barton | H04W 48/08 370/338 |
| 2023/0324491 | A1* | 10/2023 | Roberts | G01S 5/02 342/386 |
| 2024/0031330 | A1* | 1/2024 | Henry | H04L 61/5053 |

FOREIGN PATENT DOCUMENTS

| | | | | | |
|---|---|---|---|---|---|
| CN | 107872791 | A | | 4/2018 | |
| CN | 113973398 | A | | 1/2022 | |
| JP | 2011040918 | A | * | 2/2011 | |
| JP | 2012105213 | A | | 5/2012 | |
| KR | 20130125296 | A | * | 11/2013 | H04W 48/16 |
| WO | WO-2017026930 | A1 | * | 2/2017 | H04L 9/0825 |

OTHER PUBLICATIONS

Kazuko, Jumonji. JP 2011040918 A (machine translation), published Feb. 24, 2011. (Year: 2011).*

Lee Jae Seung et al. KR 20130125296 A (machine translation), published Nov. 18, 2013. (Year: 2013).*

Lindqvist, Janne, et al. "Privacy-preserving 802.11 access-point discovery." Proceedings of the second ACM conference on Wireless network security. 2009. (Year: 2009).*

Masoud, Mohammad Z., Yousef Jaradat, and Mohammad Alia. "IEEE802. 11 Access Pointas Service Set Identifier (SSID) for Localization and Tracking." Computers, Materials & Continua 71.3 (2022). (Year: 2022).*

Vanhoef, Mathy, et al. "Why MAC address randomization is not enough: An analysis of Wi-Fi network discovery mechanisms." Proceedings of the 11th ACM on Asia conference on computer and communications security. 2016. (Year: 2016).*

PCT International Search Report for International Application No. PCT/CN2022/096969 dated Jan. 28, 2023.

PCT Written opinion for International Application No. PCT/CN2022/096969 dated Jan. 28, 2023.

"TGbi Proposed Issues" of Stephen McCann et al., IEEE802.11-21/0641r7 dated Feb. 11, 2022.

"Device Fingerprinting Leading to PCI Capture" of Kurt Lumbatis et al., IEEE 802.11-21/1183r4 dated Aug. 12, 2021.

"TGbi Requirements Tracking" of Carol Ansley, IEEE P802.11 Wireless LANs IEEE 802.11-21/1848r6 dated Mar. 14, 2022.

* cited by examiner

| Name of an access point / SSID | $AP_1$ | $AP_2$ | ... | $AP_m$ |
|---|---|---|---|---|
| Initial SSID | $AP_1$-$SSID_1$ | $AP_2$-$SSID_1$ | ... | $AP_m$-$SSID_1$ |
| Currently used SSID | $AP_1$-$SSID_2$ | $AP_2$-$SSID_2$ | ... | $AP_m$-$SSID_2$ |
| SSID to be used next time | $AP_1$-$SSID_3$ | $AP_2$-$SSID_3$ | ... | $AP_m$-$SSID_3$ |
| ... | ... | ... | ... | ... |
| SSID to be used in the $n^{th}$ time | $AP_1$-$SSID_n$ | $AP_2$-$SSID_n$ | ... | $AP_m$-$SSID_n$ |

| | | | | |
|---|---|---|---|---|
| $AP_1$-$SSID_1$ | $AP_2$-$SSID_1$ | $AP_3$-$SSID_1$ | ... | $AP_i$-$SSID_1$ |
| $AP_1$-$SSID_{now}$ | $AP_2$-$SSID_{now}$ | $AP_3$-$SSID_{now}$ | ... | $AP_i$-$SSID_{now}$ |

| Byte | 1 | 1 | 0-32 | 1 |
|---|---|---|---|---|
| | Element ID 0 | Length | SSID | Random number |

WIRELESS COMMUNICATION METHOD AND WIRELESS COMMUNICATIONS DEVICE

CROSS-REFERENCE TO RELATED APPLICATIONS

This application is a continuation of International Application No. PCT/CN2022/096969, filed on Jun. 2, 2022, the disclosure of which is hereby incorporated by reference in its entirety.

TECHNICAL FIELD

Embodiments of this application relate to the field of communications, and more specifically, to a wireless communication method and a wireless communications device.

BACKGROUND

In a wireless local area network, an attacker may identify and track a user corresponding to an access point (Access Point, AP) by using a service set identifier (Service Set Identifier, SSID) and a basic service set identifier (Basic Service Set Identifier, BSSID) of the AP, or an attacker may identify and track a user corresponding to a station (Station, STA) by using a preferred network list (PNL) of the STA.

SUMMARY

Embodiments of this application provide a wireless communication method and a wireless communications device. An AP may autonomously update an SSID and a BSSID of the AP, to prevent an attacker from identifying and tracking a user corresponding to the AP by using the SSID or the BSSID. Alternatively, a PNL of a STA includes at least one SSID selected from an obfuscation library, to prevent an attacker from identifying and tracking a user corresponding to the STA by using the PNL of the STA.

According to a first aspect, a wireless communication method is provided, where the method includes:

- autonomously updating, by an AP, an SSID and a BSSID of the AP;
- where the AP locally maintains a first list and a second list, the first list includes M SSIDs, the second list includes N BSSIDs, the M SSIDs include a current SSID and at least one previously used SSID of the AP, the N BSSIDs include a current BSSID and at least one previously used BSSID of the AP, and both M and N are positive integers.

According to a second aspect, a wireless communication method is provided, where the method includes:

- transmitting, by a STA, a probe request frame to an AP,
- where an SSID in the probe request frame belongs to a PNL, and the PNL includes at least one SSID selected from an obfuscation library and an SSID of one or more APs that were accessed by the STA, or the PNL includes at least one SSID selected from an obfuscation library, an initial SSID of at least one AP, and an SSID of one or more APs that were accessed by the STA, where an SSID included in the obfuscation library does not involve privacy information of a user corresponding to the STA.

According to a third aspect, an AP is provided and is configured to execute the method in the first aspect.

Specifically, the AP includes a functional module configured to execute the method in the first aspect.

According to a fourth aspect, a STA is provided and is configured to execute the method in the second aspect.

Specifically, the STA includes a functional module configured to execute the method in the second aspect.

According to a fifth aspect, an AP is provided, including a processor and a memory. The memory is configured to store a computer program, and the processor is configured to invoke and run the computer program stored in the memory, to cause the AP to execute the method in the first aspect.

According to a sixth aspect, a STA is provided, including a processor and a memory. The memory is configured to store a computer program, and the processor is configured to invoke and run the computer program stored in the memory, to cause the STA to execute the method in the second aspect.

According to a seventh aspect, an apparatus is provided and is configured to implement the method in any one of the first aspect and the second aspect.

Specifically, the apparatus includes a processor, configured to invoke a computer program from a memory and run the computer program, to cause a device in which the apparatus is installed to execute the method in any one of the first aspect and the second aspect.

According to an eighth aspect, a computer-readable storage medium is provided and is configured to store a computer program. The computer program causes a computer to execute the method in any one of the first aspect and the second aspect.

According to a ninth aspect, a computer program product is provided, including computer program instructions. The computer program instructions cause a computer to execute the method in any one of the first aspect and the second aspect.

According to a tenth aspect, a computer program is provided. When being run on a computer, the computer program causes the computer to execute the method in any one of the first aspect and the second aspect.

By using the technical solution according to the first aspect, an AP autonomously updates an SSID and a BSSID of the AP, thereby preventing an attacker from identifying and tracking a user corresponding to the AP by using the SSID or the BSSID. Specifically, the AP locally maintains a first list. The first list includes a current SSID and at least one previously used SSID of the AP. As long as an SSID in a received probe request frame is included in the first list, the AP responds, thereby ensuring that a STA that connected to the AP in the past but does not know the SSID currently used by the AP can still detect the AP by using a previously used SSID. Specifically, the AP locally maintains a second list, where the second list includes a current BSSID and at least one previously used BSSID of the AP. Therefore, when the AP changes the BSSID of the AP, a message that carries the previously used BSSID and that is transmitted by a STA can be identified and received by the AP since a BSSID used in a previous period of time is saved, thereby ensuring that communication of a STA that is being associated or has been associated with the AP is not interrupted when the AP updates the BSSID of the AP.

DESCRIPTION OF EMBODIMENTS

The following describes the technical solutions in embodiments of this application with reference to the accompanying drawings in embodiments of this application. Apparently, the described embodiments are some rather than all of embodiments of this application. For embodiments of this application, all other embodiments obtained by a person of ordinary skill in the art without creative efforts fall within the protection scope of this application.

The technical solutions in embodiments of this application may be applied to various communications systems, for example, a wireless local area network (WLAN), wireless fidelity (WiFi), or another communications system.

Figure 1:
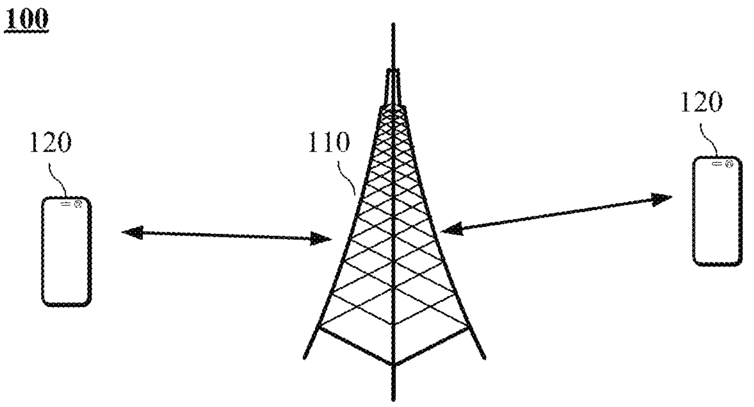
FIG. 1 is a schematic diagram of an architecture of a communications system to which embodiments of this application are applied.

For example, a communications system 100 to which embodiments of this application are applied is shown in FIG. 1. The communications system 100 may include an access point (AP) 110 and stations (STA) 120 that access a network by using the AP 110.

In some scenarios, an AP may also be referred to as an AP STA. That is, in a sense, the AP functions as a STA. In some scenarios, a STA is also referred to as a non-AP STA.

In some embodiments, the STA may include an AP STA and a non-AP STA.

Communication in the communications system 100 may be communication between an AP and a STA, or communication between STAs, or communication between a STA and a peer STA (peer STA). The peer STA may refer to a device that performs peer-to-peer communication with the STA, for example, the peer STA may be an AP, or may be a non-AP STA.

An AP is equivalent to a bridge that connects a wired network and a wireless network. The AP is mainly configured to connect clients in a wireless network together and then connect the wireless network to an ethernet. An AP device may be a terminal device (for example, a mobile phone) or a network device (for example, a router) including a Wi-Fi chip.

It should be understood that a role of a STA in a communications system is not fixed. For example, in some scenarios, when a mobile phone is connected to a route, the mobile phone is a STA; when the mobile phone serves as a hotspot of another mobile phone, the mobile phone serves as an AP.

The AP and the STA may be devices applied in vehicle-to-everything; internet of things nodes, sensors, and the like in internet of things (IoT); intelligent cameras, intelligent remote controls, intelligent water meters, intelligent electricity meters, and the like in smart home; and sensors and the like in smart city.

In some embodiments, the STA may support an 802.11be standard. The STA may also support a plurality of current and future WLAN standards of the 802.11 family, such as 802.11ax, 802.11ac, 802.11n, 802.11g, 802.11b, and 802.11a.

In some embodiments, the AP may be a device that supports the 802.11be standard. The AP may alternatively be a device that supports a plurality of current and future WLAN standards of the 802.11 family, such as 802.11ax, 802.11ac, 802.11n, 802.11g, 802.11b, and 802.11a.

In some embodiments, the AP 110 and/or the STA 120 may be deployed on land, including being indoors or outdoors, handheld, wearable, or vehicle-mounted, or may be deployed on water (for example, on a ship), or may be deployed in the air (for example, on an airplane, an air balloon, or a satellite).

In embodiments of this application, the STA 120 may be a device that supports a WLAN or Wi-Fi technology, such as a mobile phone (Mobile Phone), a pad (Pad), a computer with a wireless transceiver function, a virtual reality (Virtual Reality, VR) device, an augmented reality (Augmented Reality, AR) device, a wireless device in industrial control (industrial control), a set-top box, a wireless device in self-driving (self driving), a vehicle-mounted communications device, a wireless device in remote medical (remote medical), a wireless device in smart grid (smart grid), a wireless device in transportation safety (transportation safety), a wireless device in smart city (smart city), a wireless device in smart home (smart home), a wireless communications chip, an application-specific integrated circuit (ASIC), a system-on-chip (SoC), or the like.

As an example instead of a limitation, in embodiments of this application, the STA 120 may alternatively be a wearable device. The wearable device may also be referred to as an intelligent wearable device, and is a general term for wearable devices such as glasses, gloves, watches, clothes, and shoes that are intelligently designed and developed based on daily wearing by using a wearable technology. The wearable device is a portable device that can be directly worn or integrated into clothes or accessories of a user. In addition to being a hardware device, the wearable device can also realize various functions through software support, data interaction, and cloud interaction. In a broad sense, wearable smart devices may include a full-featured and large-sized device that can provide full or partial functions without relying on a smart phone, for example, a smart watch or smart glasses, and devices that focus on only a specific type of application function and need to cooperate with another device such as a smart phone for use, for example, various smart bracelets and smart jewelries for physical sign monitoring.

Frequency bands supported in a WLAN technology may include but are not limited to a low frequency band (a frequency band lower than 1 GHz, 2.4 GHz, 5 GHz, or 6 GHz) and a high frequency band (45 GHz or 60 GHz).

FIG. 1 exemplarily shows one AP and two STAs. In some embodiments, the communications system 100 may include a plurality of APs and another quantity of STAs. This is not limited in embodiments of this application.

It should be understood that in embodiments of this application, a device having a communication function in a network or a system may be referred to as a communications device. The communications system 100 shown in FIG. 1 is used as an example. A communications device may include the AP 110 and the STAs 120 that have a communication function. The AP 110 and the STAs 120 may be specific devices described above. Details are not described herein again. The communications device may further include another device in the communications system 100, such as a network controller, a gateway, or another network entity, which is not limited in embodiments of this application.

It should be understood that the terms "system" and "network" may often be used interchangeably herein. In this specification, the term "and/or" is merely an association that describes associated objects, and represents that there may be three relationships. For example, A and/or B may represent three cases: only A exists, both A and B exist, and only B exists. In addition, the character "/" in this specification generally indicates an "or" relationship between the associated objects.

It should be understood that, the "indication" mentioned in embodiments of this application may be a direct indication or an indirect indication, or indicate an association. For example, if A indicates B, it may mean that A directly indicates B, for example, B may be obtained from A. Alternatively, it may mean that A indicates B indirectly, for example, A indicates C, and B may be obtained from C. Alternatively, it may mean that there is an association between A and B.

The terms used in implementations of this application are only used to illustrate specific embodiments of this application, but are not intended to limit this application. The terms "first", "second", "third", "fourth", and the like in the specification, claims, and accompanying drawings of this application are used for distinguishing different objects from each other, rather than defining a specific order. In addition, the terms "include" and "have" and any variations thereof are intended to cover a non-exclusive inclusion.

In the descriptions of embodiments of this application, the term "corresponding" may mean that there is a direct or indirect correspondence between two elements, or that there is an association between two elements, or that there is a relationship of "indicating" and "being indicated", "configuring" and "being configured", or the like.

In embodiments of this application, "pre-defining" or "pre-configuring" may be implemented by pre-storing corresponding code or a corresponding table in a device (for example, including a STA and a network device) or in other manners that may be used for indicating related information. A specific implementation thereof is not limited in this application. For example, pre-defining may refer to being defined in a protocol.

In embodiments of this application, the "protocol" may refer to a standard protocol in the communication field, which may include, for example, a WiFi protocol, and a related protocol applied to a future WiFi communications system. This is not limited in this application.

To facilitate understanding of the technical solutions in embodiments of this application, the following describes the technical solutions in this application in detail by using specific embodiments. The following related technologies, as optional solutions, may be randomly combined with the technical solutions of embodiments of this application, all of which fall within the protection scope of embodiments of this application. Embodiments of this application include at least a part of the following content.

A wireless device supports multi-band communication, for example, simultaneous communication on frequency bands such as 2.4 GHz, 5 GHz, 6 GHz, 45 GHz, and 60 GHz, or simultaneous communication on different channels of a same frequency band (or different frequency bands), so as to improve communication throughput and/or reliability between devices. This type of device is generally referred to as a multi-band device, or is referred to as a multi-link device (MLLD), and sometimes is also referred to as a multi-link entity or a multi-band entity. The multi-link device may be an access point device, or may be a station device. If the multi-link device is an access point device, the multi-link device includes one or more APs; or if the multi-link device is a station device, the multi-link device includes one or more non-AP STAs.

To facilitate understanding of the technical solutions in embodiments of this application, the following describes related technical solutions and problems to be solved of this application.

Specifically, for a problem of privacy of a BSSID and an SSID of a mobile AP, for example, the mobile AP may change the BSSID of the mobile AP when no user is associated with the mobile AP. If a user is associated with the mobile AP, the mobile AP needs to ensure that the BSSID of the mobile AP is changed without interrupting communication of the associated user. Therefore, a value of the BSSID of the mobile AP needs to be randomized, but a problem of privacy leakage caused by a static SSID for a user corresponding to the mobile AP is not considered.

Specifically, for a problem of privacy of an SSID of a STA, for example, an attacker may learn of a preference and a motion trajectory of a user corresponding to the STA by listening to a probe of a specified SSID (that is, using a probe request frame that carries the specified SSID) transmitted by the STA. To reduce transmission of probes of the specified SSID, it is recommended that the STA uses a probe of the specified SSID only when approaching a "known" network. A disadvantage is that before a probe of the specified SSID is executed, only a passive scan or a probe of a wildcard (wildcard) SSID (that is, a value of the SSID is an empty character string with a length of 0) can be executed. These two probe modes consume more connection time, compared with a probe of the specified SSID. To reduce transmission of probes of the specified SSID, it is further recommended that the STA device does not execute a probe of the specified SSID, but only execute a probe of a wildcard SSID. A disadvantage is that a current function is damaged or association time is increased, and a hidden AP can only be discovered by using a probe of the specified SSID. The probe of the specified SSID is also referred to as a directional probe or a directional scan.

To resolve the foregoing problems, this application proposes a solution for protecting user privacy. On the one hand, in a wireless local area network, an AP (especially a mobile AP (such as a mobile phone hotspot or a vehicle-mounted access point)) autonomously updates both an SSID and a BSSID of the AP, thereby preventing an attacker from identifying and tracking a user corresponding to the AP by using an SSID or a BSSID. On the other hand, an obfuscation SSID is added to a PNL of a STA, thereby preventing an attacker from identifying and tracking a user corresponding to the STA by using content of an SSID and a sequence of different SSIDs in probes of a specified SSID of the STA.

Specifically, when an AP (especially a mobile AP (such as a mobile phone hotspot or a vehicle-mounted access point)) updates both an SSID and a BSSID of the AP, a STA that previously connected to the AP but does not know a current SSID of the AP can still detect the AP by using an old SSID since the AP maintains a list of SSIDs used currently or in the past. Because the AP maintains the list of the BSSIDs used currently or used in the past, a message that is transmitted by a STA associated with the AP and of which a receiver address is a previously used BSSID can still be received by the AP, thereby ensuring that communication of the associated STA is not interrupted when the AP changes the BSSID of the AP. After updating both the SSID and the BSSID of the AP, the AP notifies the associated STA of a new BSSID and a new SSID of the AP by using a management frame. After receiving the management frame, the STA starts to communicate by using a new over the air medium access control (OTA MAC) address and the new BSSID of the AP within a time indicated by the management frame, thereby preventing an attacker from associating the old BSSID of the AP with the new BSSID of the AP by using an OTA MAC address of the STA.

Specifically, the STA locally maintains an SSID obfuscation library, where an SSID in the obfuscation library has features such as involving no user privacy and containing a specific semantic meaning. An SSID in the SSID obfuscation library may be collected from surrounding probe request frames, or an SSID in the SSID obfuscation library may be randomly generated, or an SSID in the SSID obfuscation library may be generated by using a library configured by an upper-layer application program. When the STA performs a probe of a specified SSID, some probe request frames transmitted by the STA include an SSID of an AP to which the STA was connected, and some other probe request frames transmitted by the STA include an SSID selected from the SSID obfuscation library. In this way, an attacker cannot determine, from the probe request frames SSIDs belonging to the AP to which the STA was connected, thereby preventing the attacker from identifying and tracking a user corresponding to the STA by using content of an SSID and a sequence of different SSIDs in the probes of the specified SSID of the STA.

The following describes the technical solutions in this application in detail by using specific embodiments.

Figure 2:
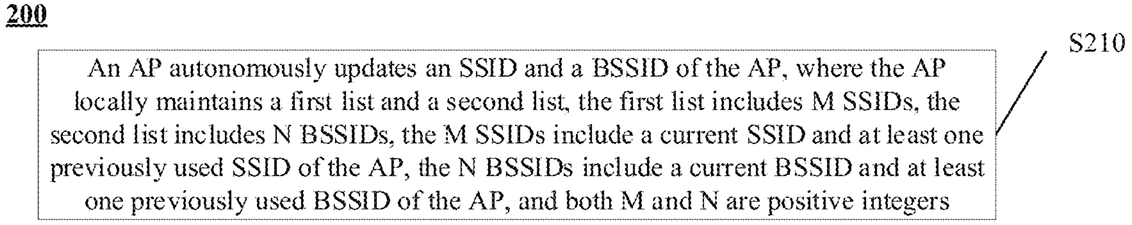
FIG. 2 is a schematic flowchart of a wireless communication method according to an embodiment of this application.

FIG. 2 is a schematic flowchart of a wireless communication method 200 according to an embodiment of this application. As shown in FIG. 2, the wireless communication method 200 may include step S210.

In step S210, an AP autonomously updates an SSID and a BSSID of the AP. The AP locally maintains a first list and a second list, the first list includes M SSIDs, the second list includes N BSSIDs, the M SSIDs include a current SSID and at least one previously used SSID of the AP, the N BSSIDs include a current BSSID and at least one previously used BSSID of the AP, and both M and N are positive integers.

In this embodiment of this application, a solution for protecting privacy of the SSID of the AP is implemented in the following manner: the AP stores, by maintaining the first list, SSIDs used currently or used previously. As long as an SSID in a received probe request frame is in the first list, the AP responds, thereby ensuring that a STA that is previously connected to the AP but does not know the SSID currently used by the AP can still detect the AP by using an old SSID. A solution for protecting privacy of the BSSID of the AP is implemented in the following manner: the AP stores, by maintaining the second list, BSSIDs used currently or previously. Therefore, when the AP changes the BSSID of the AP, a message that carries the old BSSID and that is transmitted by a STA can be identified and received by the AP because a BSSID used in a previous period of time is saved, thereby ensuring that communication of a STA that is being associated or has been associated with the AP is not interrupted when the AP updates the BSSID of the AP. Specifically, after autonomously updating both the SSID and the BSSID of the AP, the AP transmits an encrypted new SSID and an encrypted new BSSID to the STA associated with the AP by using a management frame, and sets a time in the management frame, to indicate that when receiving the management frame, the STA that has been associated with the AP starts to communicate by using a new OTA MAC address and the new BSSID within a time indicated by the management frame. The STA should detect the AP by using the new SSID in a subsequent probe of a specified SSID, and the OTA MAC address of the STA is synchronized with the BSSID of the AP, thereby preventing an attacker from associating the old BSSID of the AP with the new BSSID of the AP by using the OTA MAC address of the STA.

In this embodiment of this application, the AP may be a mobile AP (for example, a mobile phone hotspot or a vehicle-mounted access point).

In some embodiments, the AP in this embodiment supports an SSID privacy enhancement function, or the AP in this embodiment is a mobile AP that implements the SSID privacy enhancement function, or the AP in this embodiment is an AP that supports a variable SSID, or the AP in this embodiment is a privacy enhanced AP.

In this embodiment of this application, a "field" may also be referred to as a "field (field)" or a "subfield (subfield)". One field may occupy one or more bytes or octets, or one field may occupy one or more bits (bit).

In this embodiment of this application, a "previously used SSID" may also be referred to as an "SSID used in the past", and a "previously used BSSID" may also be referred to as a "BSSID used in the past".

In some embodiments, the first list may be a one-dimensional list. Certainly, the first list may also be a list of other dimensions, which is not limited in this application. Optionally, the first list may also be referred to as an SSID list or a similar name, which is not limited in this application.

In some embodiments, the second list may be a one-dimensional list. Certainly, the second list may also be a list of other dimensions, which is not limited in this application. Optionally, the second list may also be referred to as a BSSID list or a similar name, which is not limited in this application.

In some embodiments, the at least one previously used SSID includes at least an initial SSID, and/or, the at least one previously used BSSID includes at least an initial BSSID.

Specifically, for example, the current SSID in the first list is the initial SSID at initial time, and/or, the current BSSID in the second list is the initial BSSID at initial time.

In some embodiments, the initial SSID may be an SSID set by a user or a default SSID of the AP.

The following describes in detail the technical solution of the wireless communication method 200 in this application by using specific embodiments, that is, Embodiment 1 to Embodiment 3.

Embodiment 1: A New SSID is Derived from an Old SSID

In Embodiment 1, a current SSID in a first list is generated based on a previous SSID of the current SSID and first secret information at non-initial time. The first secret information is common secret information between an AP and a STA that has accessed the AP.

That is, in Embodiment 1, at initial time, the current SSID is an initial SSID; and at non-initial time, the AP may generate the current SSID based on the previous SSID of the current SSID and the first secret information.

In some implementations, the first secret information may be a network key or a key derived from a network key.

Figure 3:
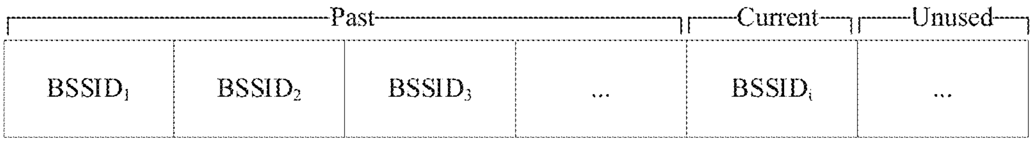
FIG. 3 is a schematic diagram of a second list according to an embodiment of this application.

In Embodiment 1, a second list maintained by the AP may be shown in FIG. 3. The second list stores BSSIDs used currently or used in the past. An initial $BSSID_1$ is stored at a header of the list, a currently used BSSID is stored at a tail of the list, and there is only the $BSSID_1$ in the list at initial time.

In Embodiment 1, the first list maintained by the AP may be a one-dimensional list with a length of 2, the first element in the first list is the initial SSID of the AP, and the second element is the current SSID of the AP. Specifically, for example, the first list may be shown in FIG. 4, where $SSID_1$ is the initial SSID of the AP (an SSID set by a user or a default SSID of the AP), and $SSID_{now}$ is the SSID currently used by the AP. At initial time, the two elements in the first list are both $SSID_1$, that is, $SSID_{now}=SSID_1$ at initial time.

In Embodiment 1, the STA (that is, the STA that has accessed the AP) locally maintains S SSIDs to be used by the AP in future.

The S SSIDs are generated based on the current SSID and the first secret information, and S is a positive integer.

For example, S=50, or S=80, or S=100. Certainly, S may also be another value, which is not limited in this embodiment.

Specifically, the first SSID in the S SSIDs is generated based on the current SSID and the first secret information, and the $(i+1)^{th}$ SSID in the S SSIDs is generated based on the $i^{th}$ SSID and the first secret information, where i is a positive integer, and $1 \le i \le S-1$.

Figures 4, 5:
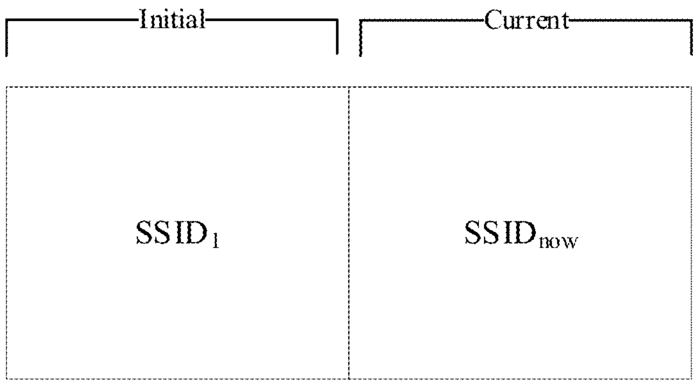
FIG. 4 is a schematic diagram of a first list according to an embodiment of this application.
FIG. 5 is a schematic diagram of a two-dimensional SSID list (a fourth list) maintained by a STA according to an embodiment of this application.

Specifically, for example, the STA maintains a two-dimensional SSID list shown in FIG. 5. The two-dimensional SSID list includes SSIDs of m APs (or referred to as mobile APs or APs that support a variable SSID) that support the SSID privacy enhancement function. In FIG. 5, S=n−2. Specifically, a length of the two-dimensional SSID list (that is, a value of m in FIG. 5) is a quantity of APs that support the SSID privacy enhancement function and that are accessed by the STA.

In some implementations of Embodiment 1, when the AP updates the current SSID and a current BSSID, the AP generates a new SSID (that is, a newly generated current SSID) according to the current SSID and the first secret information, and the AP generates a new BSSID (that is, a newly generated current BSSID).

In some implementations of Embodiment 1, the AP generates a new $SSID_{now}$ according to a specific rule. For example, a new $SSID_{now}$ may be generated in the following manner: concatenating a value of $SSID_{now}$ with common secret information (for example, using a network key or a key derived from a network key) between the AP and the STA that has accessed the AP, performing hashing on a concatenating result, and using a result of the hashing as a new $SSID_{now}$ of the AP (as long as a length of the new $SSID_{now}$ is greater than 0 and less than 32 bytes), or using a part of a result of the hashing as a new $SSID_{now}$ of the AP (as long as a length of the new $SSID_{now}$ is greater than 0 and less than 32 bytes). For another example, a new $SSID_{now}$ may be generated in the following manner: using an HKDF algorithm or a PBKDF algorithm, using common secret information between the AP and the STA that has accessed the AP (for example, using a network key or a key derived from a network key) and a value of $SSID_{now}$ as an input, and using an output of the algorithm as a new $SSID_{now}$ of the AP. Optionally, the output of the HKDF algorithm or the PBKDF algorithm may be Base64 encoded into a visible character string, serving as a new $SSID_{now}$ of the AP. The common secret information between the AP and the STA that has accessed the AP ensures that a STA that fails to access the AP cannot know a future $SSID_{now}$ of the AP.

In some implementations of Embodiment 1, a STA that has accessed an AP (for example, an AP that supports an SSID privacy enhancement function) locally generates and stores, according to a same rule as the AP, S SSIDs (for example, S may be 100) to be used by the AP in future, for example, a two-dimensional SSID list shown in FIG. 5. Specifically, a process of generating $AP_i$-$SSID_j$ includes: performing calculation on common secret information (for example, using a network key or a key derived from a network key) between the AP and the STA that has accessed the AP and $AP_i$-$SSID_{j-1}$ according to the foregoing rule, and using a result of the calculation as $AP_i$-$SSID_j$ of the AP. After the STA receives a beacon frame or a probe response frame transmitted by the AP that supports the SSID privacy enhancement function, the STA compares an SSID in the beacon frame or the probe response frame with values of all SSIDs in a two-dimensional SSID list (as shown in FIG. 5) of the AP locally maintained by the STA. In a case in which the SSID in the beacon frame or the probe response frame is included in the two-dimensional SSID list, the STA associates the SSID in the two-dimensional SSID list with the AP. If the SSID in the beacon frame or the probe response frame is an SSID (denoted as $AP_i$-$SSID_j$) to be used by an AP in future in the two-dimensional SSID list, the STA converts the SSID of the AP into an initial SSID corresponding to the AP in a displayed available network list, and updates values of SSIDs that are currently used or to be used in future corresponding to the AP and that are locally stored by the STA. A process of the updating includes: deleting SSIDs between $AP_i$-$SSID_2$ and $AP_i$-$SSID_{j-1}$ (including $AP_i$-$SSID_2$ to $AP_i$-$SSID_{j-1}$), and generating new SSIDs according to the foregoing manner of generating $AP_i$-$SSID_j$ until the two-dimensional SSID list is filled with S SSIDs to be used in future corresponding to the AP. If the SSID in the beacon frame or the probe response frame is not included in the two-dimensional SSID list, the STA ignores the beacon frame or the probe response frame. In this way, it is ensured that after an AP changes an SSID of the AP within a period during which a STA or some STAs that accessed the AP are not associated with the AP, the STA or STAs may associate, through a passive scan or a probe of a wildcard SSID, a mobile new SSID with an old SSID currently used by the AP and maintained by the STA or STAs.

In some implementations of Embodiment 1, the AP obtains the current SSID from the first list, and obtains the current BSSID from the second list; and the AP transmits a first frame to the STA, where an SSID element in the first frame carries the current SSID, and a transmitter address of the first frame is the current BSSID.

In some implementations of Embodiment 1, the first frame is a beacon frame or a probe response frame. Specifically, after updating the BSSID and the SSID of the AP, the AP always uses only the current SSID of the AP in a beacon frame or a probe response frame. In this way, an attacker cannot associate the old SSID of the AP with the new SSID of the AP, or the attacker cannot associate the old BSSID of the AP with the new BSSID of the AP.

In some implementations of Embodiment 1, a capability information (Capability information) element in the first frame includes a first bit, and a value of the first bit is used to indicate that the AP supports the SSID privacy enhancement function. Optionally, the first bit is a reserved bit in the capability information element of the first frame. The reserved bit in the capability information element of the first frame may be the $15^{th}$ bit and the $16^{th}$ bit.

Specifically, for example, the AP sets a value of the $15^{th}$ bit or the $16^{th}$ bit in the capability information element of the first frame to "1", which is used to indicate that the AP is an AP that supports the SSID privacy enhancement function. Alternatively, the AP sets the value of the $15^{th}$ bit or the $16^{th}$ bit of the capability information element of the first frame to "0", which is used to indicate that the AP is an AP that does not support the SSID privacy enhancement function, or indicate that the AP is an AP that supports the SSID privacy enhancement function.

In some implementations of Embodiment 1, the AP checks whether the AP is set to be a hidden AP. If the AP is set to be a hidden AP, the AP does not carry the current SSID of the AP in an SSID element of a beacon frame of the AP. If the AP is not set to be a hidden AP, the AP carries the current SSID of the AP in an SSID element of a beacon frame of the AP.

In some implementations of Embodiment 1, when the AP receives a probe request frame carrying a wildcard SSID (wildcard SSID) and the AP is not set to be a hidden AP, the AP responds with a probe response frame carrying the SSID and the BSSID currently used by the AP, to indicate the presence of the AP. When receiving a probe request frame whose SSID field value is the SSID currently used by the AP, the AP responds with a probe response frame carrying the SSID and the BSSID currently used by the AP, to indicate the presence of the AP.

In some implementations of Embodiment 1, in a case in which the first frame is a probe response frame and before the first frame is transmitted, the AP receives a first probe request frame transmitted by the STA, where the first frame is a response frame of the first probe request frame, and an SSID in the first probe request frame is the current SSID of the AP, or the SSID in the first probe request frame is an SSID used when the STA accessed the AP. The SSID used when the STA accessed the AP may be the initial SSID, or may be another SSID.

In some implementations of Embodiment 1, the SSID in the first probe request frame belongs to a PNL, and the PNL includes at least one SSID selected from an obfuscation library and an SSID of one or more APs that were accessed by the STA, or the PNL includes at least one SSID selected from an obfuscation library, an initial SSID of at least one AP, and an SSID of one or more APs that were accessed by the STA, where an SSID included in the obfuscation library does not involve privacy information of a user corresponding to the STA. Specifically, for example, an SSID included in the obfuscation library is an SSID that contains a specific semantic feature and does not involve the privacy information of the user corresponding to the STA.

Optionally, an SSID in the obfuscation library includes but is not limited to at least one of the following:

an SSID detected from surroundings, a randomly generated SSID, or an SSID in an SSID library provided by an upper-layer application program.

In some implementations, in a case in which the STA is not associated with the AP within a period of time, the STA uses at least one SSID selected from the obfuscation library, an initial SSID of at least one AP, and an SSID of one or more APs that were accessed by the STA as a PNL of the STA.

In some implementations, in a case in which the PNL includes at least one SSID selected from the obfuscation library and an SSID of one or more APs that were accessed by the STA, and the STA attempts to access the AP for a plurality of times but fails to access the AP, the STA again uses at least one SSID selected from the obfuscation library, an initial SSID of at least one AP, and an SSID of one or more APs that were accessed by the STA as a PNL of the STA.

Figure 6:
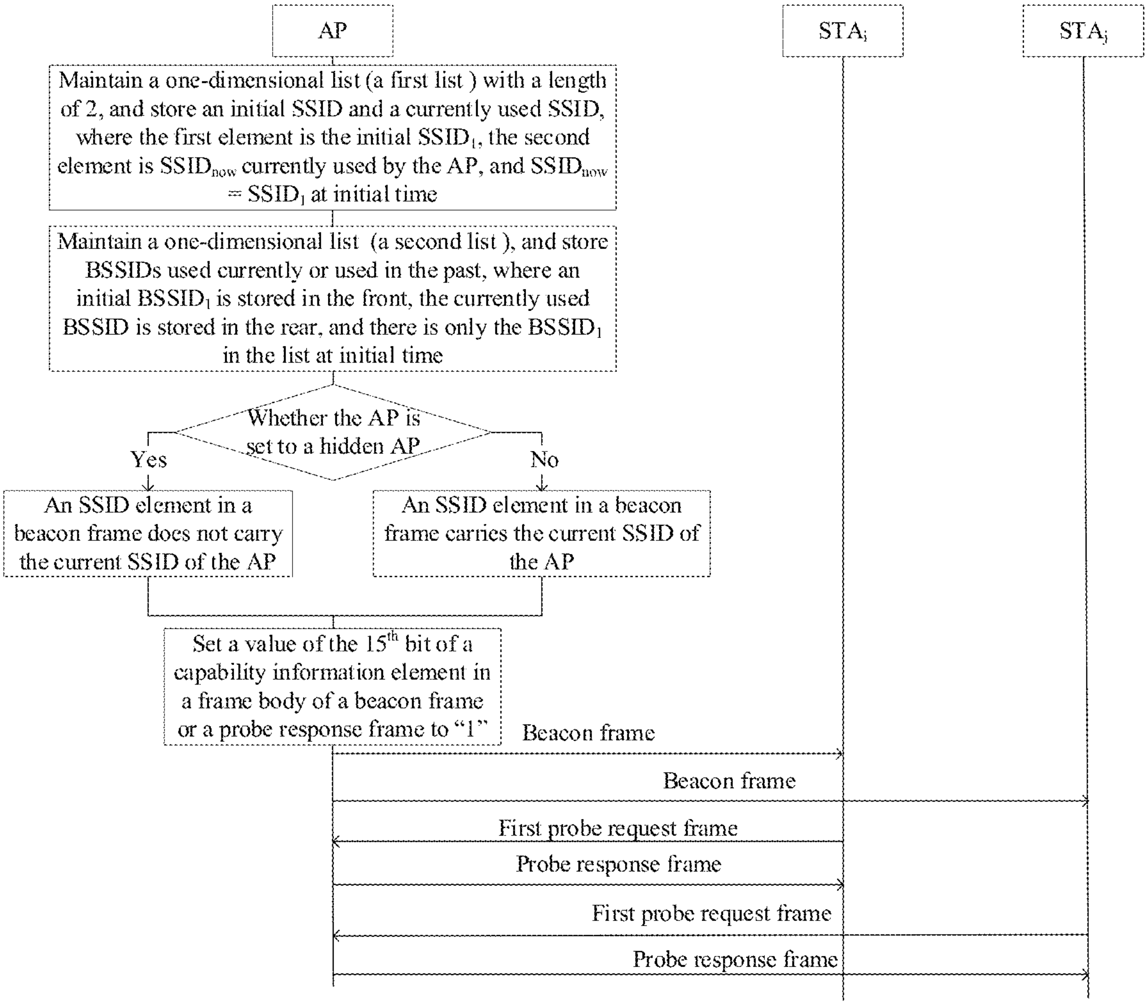
FIG. 6 is a schematic diagram of a list maintained by an AP according to an embodiment of this application.

Specifically, for example, as shown in FIG. 6, an AP locally maintains a first list and a second list, and the AP checks whether the AP is set to be a hidden AP. If the AP is set to be a hidden AP, an SSID element in a beacon frame of the AP does not carry a current SSID of the AP. If the AP is not set to be a hidden AP, an SSID element in a beacon frame of the AP carries the current SSID of the AP. The AP sets a value of the $15^{th}$ bit of a capability information element in a frame body of a beacon frame or a probe response frame to "1", which is used to indicate that the AP supports an SSID privacy enhancement function.

In some implementations of Embodiment 1, after the current SSID and a current BSSID are updated, the AP transmits a first management frame to a STA, where the first management frame is a protected management frame, and the first management frame includes a new SSID and a new BSSID. That is, the AP generates a new SSID according to the current SSID, and the AP generates a new BSSID. After the current SSID and the current BSSID are updated, the AP indicates the new SSID and the new BSSID to the STA by using the first management frame.

It should be noted that the first management frame is a protected management frame, that is, a frame body of the first management frame is an encrypted frame body.

Optionally, the first management frame is an action (Action) frame. Because a value range "30-125" of a category (Category) field in the action frame is reserved, any value (for example, "30") is selected from the range to indicate the first management frame in this embodiment.

In some implementations of Embodiment 1, the first management frame includes a control field, a new SSID field, a new BSSID field, and an update time field. The control field includes a new SSID present field, a new BSSID present field, and an update time present field, a value of the new SSID present field is used to indicate that the first management frame includes the new SSID field, a value of the new BSSID present field is used to indicate that the first management frame includes the new BSSID field, and a value of the update time present field is used to indicate that the first management frame includes the update time field. The new SSID field carries the new SSID, the new BSSID field carries the new BSSID, and the update time field carries first duration. The STA updates a currently used OTA MAC address within the first duration; and after the OTA MAC address is updated, the STA communicates with the AP by using an updated OTA MAC address and the new BSSID, and the STA discovers the AP by using the new SSID.

Specifically, the new SSID present (New SSID Present) field is used to indicate whether the first management frame includes the new SSID (New SSID) field. Specifically, for example, the new SSID present field occupies one bit (or may occupy another quantity of bits). If the new SSID present field is set to be 1, it indicates that the first management frame includes the new SSID field; or if the new SSID present field is set to be 0, it indicates that the first management frame does not include the new SSID field. Alternatively, if the new SSID present field is set to be 0, it indicates that the first management frame includes the new SSID field; or if the new SSID present field is set to be 1, it indicates that the first management frame does not include the new SSID field.

Specifically, the new BSSID present (New BSSID Present) field is used to indicate whether the first management frame includes the new BSSID (New BSSID) field. Specifically, for example, the new BSSID present field occupies one bit (or may occupy another quantity of bits). If the new BSSID present field is set to be 1, it indicates that the first management frame includes the new BSSID field; or if the new BSSID present field is set to be 0, it indicates that the first management frame does not include the new BSSID field. Alternatively, if the new BSSID present field is set to be 0, it indicates that the first management frame includes the new BSSID field; or if the new BSSID present field is set to be 1, it indicates that the first management frame does not include the new BSSID field.

Specifically, the update time present field is used to indicate whether the first management frame includes the update time field. Specifically, for example, the update time present field occupies one bit (or may occupy another quantity of bits). If the update time present field is set to be 1, it indicates that the first management frame includes the update time field; or if the update time present field is set to be 0, it indicates that the first management frame does not include the update time field. Alternatively, if the update time present field is set to be 0, it indicates that the first management frame includes the update time field; or if the update time present field is set to be 1, it indicates that the first management frame does not include the update time field.

Figure 7:
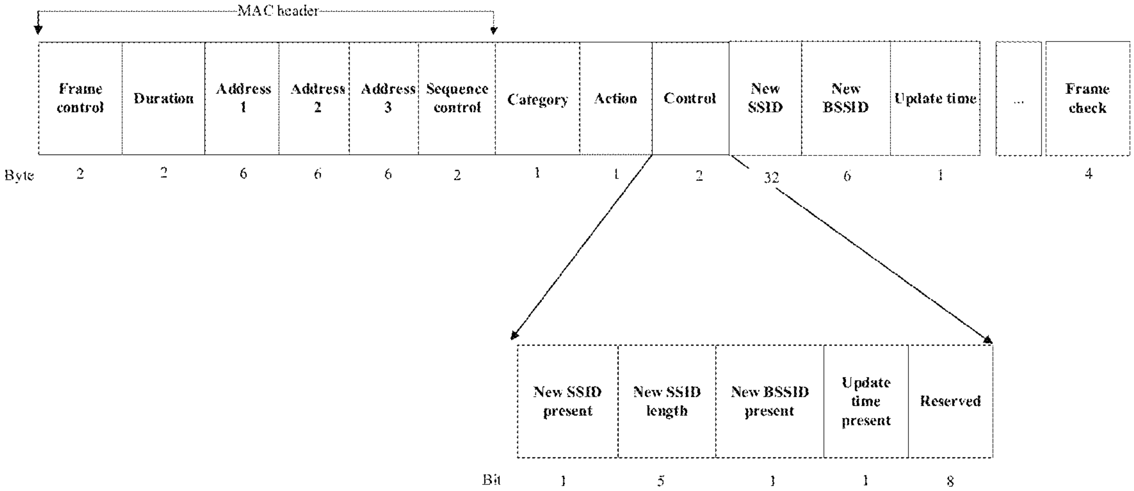
FIG. 7 is a schematic diagram of a first management frame according to an embodiment of this application.

Specifically, for example, a first management frame may be shown in FIG. 7. A control field of the first management frame may include a new SSID present field (occupying one bit), a new SSID length field (occupying five bits), a new BSSID present field (occupying one bit), and an update time present field (occupying one bit). A value of the new SSID present field is used to indicate that the first management frame includes a new SSID field, the new SSID length field is used to indicate a new SSID length, a value of the new BSSID present field is used to indicate that the first management frame includes a new BSSID field, and a value of the update time present field is used to indicate that the first management frame includes an update time field. The new SSID field carries a new SSID, the new BSSID field carries a new BSSID, and the update time field carries first duration. A STA updates a currently used OTA MAC address within the first duration; and after the OTA MAC address is updated, the STA communicates with an AP by using an updated OTA MAC address and the new BSSID, and the STA discovers the AP by using the new SSID.

Figure 8:
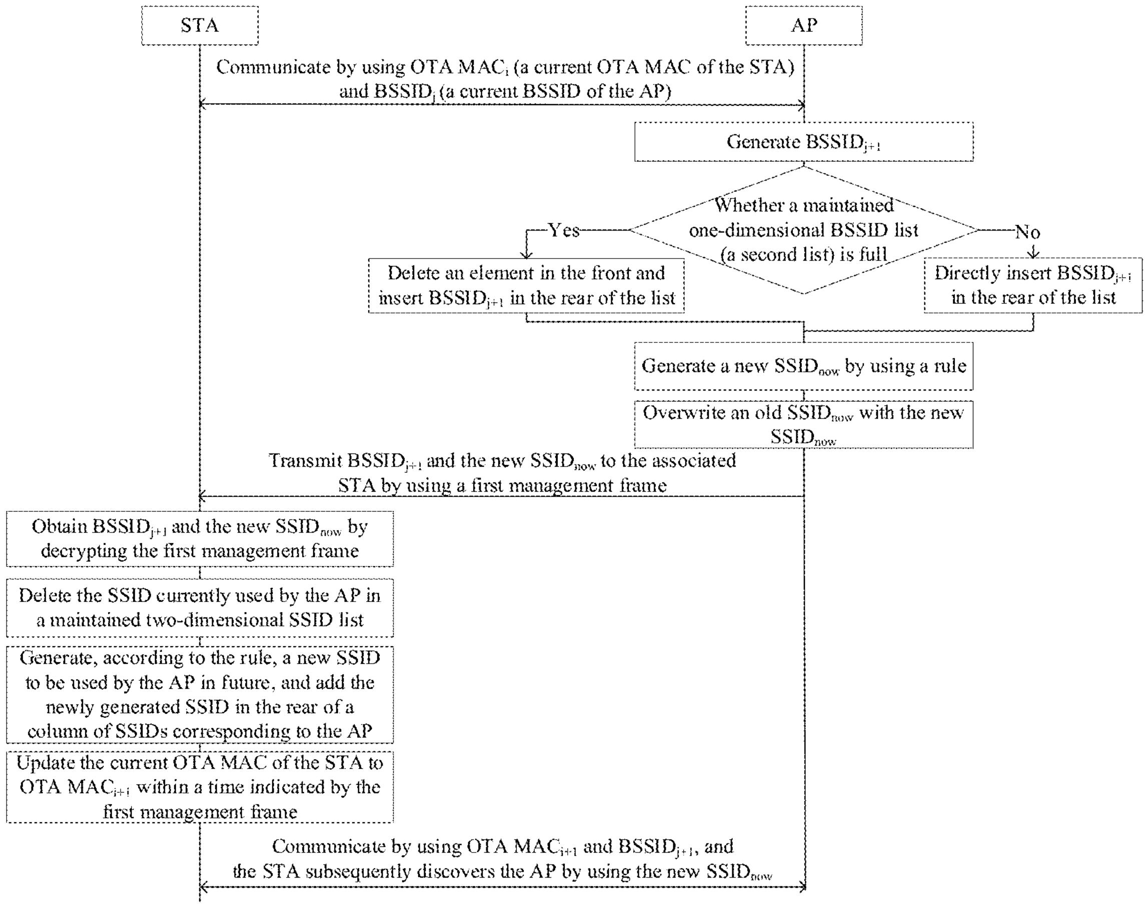
FIG. 8 is a schematic flowchart of updating an SSID and a BSSID by an AP according to an embodiment of this application.

In some implementations, a procedure for updating a BSSID and an SSID by an AP may be shown in FIG. 8. A specific procedure may include some or all of the following steps S11 to S19.

In step S11, a STA communicates with an AP by using OTA $MAC_i$ (a current OTA MAC of the STA) and $BSSID_j$ (a current BSSID of the mobile AP).

In step S12, the AP generates a new BSSID, that is, $BSSID_{j+1}$.

In step S13, the AP checks whether a second list (one-dimensional BSSID list) maintained by the AP is full. If the second list is full, the AP deletes an element at the header and inserts $BSSID_{j+1}$ at the tail of the list; or if the second list is not full, the AP directly inserts $BSSID_{j+1}$ at the tail of the list. Because the AP maintains a BSSID used in a previous period of time in the second list, before the STA communicates by using a new OTA MAC and a new BSSID, a message transmitted by the STA by using the old BSSID can still be identified and received by the AP, thereby ensuring that communication of the STA associated with the AP is not interrupted when the AP changes the BSSID of the AP.

In step S14, the AP generates a new $SSID_{now}$ by using the foregoing rule, and overwrites an old $SSID_{now}$ with the new $SSID_{now}$. Then, the AP no longer uses the old BSSID and the old SSID in a beacon frame and/or a probe response frame, and starts to use $BSSID_{j+1}$ and the new $SSID_{now}$ in the beacon frame and/or the probe response frame.

In step S15, the AP transmits $BSSID_{j+1}$ and the new $SSID_{now}$ to the associated STA by using the first management frame shown in FIG. 7 (the first management frame is a protected management frame). The value of the new SSID present field in the first management frame is "1" (used to indicate that the first management frame includes the new SSID field, and the new SSID field carries the new $SSID_{now}$), the value of the new BSSID present field is "1" (used to indicate that the first management frame includes the new BSSID field, and the new BSSID field carries $BSSID_{j+1}$), and the value of the update time present field is "1" (used to indicate that the first management frame includes the update time field, and the update time field carries the first duration).

In step S16, after receiving the first management frame, the STA obtains $BSSID_j+1$ and the new $SSID_{now}$ by decrypting the first management frame.

In step S17, the STA deletes the $SSID_{now}$ currently used by the AP (that is, the old $SSID_{now}$) in a two-dimensional SSID list (as shown in FIG. 5) maintained by the STA, generates, according to the foregoing rule, an SSID to be used by the AP in future (that is, the new $SSID_{now}$), and adds the new $SSID_{now}$ in the rear of a column of SSIDs corresponding to the AP in the two-dimensional SSID list (as shown in FIG. 5).

In step S18, the STA updates the currently used OTA MAC address to be OTA $MAC_{i+1}$ within the time (that is, the first duration) indicated by the first management frame.

In step S19, the STA communicates with the AP by using OTA $MAC_{i+1}$ and $BSSID_{j+1}$, and the STA subsequently discovers the AP by using the new $SSID_{now}$.

In some implementations of Embodiment 1, the AP transmits a second management frame to the STA, where a control field in the second management frame includes an initial SSID present field, the initial SSID present field is used to indicate whether an initial SSID field is included in the second management frame, and the initial SSID field carries an initial SSID of the AP.

In some implementations, in a case in which an SSID used by the STA when establishing an association with the AP is the initial SSID, the initial SSID present field is used to indicate that the initial SSID field is not included in the second management frame.

In some implementations, in a case in which an SSID used by the STA when establishing an association with the AP is not the initial SSID, the initial SSID present field is used to indicate that the initial SSID field is included in the second management frame.

Specifically, the initial SSID present (Initial SSID Present) field is used to indicate whether the second management frame includes the initial SSID (Initial SSID) field. Specifically, for example, the initial SSID present field occupies one bit (or may occupy another quantity of bits). If the initial SSID present field is set to be 1, it indicates that the second management frame includes the initial SSID field; or if the initial SSID present field is set to be 0, it indicates that the second management frame does not include the initial SSID field. Alternatively, if the initial SSID present field is set to be 0, it indicates that the second management frame includes the initial SSID field; or if the initial SSID present field is set to be 1, it indicates that the second management frame does not include the initial SSID field.

Optionally, the second management frame is a protected management frame, that is, a frame body of the second management frame is an encrypted frame body. The second management frame is an action (Action) frame. Because a value range “30-125” of a category (Category) field in the action frame is reserved, any value (for example, “30”) is selected from the range to indicate the second management frame in this embodiment.

Figure 9:
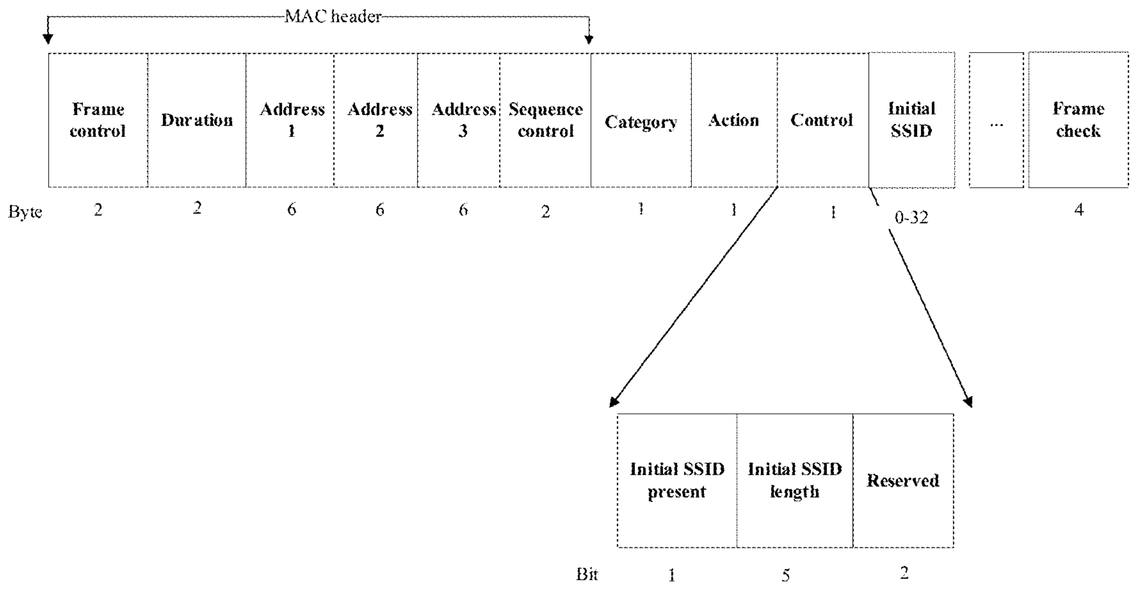
FIG. 9 is a schematic diagram of a second management frame according to an embodiment of this application.

Specifically, for example, a second management frame may be shown in FIG. 9. A control field of the second management frame includes an initial SSID present field (occupying one bit) and an initial SSID length field (occupying five bits). The initial SSID present field is used to indicate whether the second management frame includes an initial SSID field, and the initial SSID length field is used to indicate a length of an initial SSID. In a case in which a value of the initial SSID present field is used to indicate that the second management frame includes the initial SSID field (that is, the initial SSID field occupies 32 bytes), the initial SSID length field occupies five bits. Alternatively, in a case in which a value of the initial SSID present field is used to indicate that the second management frame does not include the initial SSID field (that is, the initial SSID field occupies zero bytes), the initial SSID length field is a reserved field (that is, each bit in the field is set to be 0).

In some implementations, an AP that supports an SSID privacy enhancement function may indicate an initial SSID to a STA by using a management frame after the STA accesses the AP for the first time. Specifically, a procedure for accessing the AP that supports the SSID privacy enhancement function by the STA for the first time may be shown in FIG. 10. A specific procedure may include some or all of the following steps S21 to S26.

In step S21, an STA accesses a new AP that supports an SSID privacy enhancement function by manually entering an SSID or clicking an available network list by a user. Because the AP that supports the SSID privacy enhancement function uses only a BSSID and an SSID currently used by the AP in a beacon frame or a probe response frame, the STA directly accesses the AP.

In step S22, the AP determines whether the STA accesses the AP by using an initial SSID. If the STA accesses the AP by using the initial SSID, the AP sets the value of the initial SSID present field in the second management frame shown in FIG. 9 to be “0” (that is, the second management frame does not include the initial SSID field); or if the STA does not access the AP by using the initial SSID, the AP sets the value of the initial SSID present field to be “1” (that is, the second management frame includes the initial SSID field). In addition, the AP places a current SSID in the initial SSID field.

In step S23, the AP indicates the initial SSID to the STA by using the second management frame shown in FIG. 9 (the frame is a protected management frame).

In step S24, the STA determines whether the value of the initial SSID present field in the second management frame is 0. If the value of the initial SSID present field in the second management frame is 0, an SSID used by the STA when accessing the AP is the initial SSID of the AP; or if the value of the initial SSID present field in the second management frame is not 0, the STA extracts the initial SSID of the AP from the initial SSID field.

In step S25, the STA generates S SSIDs to be used by the AP in future according to the foregoing rule.

In step S26, the STA adds the initial SSID of the AP, the current SSID of the AP, and the SSIDs to be used by the AP in future to a two-dimensional SSID list (as shown in FIG. 5).

Embodiment 2: A New SSID is Generated by Using a Random Number and a Key

In Embodiment 2, a current SSID in a first list is generated based on a random number corresponding to the current SSID and first secret information at non-initial time, where the first secret information is common secret information between an AP and a STA that has accessed the AP.

That is, in Embodiment 2, at initial time, the current SSID is an initial SSID, and at non-initial time, the AP may generate the current SSID based on the random number corresponding to the current SSID and the first secret information.

It should be noted that the random number corresponding to the current SSID may be a random number generated by the AP when generating the current SSID.

In some implementations, the first secret information may be a network key or a key derived from a network key.

In Embodiment 2, the first list maintained by the AP may be a one-dimensional list with a length of 2, the first element in the first list is the initial SSID of the AP, and the second element is the current SSID of the AP. Specifically, for example, the first list may be shown in FIG. 4, where $SSID_1$ is the initial SSID of the AP (an SSID set by a user or a default SSID of the AP), and $SSID_{now}$ is the SSID currently used by the AP. At initial time, the two elements in the first list are both $SSID_1$, that is, $SSID_{now}=SSID_1$ at initial time.

In Embodiment 2, a second list maintained by the AP may be shown in FIG. 3. The second list stores BSSIDs used currently or used in the past. An initial $BSSID_1$ is stored at a header of the list, a currently used BSSID is stored at a tail of the list, and there is only the $BSSID_1$ in the list at initial time.

In some implementations of Embodiment 2, when the AP updates the current SSID and a current BSSID, the AP generates a new SSID (that is, a newly generated current SSID) according to a newly generated random number and the first secret information, and the AP generates a new BSSID (that is, a newly generated current BSSID).

Figures 10, 11, 12:
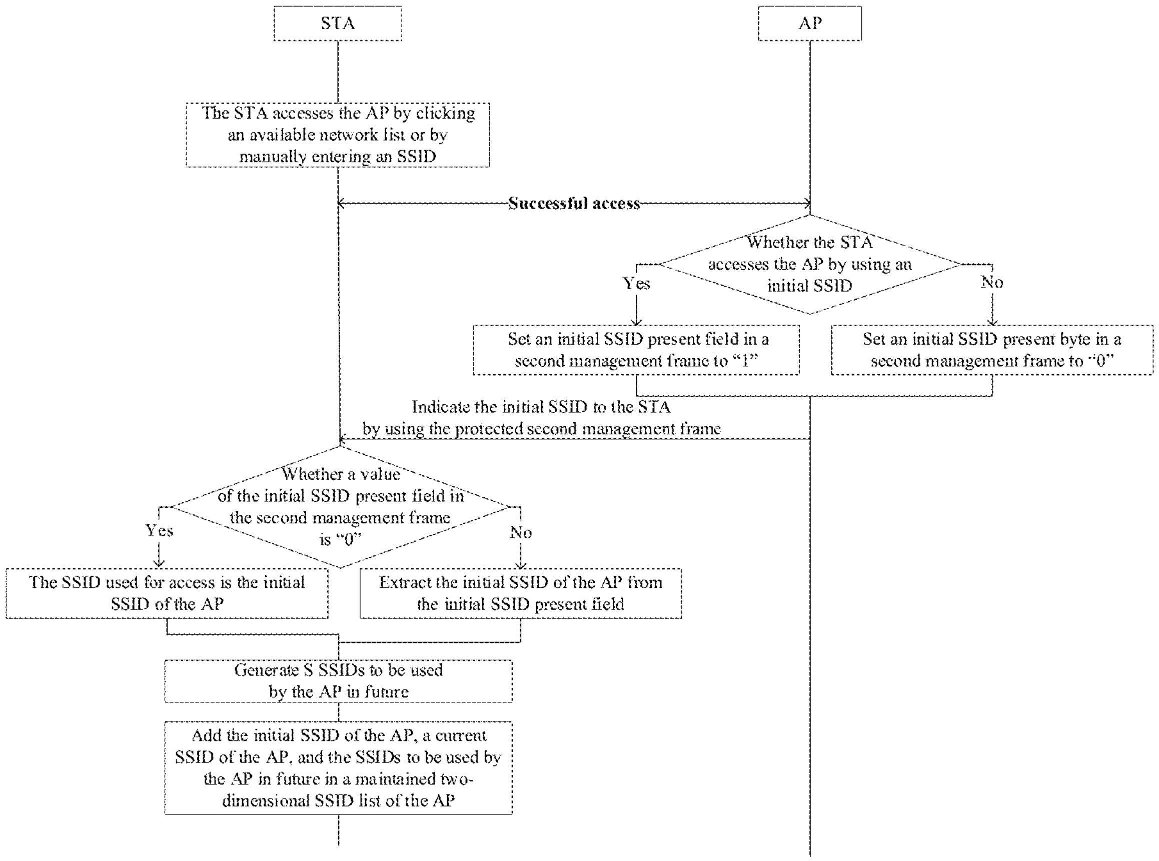
FIG. 10 is a schematic flowchart showing a process that a STA accesses an AP that supports an SSID privacy enhancement function for the first time according to an embodiment of this application.
FIG. 11 is a schematic diagram of a two-dimensional list (a fifth list) maintained by a STA according to an embodiment of this application.
FIG. 12 is a schematic diagram of an SSID information element according to an embodiment of this application.

In Embodiment 2, the STA locally maintains a two-dimensional list. As shown in FIG. 11, the first row of the two-dimensional list stores an initial SSID of an AP that supports an SSID privacy enhancement function, the second row of the two-dimensional list stores a current SSID of the AP that supports the SSID privacy enhancement function, and a length of the two-dimensional list is a quantity of APs that support the SSID privacy enhancement function and that are accessed by the STA.

In some implementations of Embodiment 2, the AP generates a new $SSID_{now}$ according to a specific rule. For example, a new $SSID_{now}$ may be generated in the following manner: concatenating common secret information (for example, using a network key or a key derived from a network key) between the AP and the STA that has accessed the AP with a value of a random number (generated randomly each time $SSID_{now}$ is updated), performing hashing on a concatenating result, and using a result of the hashing as a new $SSID_{now}$ of the AP (as long as that a length of the new $SSID_{now}$ is greater than 0 and less than 32 bytes), or using a part of the result of the hashing as a new $SSID_{now}$ of the AP (as long as a length of the new $SSID_{now}$ is greater than 0 and less than 32 bytes). For another example, a new $SSID_{now}$ may be generated in the following manner: using an HKDF algorithm or a PBKDF algorithm, using common secret information between the AP and the STA that has accessed the AP (for example, using a network key or a key derived from a network key) and a random number (generated randomly each time $SSID_{now}$ is updated) as an input, and using an output of the algorithm as a new $SSID_{now}$ of the AP. Optionally, the output of the algorithm may be Base64 encoded into a visible character string, serving as a new $SSID_{now}$ of the AP. The common secret information between the AP and the STA that has accessed the AP ensures that a STA that fails to access the AP cannot associate a current SSID, a past SSID, and a future SSID of the AP.

In some implementations of Embodiment 2, the AP obtains the current SSID from the first list, and obtains the current BSSID from the second list; and the AP transmits a first frame to the STA, where an SSID element in the first frame includes an SSID field and a random number field, the SSID field carries the current SSID, the random number field carries the random number corresponding to the current SSID, and a transmitter address of the first frame is the current BSSID.

In some implementations of Embodiment 2, the first frame is a beacon frame or a probe response frame. Specifically, after updating the BSSID and the SSID of the AP, the AP always uses only the current SSID of the AP in a beacon frame or a probe response frame. In this way, an attacker cannot associate the old SSID of the AP with the new SSID of the AP, or the attacker cannot associate the old BSSID of the AP with the new BSSID of the AP.

Specifically, an SSID information element in a beacon frame or a probe response frame transmitted by an AP (for example, an AP that supports an SSID privacy enhancement function) is shown in FIG. 12. When a STA receives the beacon frame or the probe response frame transmitted by the AP and if a value of an SSID field in the SSID information element is not included in a current SSID value of the AP locally stored by the STA, calculation is performed on a value of a random number (Random Number) field in the beacon frame or the probe response frame and secret information (same as secret information used by the AP when generating a new $SSID_{now}$) between all APs that support the SSID privacy enhancement function that are locally maintained by using the foregoing algorithm, and a result of the calculation serves as a new $SSID_{now}$ of the AP locally stored in the STA. If an SSID in the result of the calculation is consistent with an SSID in the beacon frame or the probe response frame, the STA may associate the SSID with an SSID currently used by an AP in a two-dimensional list, to ensure that the AP changes an SSID of the AP within a period during which a STA or some STAs that accessed the AP are not associated with the AP. The STA or STAs may associate, through a passive scan or a probe of a wildcard SSID, a new SSID of the AP with a previous SSID of the AP saved by the STA or STAs.

Specifically, for example, a STA generates an SSID according to a same rule as the AP. It is assumed that a random number carried in a random number field is a random number 1, and common secret information between the STA and an AP1 is secret information 1. For example, the STA concatenates the secret information 1 with a value of the random number 1, performs hashing on a concatenating result, and uses a result of the hashing as an SSID of the AP1 (as long as a length of the SSID is greater than 0 and less than 32 bytes), or uses a part of the result of the hashing as an SSID of the AP1 (as long as a length of the SSID is greater than 0 and less than 32 bytes). For another example, the STA uses an HKDF algorithm or a PBKDF algorithm, uses the secret information 1 and the random number 1 as an input, and uses an output of the algorithm as an SSID of the AP1. Optionally, the output of the algorithm may be Base64 encoded into a visible character string, serving as an SSID of the AP.

In some implementations of Embodiment 2, a capability information (Capability information) element in the first frame includes a first bit, and a value of the first bit is used to indicate that the AP supports the SSID privacy enhancement function. Optionally, the first bit is a reserved bit in the capability information element of the first frame. The reserved bit in the capability information element of the first frame may be the $15^{th}$ bit and the $16^{th}$ bit.

Specifically, for example, the AP sets a value of the $15^{th}$ bit or the $16^{th}$ bit in the capability information element of the first frame to be "1", which is used to indicate that the AP is an AP that supports the SSID privacy enhancement function. Alternatively, the AP sets the value of the $15^{th}$ bit or the $16^{th}$ bit of the capability information element of the first frame to be "0", which is used to indicate that the AP is an AP that supports the SSID privacy enhancement function.

In some implementations of Embodiment 2, the AP checks whether the AP is set to be a hidden AP. If the AP is set to be a hidden AP, the AP does not carry the current SSID of the AP in an SSID element of a beacon frame of the AP. If the AP is not set to be a hidden AP, the AP carries the current SSID of the AP in an SSID element of a beacon frame of the AP.

In some implementations of Embodiment 2, when the AP receives a probe request frame carrying a wildcard SSID (wildcard SSID) and the AP is not set to be a hidden AP, the AP responds with a probe response frame carrying the SSID and the BSSID currently used by the AP, to indicate the presence of the AP. When receiving a probe request frame whose SSID field value is the SSID currently used by the AP, the AP responds with a probe response frame carrying the SSID and the BSSID currently used by the AP, to indicate the presence of the AP.

In some implementations of Embodiment 2, in a case in which the first frame is a probe response frame and before the first frame is transmitted, the AP receives a first probe request frame transmitted by the STA. The first frame is a response frame of the first probe request frame, and an SSID in the first probe request frame is the current SSID of the AP, or the SSID in the first probe request frame is an SSID used when the STA accessed the AP. The SSID used when the STA accessed the AP may be the initial SSID, or may be another SSID.

In some implementations of Embodiment 2, the SSID in the first probe request frame belongs to a PNL, and the PNL includes at least one SSID selected from an obfuscation library and an SSID of one or more APs that were accessed by the STA, or the PNL includes at least one SSID selected from an obfuscation library, an initial SSID of at least one AP, and an SSID of one or more APs that were accessed by the STA. An SSID included in the obfuscation library does not involve privacy information of a user corresponding to the STA.

Optionally, an SSID in the obfuscation library includes but is not limited to at least one of the following:

an SSID detected from surroundings, a randomly generated SSID, or an SSID in an SSID library provided by an upper-layer application program.

In some implementations, in a case in which the STA is not associated with the AP within a period of time, the STA uses at least one SSID selected from the obfuscation library, an initial SSID of at least one AP, and an SSID of one or more APs that were accessed by the STA as a PNL of the STA.

In some implementations, in a case in which the PNL includes at least one SSID selected from the obfuscation library and an SSID of one or more APs that were accessed by the STA, and the STA attempts to access the AP for a plurality of times but fails to access the AP, the STA again uses at least one SSID selected from the obfuscation library, an initial SSID of at least one AP, and an SSID of one or more APs that were accessed by the STA, as a PNL of the STA.

Specifically, for example, as shown in FIG. 6, an AP locally maintains a first list and a second list, and the AP checks whether the AP is set to be a hidden AP. If the AP is set to be a hidden AP, an SSID element in a beacon frame of the AP does not carry a current SSID of the AP. If the AP is not set to be a hidden AP, an SSID element in a beacon frame of the AP carries the current SSID of the AP. The AP sets a value of the $15^{th}$ bit of a capability information element in a frame body of a beacon frame or a probe response frame to be "1", which is used to indicate that the AP supports an SSID privacy enhancement function.

In some implementations of Embodiment 2, after the current SSID and a current BSSID are updated, the AP transmits a first management frame to a STA, where the first management frame is a protected management frame, and the first management frame includes a new SSID and a new BSSID. That is, the AP generates a new SSID according to the current SSID, and the AP generates a new BSSID. After the current SSID and the current BSSID are updated, the AP indicates the new SSID and the new BSSID to the STA by using the first management frame.

It should be noted that the first management frame is a protected management frame, that is, a frame body of the first management frame is an encrypted frame body.

In some implementations of Embodiment 2, the first management frame includes at least one of the following: a control field, a new SSID field, a new BSSID field, or an update time field. The control field includes a new SSID present field, a new BSSID present field, and an update time present field, a value of the new SSID present field is used to indicate whether the first management frame includes the new SSID field, a value of the new BSSID present field is used to indicate whether the first management frame includes the new BSSID field, and a value of the update time present field is used to indicate whether the first management frame includes the update time field, where the new SSID field carries the new SSID, the new BSSID field carries the new BSSID, and the update time field carries first duration. The STA updates a currently used OTA MAC address within the first duration; and after the OTA MAC address is updated, the STA communicates with the AP by using an updated OTA MAC address and the new BSSID, and the STA discovers the AP by using the new SSID.

It should be noted that the descriptions of the first management frame in Embodiment 2 are consistent with those in Embodiment 1, and details are not described herein again. In addition, a procedure for updating a BSSID and an SSID by an AP in Embodiment 2 is the same as that described in Embodiment 1, and details are not described herein again.

In some implementations of Embodiment 2, the AP transmits a second management frame to the STA. A control field in the second management frame includes an initial SSID present field, the initial SSID present field is used to indicate whether an initial SSID field is included in the second management frame, and the initial SSID field carries an initial SSID of the AP.

In some implementations, in a case in which an SSID used by the STA when establishing an association with the AP is the initial SSID, the initial SSID present field is used to indicate that the initial SSID field is not included in the second management frame.

In some implementations, in a case in which an SSID used by the STA when establishing an association with the AP is not the initial SSID, the initial SSID present field is used to indicate that the initial SSID field is included in the second management frame.

Specifically, the initial SSID present (Initial SSID Present) field is used to indicate whether the second management frame includes the initial SSID (Initial SSID) field. Specifically, for example, the initial SSID present field occupies one bit (or may occupy another quantity of bits). If the initial SSID present field is set to be 1, it indicates that the second management frame includes the initial SSID field; or if the initial SSID present field is set to be 0, it indicates that the second management frame does not include the initial SSID field. Alternatively, if the initial SSID present field is set to be 0, it indicates that the second management frame includes the initial SSID field; or if the initial SSID present field is set to be 1, it indicates that the second management frame does not include the initial SSID field.

Optionally, the second management frame is a protected management frame, that is, a frame body of the second management frame is an encrypted frame body. The second management frame is an action (Action) frame. Because a value range "30-125" of a category (Category) field in the action frame is reserved, any value (for example, "30") is selected from the range to indicate the second management frame in this embodiment.

It should be noted that the descriptions of the second management frame in Embodiment 2 are consistent with those in Embodiment 1, and details are not described herein again. In addition, a procedure for accessing an AP that supports an SSID privacy enhancement function by a STA for the first time in Embodiment 2 is the same as that described in Embodiment 1, and details are not described herein again.

Embodiment 3: A New SSID is Selected from a Third List, where the Third List Includes at Least One SSID to be Used by an AP in Future In some implementations, the at least one SSID to be used by the AP in future includes but is not limited to at least one of the following:

an SSID detected from surroundings, a randomly generated SSID, or an SSID in an SSID library provided by an upper-layer application program.

In some implementations, the third list may be specified in a protocol, or the third list may be configured by the AP.

Figure 13:
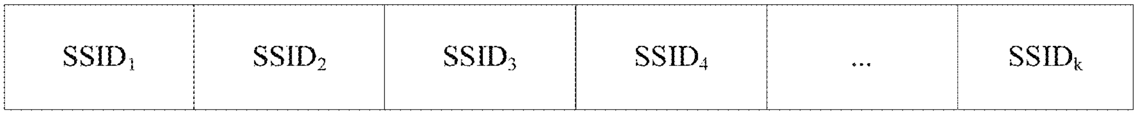
FIG. 13 is a schematic diagram of a third list according to an embodiment of this application.

In Embodiment 3, the AP locally maintains the third list. Specifically, for example, as shown in FIG. 13, the third list may be a one-dimensional list with a length of k, and stores SSIDs to be used in future. There are k elements in total, where k is a positive integer. The elements in the third list may use an SSID detected from surroundings, or a randomly generated SSID, or an SSID in an SSID library provided by an upper-layer application program. At initial time, there are k SSIDs in the third list.

In some implementations of Embodiment 3, when the AP updates a current SSID and a current BSSID, the AP selects a new SSID (that is, a new current SSID) from the third list, and the AP generates a new BSSID (that is, a newly generated current BSSID).

Figure 14:
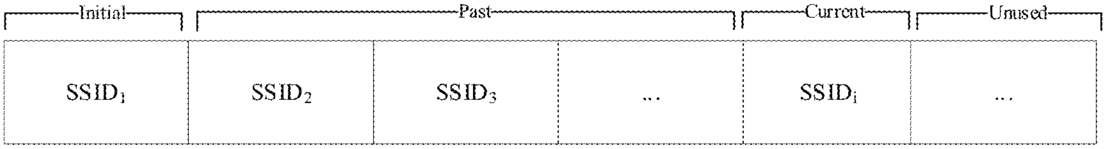
FIG. 14 is a schematic diagram of another first list according to an embodiment of this application.

In Embodiment 3, a first list maintained by the AP may be a one-dimensional list with a length of P, which stores SSIDs used currently or used in the past. An initial SSID of the AP (an SSID set by a user or a default SSID of the AP) is stored at a header of the list, and the current SSID of the AP is stored at a tail of the list. Specifically, the first list may be shown in FIG. 14, where $SSID_1$ is the initial SSID of the AP, $SSID_i$ is the current SSID of the AP, and $SSID_1$ to $SSID_{i-1}$ is SSIDs previously used by the AP. There is only the $SSID_1$ in the first list at initial time.

In Embodiment 3, a second list maintained by the AP may be shown in FIG. 3. The second list stores BSSIDs used currently or used in the past. An initial $BSSID_1$ is stored at a header of the list, a currently used BSSID is stored at a tail of the list, and there is only the $BSSID_1$ in the list at initial time.

In Embodiment 3, the STA locally maintains a two-dimensional list. As shown in FIG. 11, the first row of the two-dimensional list stores an initial SSID of an AP that supports an SSID privacy enhancement function, the second row of the two-dimensional list stores a current SSID of the AP that supports the SSID privacy enhancement function, and a length of the two-dimensional list is a quantity of APs that support the SSID privacy enhancement function and that are accessed by the STA.

In some implementations of Embodiment 3, the AP obtains the current SSID from the first list, and obtains the current BSSID from the second list; and the AP transmits a second frame to a STA, where the second frame carries the current SSID and the current BSSID.

In some implementations, the second frame is a beacon frame or a probe response frame.

In some implementations, in a case in which the second frame is a probe response frame and before the second frame is transmitted, the AP receives a second probe request frame transmitted by the STA, where the second frame is a response frame of the second probe request frame.

In some implementations, the second frame includes a current SSID element (Current SSID Element), where the current SSID element is used to indicate that the AP supports the SSID privacy enhancement function.

In some implementations, a control field in the current SSID element includes a current SSID present (Current SSID Present) field, a value of the current SSID present field is used to indicate whether a current SSID field is included in the current SSID element, and the current SSID field carries the current SSID.

Specifically, for example, the current SSID present field occupies one bit (or may occupy another quantity of bits). If the current SSID present field is set to be 1, it indicates that the current SSID field is included in the current SSID element; or if the current SSID present field is set to be 0, it indicates that the current SSID field is not included in the current SSID element. Alternatively, if the current SSID present field is set to be 0, it indicates that the current SSID field is included in the current SSID element; or if the current SSID present field is set to be 1, it indicates that the current SSID field is not included in the current SSID element.

Optionally, in the second frame, "Element ID" field value equals to 255 and "Element ID Extension" field value equals to 94 may be used to indicate that an information element is the "current SSID element (Current SSID Element)".

Figure 15:
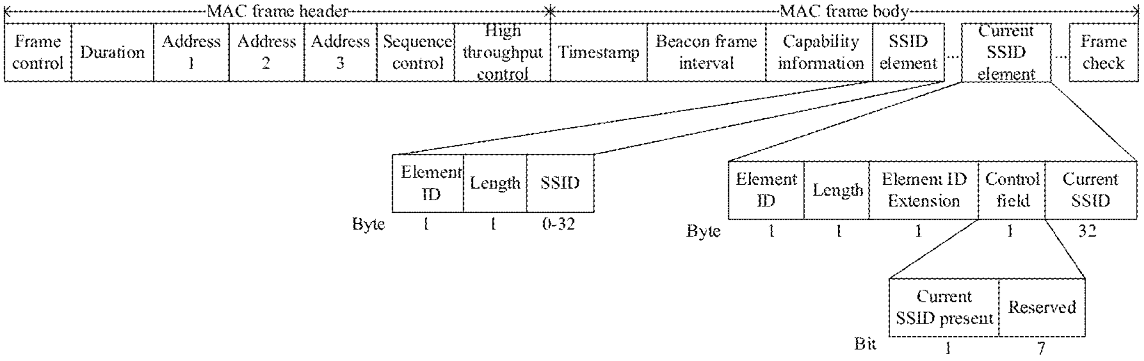
FIG. 15 is a schematic diagram of a first frame according to an embodiment of this application.

Specifically, the second frame (which may be a probe response frame or a beacon frame) may be shown in FIG. 15. If the value of the current SSID present field in the current SSID element is 0, it indicates that the current SSID field is not included in the current SSID element; or if the value of the current SSID present field is 1, it indicates that the current SSID field is included in the current SSID element. When "Element ID" is set to be 255, the "Element ID Extension" field ((94 to 255 are reserved and unused)) is included in the element. Herein, "Element ID" field value equals to 255 and "Element ID Extension" field value equals to 94 may be used to indicate that an information element is the "current SSID element". For example, an AP that implements the SSID privacy enhancement function carries a current SSID element in a probe response frame, and a value of a current SSID present field is 0 or 1. In a medium access control (Media Access Control, MAC) header of a probe request frame (that is, a second probe request frame) transmitted by the STA, an address 1 (which may also be referred to as a receiver address (RA)) is a broadcast address (broadcast address), an address 2 (which may also be referred to as a transmitter address (TA)) is a MAC address of the STA, and an address 3 (which may also be referred to as a BSSID) is a broadcast address (broadcast address). In a MAC header of the probe response frame transmitted by the AP, an address 1 (or referred to as an RA) is the MAC address of the STA that transmits the probe request frame, an address 2 (or referred to as a TA) is a current MAC address of the AP, and an address 3 (or referred to as a BSSID) is a current BSSID of the AP (which is generally the current MAC address of the AP).

In some implementations, in a case in which an SSID in the second probe request frame is a wildcard SSID (wildcard SSID) or the SSID in the second probe request frame is the current SSID, the value of the current SSID present field is used to indicate that the current SSID field is not included in the current SSID element, an SSID element in the second frame carries the current SSID, and a transmitter address of the second frame is the current BSSID; or in a case in which an SSID in the second probe request frame is an SSID previously used by the AP, the value of the current SSID present field is used to indicate that the current SSID field is included in the current SSID element, an SSID element in the second frame carries an SSID that is the same as the SSID in the second probe request frame, and a transmitter address of the second frame is the current BSSID.

Specifically, interaction between a probe request frame and a probe response frame of a STA and an AP may be shown in Table 1.

TABLE 1

| | AP (SSID 1) | AP (SSID n) |
|---|---|---|
| STA: probe request frame (SSID 1) | Probe response frame (SSID 1), current SSID present = 0, indicating that a current SSID field is not included in a current SSID element | Probe response frame (SSID 1), current SSID present = 1, indicating that a current SSID field is included in a current SSID element |
| STA: probe request frame (SSID n) | No response | Probe response frame (SSID n), current SSID present = 0, indicating that a current SSID field is not included in a current SSID element |

In some implementations, the current SSID carried in the current SSID field is an encrypted SSID, and an encryption key of the current SSID is a network key, or the encryption key of the current SSID is a key derived based on a network key.

In some implementations, the encryption key of the current SSID is stored locally by the STA, or the encryption key of the current SSID is a network key entered when the STA accesses the AP by manually entering an SSID by a user.

In some implementations, an SSID in the second probe request frame belongs to a PNL, and the PNL includes at least one SSID selected from an obfuscation library and an SSID of one or more APs that were accessed by the STA, or the PNL includes at least one SSID selected from an obfuscation library, an initial SSID of at least one AP, and an SSID of one or more APs that were accessed by the STA, where an SSID included in the obfuscation library does not involve privacy information of a user corresponding to the STA.

In some implementations, an SSID in the obfuscation library includes at least one of the following:

an SSID detected from surroundings, a randomly generated SSID, or an SSID in an SSID library provided by an upper-layer application program.

In some implementations, in a case in which the STA is not associated with the AP within a period of time, the STA uses at least one SSID selected from the obfuscation library, an initial SSID of at least one AP, and an SSID of one or more APs that were accessed by the STA, as a PNL of the STA.

In some implementations, in a case in which the PNL includes at least one SSID selected from the obfuscation library and an SSID of one or more APs that were accessed by the STA, and the STA attempts to access the AP for a plurality of times but fails to access the AP, the STA again uses at least one SSID selected from the obfuscation library, an initial SSID of at least one AP, and an SSID of one or more APs that were accessed by the STA, as a PNL of the STA.

Specifically, a probe request frame that carries a specified SSID is generally applied to the following two scenarios. In one scenario, a STA finds, by using a locally stored PNL, an AP that was accessed by the STA (not for the first time). Therefore, the STA locally stores a network key. If a current SSID field exists and is encrypted, the STA can obtain the current SSID through decryption, to associate with the AP by using the current SSID of the AP. In the other scenario, a STA accesses an AP (for the first time) by manually entering an SSID. A network key needs to be entered during a process of the access. If a current SSID exists and is encrypted, the STA can obtain the current SSID through decryption in a case that the network key is correct. Therefore, the STA can associate with the AP by using the current SSID of the AP.

Figure 16:
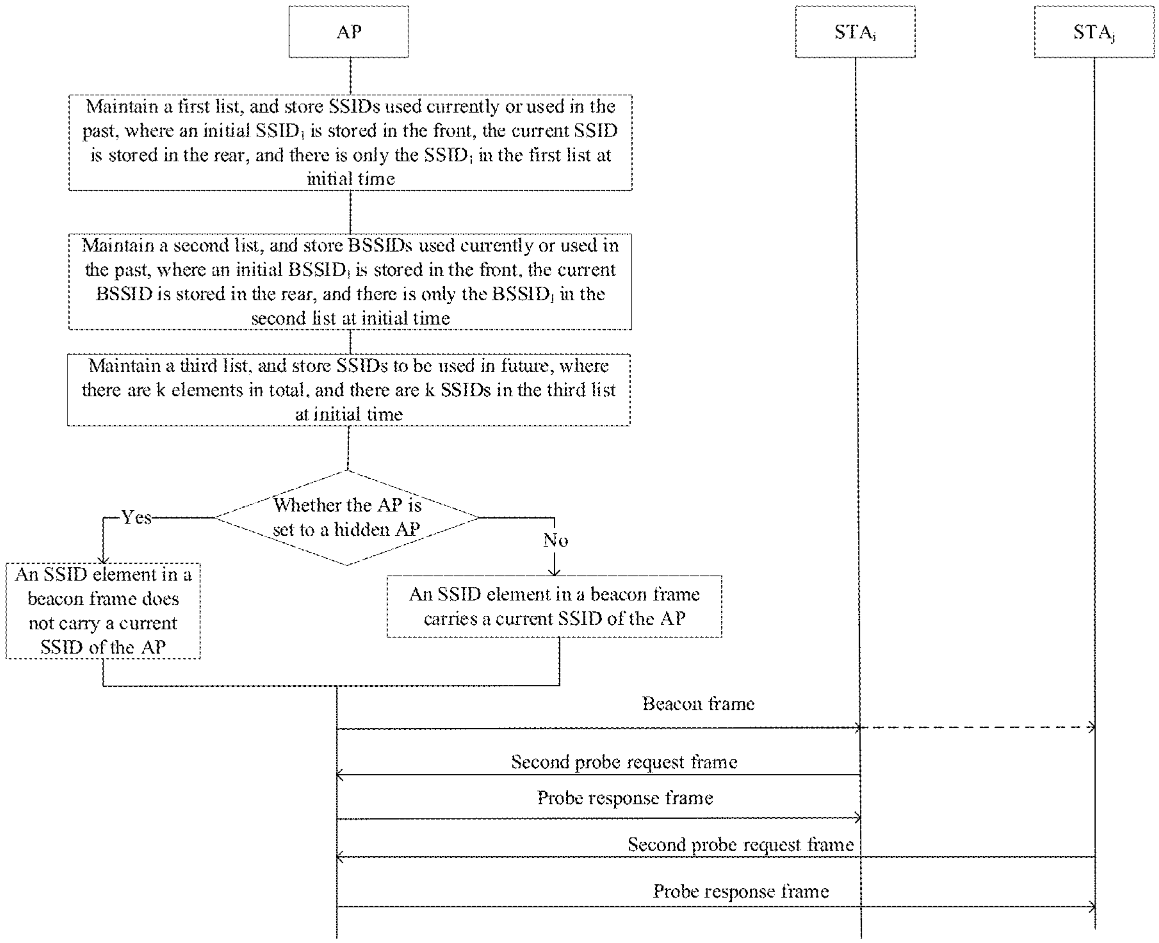
FIG. 16 is a schematic diagram of another list maintained by an AP according to an embodiment of this application.

Specifically, for example, as shown in FIG. 16, an AP locally maintains a first list, a second list, and a third list, and the AP checks whether the AP is set to be a hidden AP. If the AP is set to be a hidden AP, an SSID element in a beacon frame of the AP does not carry a current SSID of the AP. If the AP is not set to be a hidden AP, an SSID element in a beacon frame of the AP carries the current SSID of the AP. The AP adds a current SSID element in a beacon frame and/or a probe response frame, to indicate to a STA that the AP is a mobile AP that implements an SSID privacy enhancement function. If a value of a current SSID present field in the current SSID element is 0, it indicates that a current SSID field is not included in the current SSID element; or if a value of a current SSID present field is 1, it indicates that a current SSID field is included in the current SSID element. In the current SSID element, "Element ID" field value equals to 255 and "Element ID Extension" field value equals to 94 may be used to indicate that an information element is the "current SSID element". If a value of a probe request frame carrying a wildcard SSID or a value of an SSID is a response to a probe request frame of an SSID currently used by the AP, the value of the current SSID present field is 0, because an SSID element in the probe response frame of the AP carries the SSID currently used by the AP. If a value of an SSID is a response to a probe request frame of an SSID used in a period of time in the past and maintained by the AP, the value of the current SSID present field is 1, because an SSID element in a probe response frame of the AP carries a same SSID as the probe request frame, and a current SSID field is used to carry an SSID currently used by the AP (an SSID currently used by the mobile AP may be encrypted and then transmitted, and the encryption may be performed by using a network key or a key derived from the network key). A probe request frame that carries a specified SSID is generally applied to the following two scenarios. In one scenario, a STA finds, by using a locally stored PNL, an AP that was accessed by the STA (not for the first time). Therefore, the STA locally stores a network key. If a current SSID field exists and is encrypted, the STA can obtain a current SSID through decryption, to associate with the AP by using the current SSID of the AP. In the other scenario, a STA accesses an AP (for the first time) by manually entering an SSID. A network key needs to be entered during a process of the access. If a current SSID field exists and is encrypted, the STA can obtain a current SSID through decryption in a case that the network key is correct. Therefore, the STA can associate with the AP by using the current SSID of the AP.

In some implementations of Embodiment 3, after the current SSID and the current BSSID are updated, the AP transmits a first management frame to a STA, where the first management frame is a protected management frame, and the first management frame includes a new SSID and a new BSSID. That is, the AP selects a new SSID, and the AP generates a new BSSID. After the current SSID and the current BSSID are updated, the AP indicates the new SSID and the new BSSID to the STA by using the first management frame.

It should be noted that the first management frame is a protected management frame, that is, a frame body of the first management frame is an encrypted frame body.

Optionally, the first management frame is an action (Action) frame. Because a value range "30-125" of a category (Category) field in the action frame is reserved, any value (for example, "30") is selected from the range to indicate the first management frame in this embodiment.

In some implementations of Embodiment 3, the first management frame includes a control field, a new SSID field, a new BSSID field, or an update time field. The control field includes a new SSID present field, a new BSSID present field, and an update time present field, a value of the new SSID present field is used to indicate that the first management frame includes the new SSID field, a value of the new BSSID present field is used to indicate that the first management frame includes the new BSSID field, and a value of the update time present field is used to indicate that the first management frame includes the update time field, where the new SSID field carries the new SSID, the new BSSID field carries the new BSSID, and the update time field carries first duration. The STA updates a currently used OTA MAC address within the first duration; and after the OTA MAC address is updated, the STA communicates with the AP by using an updated OTA MAC address and the new BSSID, and the STA discovers the AP by using the new SSID.

It should be noted that the descriptions of the first management frame in Embodiment 3 are consistent with those in Embodiment 1, and details are not described herein again.

Figure 17:
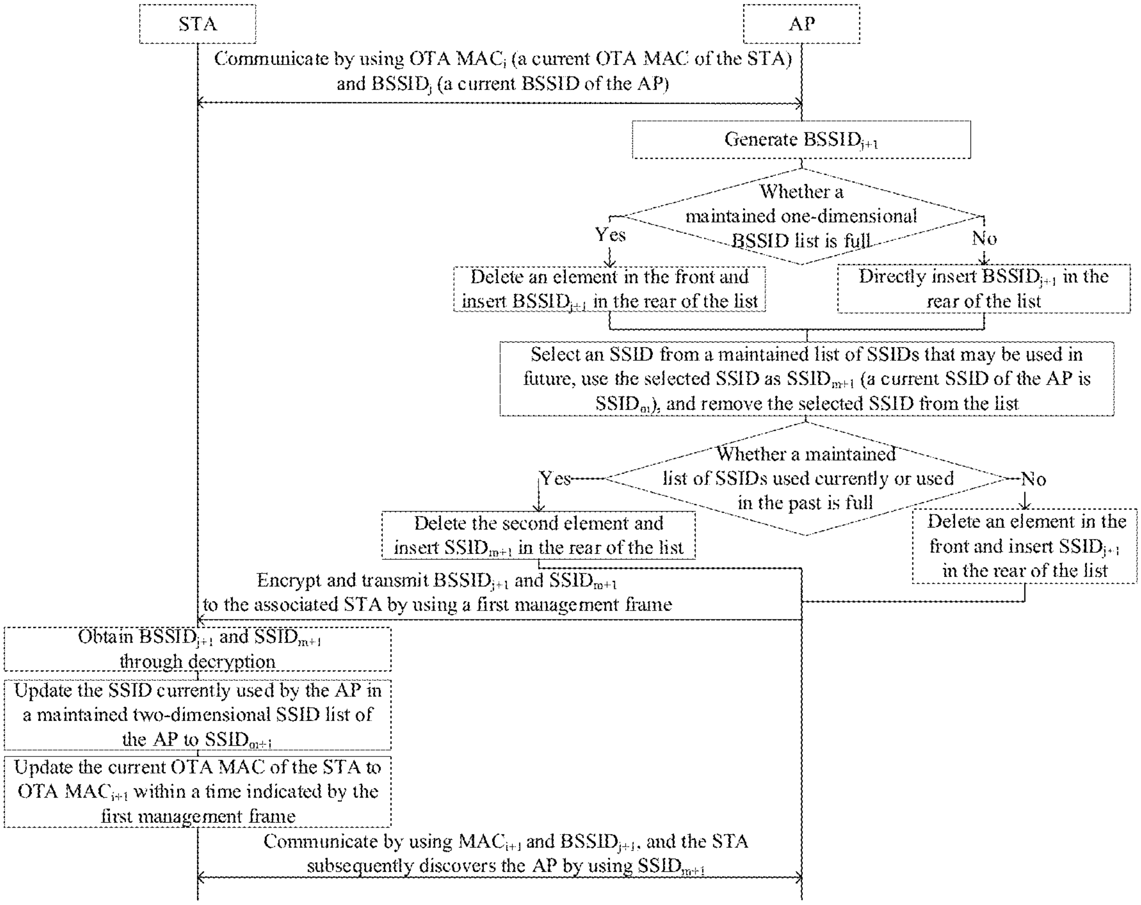
FIG. 17 is another schematic flowchart of updating an SSID and a BSSID by an AP according to an embodiment of this application.

In some implementations, a procedure for updating a BSSID and an SSID by an AP may be shown in FIG. 17. A specific procedure may include some or all of the following steps S30 to S39.

In step S30, an STA communicates with an AP by using OTA $MAC_i$ (a current OTA MAC of the STA) and $BSSID_j$ (a current BSSID of the mobile AP).

In step S31, the AP generates a new BSSID, that is, $BSSID_{j+1}$.

In step S32, the AP checks whether a second list (one-dimensional BSSID list) maintained by the AP is full. If the second list is full, the AP deletes an element at a header of the list and inserts $BSSID_{j+1}$ in at a tail of the list; or if the second list is not full, the AP directly inserts $BSSID_{j+1}$ at the tail of the list. Because the AP maintains a BSSID used in a previous period of time in the second list, before the STA communicates by using a new OTA MAC and a new BSSID, a message transmitted by the STA by using the old BSSID can still be identified and received by the AP, thereby ensuring that communication of the STA associated with the AP is not interrupted when the AP changes the BSSID of the AP.

In step S33, the AP selects an SSID from a third list (a list of SSIDs that may be used in future) maintained by the AP, as $SSID_{m+1}$ (a current SSID of the AP is $SSID_m$), and removes the selected SSID from the third list. When the third list is empty, a batch of new SSIDs are generated.

In step S34, the AP checks whether a first list (a list of SSIDs used currently or used in the past) maintained by the AP is full. If the first list is full, the AP deletes the second element and inserts $SSID_{m+1}$ at the tail of the list; or if the first list is not full, the AP directly inserts $SSID_{m+1}$ at the tail of the list. After the first list becomes full and if the AP updates the SSID of the AP, the second element of the first list is deleted because the first list is dynamically changed. If the STA does not access the AP for a long time, the SSID currently used by the AP and stored in a two-dimensional list of the STA (as shown in FIG. 11) may not be included in an SSID list maintained by the AP. In this case, the STA may access the AP by using $SSID_1$, so the AP always stores an initial SSID of the AP.

In step S35, the AP transmits $BSSID_{j+1}$ and $SSID_{m+1}$ to the associated STA by using the first management frame shown in FIG. 7 (the first management frame is a protected management frame). The value of the new SSID present field in the first management frame is "1" (indicating that the first management frame includes the new SSID field, and the new SSID field carries the new $SSID_{now}$), the value of the new BSSID present field is "1" (indicating that the first management frame includes the new BSSID field, and the new BSSID field carries $BSSID_{j+1}$), and the value of the update time present field is "1" (indicating that the first management frame includes the update time field, and the update time field carries the first duration).

In step S36, after receiving the first management frame, the STA obtains $BSSID_j$+1 and $SSID_{m+1}$ by decrypting the first management frame.

In step S37, the STA updates the SSID currently used by the AP in the two-dimensional list (as shown in FIG. 11) maintained by the STA to $SSID_{m+1}$.

In step S38, the STA updates a currently used OTA MAC address to OTA $MAC_{i+1}$ within a time (that is, the first duration) indicated by the first management frame.

In step S39, the STA communicates with the AP by using OTA $MAC_{i+1}$ and $BSSID_{j+1}$, and the STA subsequently discovers the AP by using $SSID_{m+1}$.

In some implementations of Embodiment 3, the AP transmits a second management frame to the STA.

A control field in the second management frame includes an initial SSID present field, the initial SSID present field is used to indicate whether an initial SSID field is included in the second management frame, and the initial SSID field carries an initial SSID of the AP.

In some implementations, in a case in which an SSID used by the STA when establishing an association with the AP is the initial SSID, the initial SSID present field is used to indicate that the initial SSID field is not included in the second management frame; or in a case in which an SSID used by the STA when establishing an association with the AP is not the initial SSID, the initial SSID present field is used to indicate that the initial SSID field is included in the second management frame.

Figure 18:
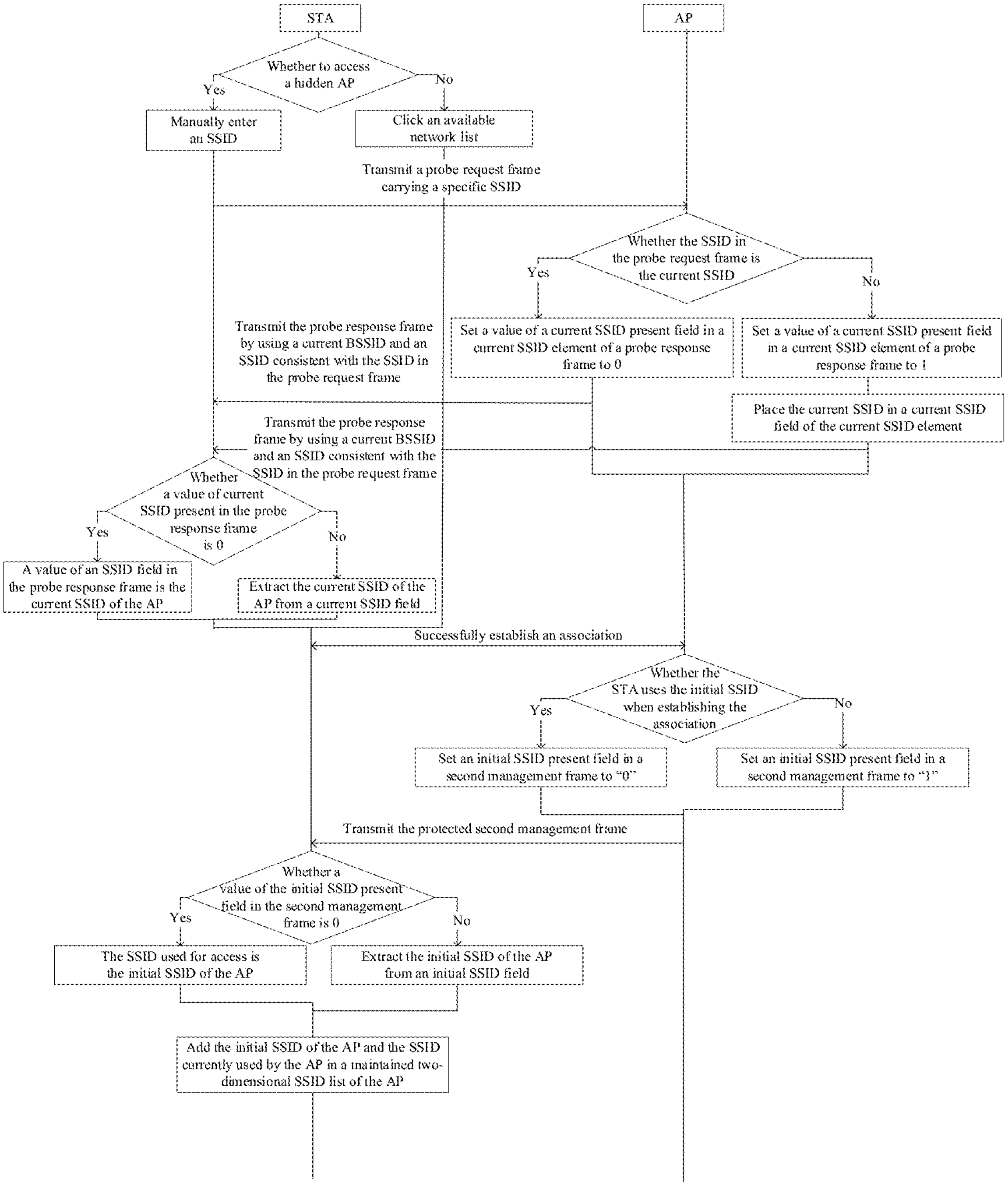
FIG. 18 is another schematic flowchart showing a process that a STA accesses an AP that supports an SSID privacy enhancement function for the first time according to an embodiment of this application.

In some implementations, an AP that supports an SSID privacy enhancement function may indicate an initial SSID to a STA by using a management frame after the STA accesses the AP for the first time. Specifically, a procedure for accessing the AP that supports the SSID privacy enhancement function by the STA for the first time may be shown in FIG. 18. A specific procedure may include some or all of the following steps S41 to S45.

In step S41, an STA accesses a new AP that supports an SSID privacy enhancement function by manually entering an SSID or clicking an available network list (a currently detected network list) by a user. If the STA accesses the new AP that implements the SSID privacy enhancement function by clicking the available network list, the AP has notified the STA of a BSSID and an SSID currently used by the AP in a beacon frame or a probe response frame (in response to a probe request frame carrying a wildcard SSID), and the STA directly accesses the AP. If the STA accesses the new AP that implements the SSID privacy enhancement function by manually entering an SSID by a user, the STA first broadcasts a probe request frame carrying a specific SSID. When the AP receives the probe request frame and if an SSID in the received probe request frame carrying the specific SSID is the current SSID of the AP, the AP sets a value of a current SSID present field in a current SSID element of the probe response frame to be 0. Alternatively, if an SSID in the received probe request frame carrying the specific SSID is not the current SSID of the AP, the AP sets the value of the current SSID present field in the current SSID element of the probe response frame to be 1, and places the current SSID (which may also be encrypted and transmitted) in a current SSID field of the current SSID element. Then, the AP transmits the probe response frame to the STA by using the current BSSID and an SSID consistent with the SSID in the probe request frame. After the STA receives the probe response frame and if a value of a current SSID present field in the probe response frame is 1, a value of an SSID field in the received probe response frame is the current SSID of the AP. Alternatively, if the value of the current SSID present field in the probe response frame is not 1, the STA extracts the current SSID of the AP from a current SSID field (if the current SSID of the AP is encrypted and transmitted, the current SSID of the AP is obtained by decryption in the foregoing manner), and the STA accesses the AP by using the current BSSID and the current SSID of the AP.

In step S42, the AP determines whether the STA accesses the AP by using an initial SSID. If the STA accesses the AP by using the initial SSID, the AP sets the value of the initial SSID present field in the second management frame shown in FIG. 9 to be “0” (that is, the second management frame does not include an initial SSID field); or if the STA does not access the AP by using the initial SSID, the AP sets the value of the initial SSID present field to be “1” (that is, the second management frame includes the initial SSID field). In addition, the AP places a current SSID in the initial SSID field.

In step S43, the AP indicates the initial SSID to the STA by using the second management frame shown in FIG. 9 (the frame is a protected management frame).

In step S44, the STA determines whether the value of the initial SSID present field in the second management frame is 0. If the value of the initial SSID present field in the second management frame is 0, an SSID used by the STA when accessing the AP is the initial SSID of the AP; or if the value of the initial SSID present field in the second management frame is not 0, the STA extracts the initial SSID of the AP from the initial SSID field.

In step S45, the STA adds the initial SSID of the AP and the current SSID of the AP in a two-dimensional SSID list (as shown in FIG. 11).

Therefore, in embodiments of this application, an AP autonomously updates an SSID and a BSSID of the AP, to prevent an attacker from identifying and tracking a user corresponding to the AP by using the SSID or the BSSID. Specifically, the AP locally maintains a first list. The first list includes a current SSID and at least one previously used SSID of the AP. As long as an SSID in a received probe request frame is included in the first list, the AP responds, thereby ensuring that a STA that connected to the AP in the past but does not know the SSID currently used by the AP can still detect the AP by using an old SSID. Specifically, the AP locally maintains a second list, where the second list includes a current BSSID and at least one previously used BSSID of the AP. Therefore, when the AP changes the BSSID of the AP, a message that carries the old BSSID and that is transmitted by a STA can be identified and received by the AP because the BSSID used in a previous period of time is saved, thereby ensuring that communication of a STA that is being associated or has been associated with the AP is not interrupted when the AP updates the BSSID of the AP.

Figure 19:
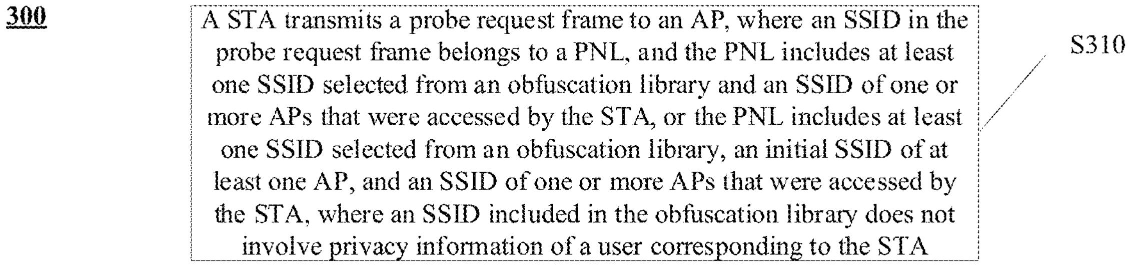
FIG. 19 is a schematic flowchart of another wireless communication method according to an embodiment of this application.

FIG. 19 is a schematic flowchart of a wireless communication method 300 according to an embodiment of this application. As shown in FIG. 19, the wireless communication method 300 may include at least step S130.

In step S310, an STA transmits a probe request frame to an AP, where an SSID in the probe request frame belongs to a PNL, and the PNL includes at least one SSID selected from an obfuscation library and an SSID of one or more APs that were accessed by the STA, or the PNL includes at least one SSID selected from an obfuscation library, an initial SSID of at least one AP, and an SSID of one or more APs that were accessed by the STA, where an SSID included in the obfuscation library does not involve privacy information of a user corresponding to the STA.

In this embodiment of this application, the STA maintains an SSID obfuscation library. An SSID in the SSID obfuscation library has features such as involving no user privacy and containing a specific semantic meaning. The STA executes a probe of a specified SSID by using both an SSID of an AP to which the STA was connected and an SSID in the obfuscation library, thereby ensuring that an attacker cannot identify and track the user corresponding to the STA by using content of an SSID and a sequence of different SSIDs in the probe of the specified SSID of the STA.

In some embodiments, an SSID in the obfuscation library includes but is not limited to at least one of the following:

an SSID detected from surroundings, a randomly generated SSID, or an SSID in an SSID library provided by an upper-layer application program.

In this embodiment of this application, a “field” may also be referred to as a “field (field)” or a “subfield (subfield)”. One field may occupy one or more bytes (byte/octet), or one field may occupy one or more bits (bit).

In some embodiments, the AP in this embodiment supports an SSID privacy enhancement function, or the AP in this embodiment is a mobile AP that implements the SSID privacy enhancement function, or the AP in this embodiment is an AP that supports a variable SSID, or the AP in this embodiment is a privacy enhanced AP. The AP may be, for example, a mobile phone hotspot or a vehicle-mounted access point.

In some embodiments, the AP in this embodiment does not support the SSID privacy enhancement function, or the AP in this embodiment is an AP that supports a fixed SSID. For example, the AP is a conventional AP.

In some implementations, in a case in which the STA is not associated with the AP within a period of time, the STA uses at least one SSID selected from the obfuscation library, an initial SSID of at least one AP, and an SSID of one or more APs that were accessed by the STA, as a PNL of the STA.

In some implementations, in a case in which the PNL includes at least one SSID selected from the obfuscation library and an SSID of one or more APs that were accessed by the STA, and the STA attempts to access the AP for a plurality of times but fails to access the AP, the STA again uses at least one SSID selected from the obfuscation library, an initial SSID of at least one AP, and an SSID of one or more APs that were accessed by the STA, as a PNL of the STA.

The following describes in detail the technical solution of the wireless communication method 300 in this application by using specific embodiments, that is, Embodiment 4 to Embodiment 6.

Embodiment 4: A New SSID is Derived from an Old SSID

In Embodiment 4, an STA locally maintains at least one of the following: an obfuscation library, a fourth list, and a sixth list.

Figure 20:
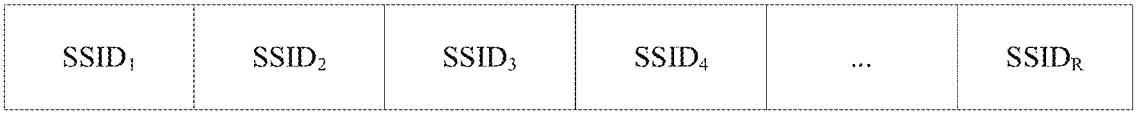
FIG. 20 is a schematic diagram of an obfuscation library according to an embodiment of this application.

In Embodiment 4, the obfuscation library may be a one-dimensional list with a length of R. At initial time, the obfuscation library includes R SSIDs, and the R SSIDs do not involve privacy information of a user corresponding to the STA, where R is a positive integer, as shown in FIG. 20. For example, R=100, or R=200, or R is another value.

In Embodiment 4, the fourth list includes at least W SSIDs of an AP, and the W SSIDs include an initial SSID of the AP, a current SSID of the AP, and S SSIDs to be used by the AP in future. The S SSIDs are generated based on the current SSID of the AP and first secret information, both W and S are positive integers, and W>S. The first secret information is common secret information between the AP and the STA. Optionally, the fourth list further includes an SSID of at least one another AP that supports an SSID privacy enhancement function, and the SSID of the another AP includes an initial SSID of the another AP, a current SSID of the another AP, and a plurality of SSIDs to be used by the another AP in future. Specifically, for example, the fourth list may be shown in FIG. 5. For example, S=50, or S=80, or S=100. Certainly, S may also be equal to another value, which is not limited in this embodiment.

Specifically, for example, the STA maintains the fourth list shown in FIG. 5. The fourth list includes SSIDs of m APs (or referred to as mobile APs or APs that support a variable SSID) that support the SSID privacy enhancement function. In FIG. 5, S=n−2. Specifically, a length of the fourth list (that is, a value of m in FIG. 5) is a quantity of APs that support the SSID privacy enhancement function and that are accessed by the STA.

Figure 21:
FIG. 21 is a schematic diagram of a sixth list according to an embodiment of this application.

In Embodiment 4, the sixth list includes a plurality of SSIDs of APs that do not support the SSID privacy enhancement function, and a quantity of SSIDs in the sixth list is equal to a quantity of APs that do not support the SSID privacy enhancement function and that are accessed by the STA, as shown in FIG. 21. It should be noted that an AP that does not support the SSID privacy enhancement function may be a conventional AP.

In some implementations, the first secret information may be a network key or a key derived from a network key.

In some implementations of Embodiment 4, an SSID in a probe request frame is the current SSID of the AP, or the SSID in the probe request frame is an SSID used when the STA accessed the AP. The SSID used when the STA accessed the AP may be the initial SSID, or may be another SSID.

In some implementations of Embodiment 4, the STA receives a first frame transmitted by the AP, where an SSID element in the first frame carries the current SSID of the AP, and a transmitter address of the first frame is a current BSSID of the AP.

In some implementations, in a case in which the AP supports the SSID privacy enhancement function, the current SSID is the initial SSID of the AP at initial time, and the current SSID is generated based on a previous SSID of the current SSID and first secret information at non-initial time. The first secret information is common secret information between the AP and the STA.

In some implementations, the S SSIDs being generated based on the current SSID of the AP and the first secret information includes:

the first SSID in the S SSIDs is generated based on the current SSID and the first secret information, and the $(i+1)^{th}$ SSID in the S SSIDs is generated based on the $i^{th}$ SSID and the first secret information;

where i is a positive integer, and $1 \le i \le S-1$.

In some implementations, the STA compares the current SSID of the AP carried in the first frame with W SSIDs of the AP in the fourth list. In a case in which the current SSID of the AP carried in the first frame is an SSID to be used by the AP in future in the fourth list, the STA converts an SSID of the AP into the initial SSID of the AP in an available network list, and the STA updates the current SSID of the AP and the S SSIDs to be used by the AP in future in the fourth list. Alternatively, in a case in which the current SSID of the AP carried in the first frame is the current SSID of the AP in the fourth list, the STA associates the SSID carried in the first frame with the current SSID of the AP in the fourth list.

In some implementations of Embodiment 4, the AP generates a new $SSID_{now}$ ($SSID_{now}$ is the SSID currently used by the AP) according to a specific rule. For example, a new $SSID_{now}$ may be generated in the following manner: concatenating common secret information (for example, using a network key or a key derived from a network key) between the AP and the STA that has accessed the AP with a value of $SSID_{now}$, performing hashing on a concatenating result, and using a result of the hashing as a new $SSID_{now}$ of the AP (as long as a length of the new $SSID_{now}$ is greater than 0 and less than 32 bytes), or using a part of the result of the hashing as a new $SSID_{now}$ of the AP (as long as a length of the new $SSID_{now}$ is greater than 0 and less than 32 bytes). For another example, a new $SSID_{now}$ may be generated in the following manner: using an HKDF algorithm or a PBKDF algorithm, using common secret information between the AP and the STA that has accessed the AP (for example, using a network key or a key derived from a network key) and a value of $SSID_{now}$ as an input, and using an output of the algorithm as a new $SSID_{now}$ of the AP. Optionally, the output of the HKDF algorithm or the PBKDF algorithm may be Base64 encoded into a visible character string, serving as a new $SSID_{now}$ of the AP. The common secret information between the AP and the STA that has accessed the AP ensures that a STA that fails to access the AP cannot know an $SSID_{now}$ to be used in future of the AP.

In some implementations of Embodiment 4, an STA that has accessed an AP (for example, an AP that supports an SSID privacy enhancement function) locally generates and stores S SSIDs (for example, S may be 100) to be used by the AP in future according to a same rule as the AP, for example, the fourth list shown in FIG. 5. Specifically, a process of generating $AP_i$-$SSID_j$ includes: performing calculation on common secret information (for example, using a network key or a key derived from a network key) between the AP and the STA that has accessed the AP and $AP_i$-$SSID_{j-1}$ according to the foregoing rule, and using a result of the calculation as $AP_i$-$SSID_j$ of the AP. After the STA receives a beacon frame or a probe response frame transmitted by the AP that supports the SSID privacy enhancement function, the STA compares an SSID in the beacon frame or the probe response frame with values of all SSIDs in the fourth list (as shown in FIG. 5) of the AP locally maintained by the STA. In a case in which the SSID in the beacon frame or the probe response frame is included in the fourth list, the STA associates the SSID in the fourth list with the AP. If the SSID in the beacon frame or the probe response frame is an SSID (denoted as $AP_i$-$SSID_j$) to be used by an AP in future in the fourth list, the STA converts the SSID of the AP into an initial SSID corresponding to the AP in a displayed available network list, and updates values of SSIDs that are currently used and to be used in future corresponding to the AP and locally stored by the STA. A process of the updating includes: deleting SSIDs between $AP_i$-$SSID_2$ and $AP_i$-$SSID_{j-1}$ (including $AP_i$-$SSID_2$ to $AP_i$-$SSID_{j-1}$), and generating new SSIDs according to the foregoing manner of generating $AP_i$-$SSID_j$ until the fourth list is filled with S SSIDs to be used in future corresponding to the AP. If the SSID in the beacon frame or the probe response frame is not included in the fourth list, the STA ignores the beacon frame or the probe response frame, thereby ensuring that after an AP changes an SSID of the AP within a period during which a STA or some STAs that accessed the AP are not associated with the AP, the STA or STAs may associate, through a passive scan or a probe of a wildcard SSID, a mobile new SSID with an old SSID currently used by the AP and maintained by the STA or STAs.

Figure 22:
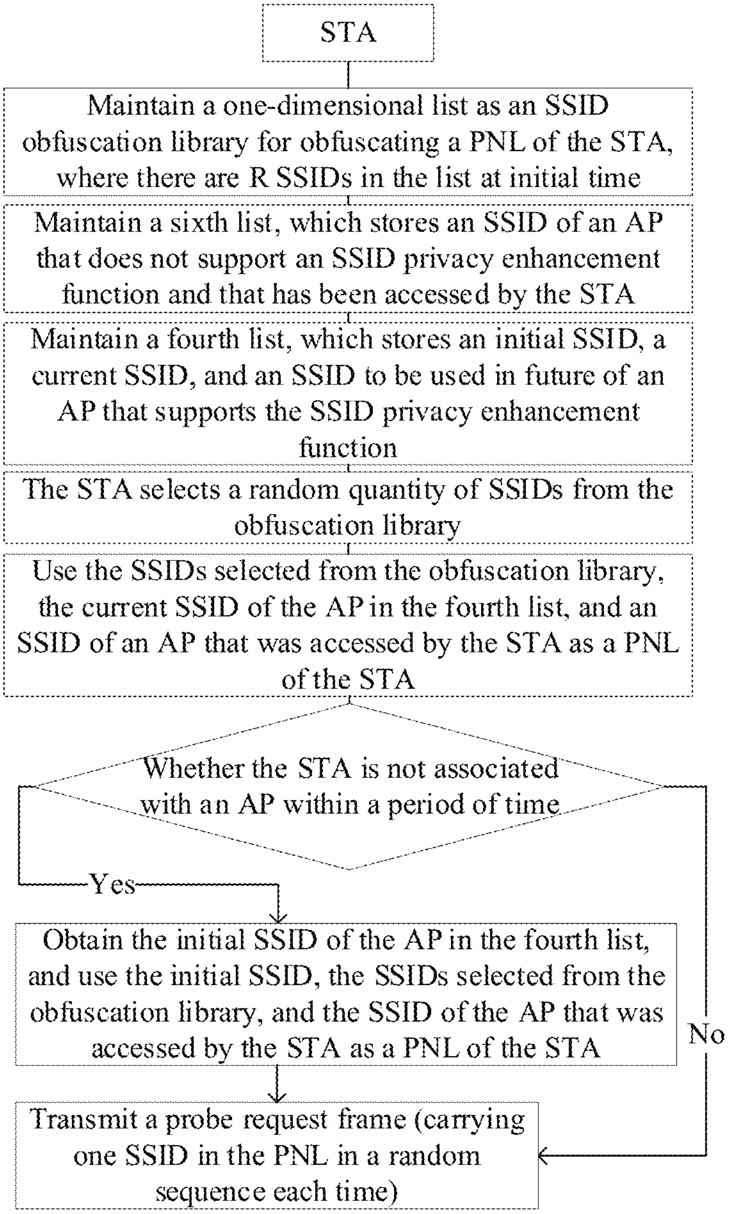
FIG. 22 is a schematic flowchart showing a process that a STA initializes a PNL and discovers an AP that supports an SSID privacy enhancement function by using the PNL according to an embodiment of this application.

In some implementations, a procedure for initializing a PNL and discovering an AP that supports an SSID privacy enhancement function by using the PNL by a STA may be shown in FIG. 22. Specifically, a STA selects a random quantity of SSIDs from an obfuscation library; the STA uses the SSIDs selected from the obfuscation library, a current SSID of an $AP_i$ in the fourth list, and an SSID of an AP that was accessed by the STA, as a PNL of the STA; and the STA checks whether the STA is not associated with an AP within a period of time. If the STA is not associated with an AP within a period of time, the STA obtains an initial SSID of an AP that implements the SSID privacy enhancement function in the fourth list, and uses the initial SSID, the SSIDs selected from the obfuscation library, and the SSID of the AP that was accessed by the STA, as a new PNL of the STA. Alternatively, if the STA is associated with an AP within the period of time, the STA does not generate a new PNL. The STA transmits a plurality of probe request frames (carrying one SSID in the PNL in a random sequence each time).

It should be noted that FIG. 22 is described by using an example in which a STA discovers an AP that supports an SSID privacy enhancement function by using a PNL. A procedure for discovering an AP that does not support an SSID privacy enhancement function by a STA by using a PNL is similar to the procedure shown in FIG. 22, and only the fourth list needs to be replaced with a sixth list. Details are not described herein again.

In some implementations of Embodiment 4, the first frame is a beacon frame or a probe response frame. Specifically, after updating the BSSID and the SSID of the AP, the AP always uses only the current SSID of the AP in a beacon frame or a probe response frame. In this way, an attacker cannot associate the old SSID of the AP with the new SSID of the AP, or the attacker cannot associate the old BSSID of the AP with the new BSSID of the AP.

In some implementations of Embodiment 4, a capability information (Capability information) element in the first frame includes a first bit, and a value of the first bit is used to indicate that the AP supports the SSID privacy enhancement function. Optionally, the first bit is a reserved bit in the capability information element of the first frame. The reserved bit in the capability information element of the first frame may be the $15^{th}$ bit and the $16^{th}$ bit.

Specifically, for example, the AP sets a value of the $15^{th}$ bit or the $16^{th}$ bit in the capability information element of the first frame to be “1”, which is used to indicate that the AP is an AP that supports the SSID privacy enhancement function. Alternatively, the AP sets the value of the $15^{th}$ bit or the $16^{th}$ bit of the capability information element of the first frame to be “0”, which is used to indicate that the AP is an AP that supports the SSID privacy enhancement function.

In some implementations of Embodiment 4, the AP checks whether the AP is set to be a hidden AP. If the AP is set to be a hidden AP, the AP does not carry the current SSID of the AP in an SSID element of a beacon frame of the AP. If the AP is not set to be a hidden AP, the AP carries the current SSID of the AP in the SSID element of the beacon frame of the AP.

In some implementations of Embodiment 4, when the AP receives a probe request frame carrying a wildcard SSID (wildcard SSID) and the AP is not set to be a hidden AP, the AP responds with a probe response frame carrying the SSID and the BSSID currently used by the AP, to indicate the presence of the AP. When receiving a probe request frame whose SSID field value is the SSID currently used by the AP, the AP responds with a probe response frame carrying the SSID and the BSSID currently used by the AP, to indicate the presence of the AP.

Specifically, for example, as shown in FIG. 6, an AP locally maintains a first list and a second list, and the AP checks whether the AP is set to be a hidden AP. If the AP is set to be a hidden AP, an SSID element in a beacon frame of the AP does not carry a current SSID of the AP. If the AP is not set to be a hidden AP, an SSID element in a beacon frame of the AP carries the current SSID of the AP. The AP sets a value of the $15^{th}$ bit of a capability information element in a frame body of a beacon frame or a probe response frame to be “1”, which is used to indicate that the AP supports an SSID privacy enhancement function.

In some implementations of Embodiment 4, after the current SSID and a current BSSID are updated, the AP transmits a first management frame to a STA, where the first management frame is a protected management frame, and the first management frame includes a new SSID and a new BSSID. That is, the AP generates a new SSID according to the current SSID, and the AP generates a new BSSID. After the current SSID and the current BSSID are updated, the AP indicates the new SSID and the new BSSID to the STA by using the first management frame.

It should be noted that the first management frame is a protected management frame, that is, a frame body of the first management frame is an encrypted frame body.

Optionally, the first management frame is an action (Action) frame. Because a value range "30-125" of a category (Category) field in the action frame is reserved, any value (for example, "30") is selected from the range to indicate the first management frame in this embodiment.

In some implementations of Embodiment 4, the first management frame includes a control field, a new SSID field, a new BSSID field, and an update time field. The control field includes a new SSID present field, a new BSSID present field, and an update time present field, a value of the new SSID present field is used to indicate that the first management frame includes the new SSID field, a value of the new BSSID present field is used to indicate that the first management frame includes the new BSSID field, and a value of the update time present field is used to indicate that the first management frame includes the update time field. The new SSID field carries the new SSID, the new BSSID field carries the new BSSID, and the update time field carries first duration. The STA updates a currently used OTA MAC address within the first duration; and after the OTA MAC address is updated, the STA communicates with the AP by using an updated OTA MAC address and the new BSSID, and the STA discovers the AP by using the new SSID.

Specifically, the new SSID present (New SSID Present) field is used to indicate whether the first management frame includes the new SSID (New SSID) field. Specifically, for example, the new SSID present field occupies one bit (or may occupy another quantity of bits). If the new SSID present field is set to be 1, it indicates that the first management frame includes the new SSID field; or if the new SSID present field is set to be 0, it indicates that the first management frame does not include the new SSID field. Alternatively, if the new SSID present field is set to be 0, it indicates that the first management frame includes the new SSID field; or if the new SSID present field is set to be 1, it indicates that the first management frame does not include the new SSID field.

Specifically, the new BSSID present (New BSSID Present) field is used to indicate whether the first management frame includes the new BSSID (New BSSID) field. Specifically, for example, the new BSSID present field occupies one bit (or may occupy another quantity of bits). If the new BSSID present field is set to be 1, it indicates that the first management frame includes the new BSSID field; or if the new BSSID present field is set to be 0, it indicates that the first management frame does not include the new BSSID field. Alternatively, if the new BSSID present field is set to be 0, it indicates that the first management frame includes the new BSSID field; or if the new BSSID present field is set to be 1, it indicates that the first management frame does not include the new BSSID field.

Specifically, the update time present field is used to indicate whether the first management frame includes the update time field. Specifically, for example, the update time present field occupies one bit (or may occupy another quantity of bits). If the update time present field is set to be 1, it indicates that the first management frame includes the update time field; or if the update time present field is set to be 0, it indicates that the first management frame does not include the update time field. Alternatively, if the update time present field is set to be 0, it indicates that the first management frame includes the update time field; or if the update time present field is set to be 1, it indicates that the first management frame does not include the update time field.

Specifically, for example, a first management frame may be shown in FIG. 7. A control field of the first management frame may include a new SSID present field (occupying one bit), a new SSID length field (occupying five bits), a new BSSID present field (occupying one bit), and an update time present field (occupying one bit). A value of the new SSID present field is used to indicate that the first management frame includes a new SSID field, the new SSID length field is used to indicate a new SSID length, a value of the new BSSID present field is used to indicate that the first management frame includes a new BSSID field, and a value of the update time present field is used to indicate that the first management frame includes an update time field. The new SSID field carries a new SSID, the new BSSID field carries a new BSSID, and the update time field carries first duration. An STA updates a currently used OTA MAC address within the first duration; and after the OTA MAC address is updated, the STA communicates with an AP by using an updated OTA MAC address and the new BSSID, and the STA discovers the AP by using the new SSID.

In some implementations, a procedure for updating a BSSID and an SSID by an AP may be shown in FIG. 8. For details, one may refer to the foregoing related descriptions about FIG. 8. Details are not described herein again.

In some implementations of Embodiment 4, the STA receives a second management frame transmitted by the AP. A control field in the second management frame includes an initial SSID present field, the initial SSID present field is used to indicate whether an initial SSID field is included in the second management frame, and the initial SSID field carries an initial SSID of the AP.

In some implementations, in a case in which an SSID used by the STA when establishing an association with the AP is the initial SSID, the initial SSID present field is used to indicate that the initial SSID field is not included in the second management frame.

In some implementations, in a case in which an SSID used by the STA when establishing an association with the AP is not the initial SSID, the initial SSID present field is used to indicate that the initial SSID field is included in the second management frame.

Specifically, the initial SSID present (Initial SSID Present) field is used to indicate whether the second management frame includes the initial SSID (Initial SSID) field. Specifically, for example, the initial SSID present field occupies one bit (or may occupy another quantity of bits). If the initial SSID present field is set to be 1, it indicates that the second management frame includes the initial SSID field; or if the initial SSID present field is set to be 0, it indicates that the second management frame does not include the initial SSID field. Alternatively, if the initial SSID present field is set to be 0, it indicates that the second management frame includes the initial SSID field; or if the initial SSID present field is set to be 1, it indicates that the second management frame does not include the initial SSID field.

Optionally, the second management frame is a protected management frame, that is, a frame body of the second management frame is an encrypted frame body. The second management frame is an action (Action) frame. Because a value range "30-125" of a category (Category) field in the action frame is reserved, any value (for example, "30") is selected from the range to indicate the second management frame in this embodiment.

Specifically, for example, a second management frame may be shown in FIG. 9. A control field of the second management frame includes an initial SSID present field (occupying one bit) and an initial SSID length field (occupying five bits). The initial SSID present field is used to indicate whether the second management frame includes an initial SSID field, and the initial SSID length field is used to indicate a length of an initial SSID. In a case in which a value of the initial SSID present field is used to indicate that the second management frame includes the initial SSID field (that is, the initial SSID field occupies 32 bytes), the initial SSID length field occupies five bits. Alternatively, in a case in which a value of the initial SSID present field is used to indicate that the second management frame does not include the initial SSID field (that is, the initial SSID field occupies zero bytes), the initial SSID length field is a reserved field (that is, each bit in the field is set to be 0).

In some implementations, an AP that supports the SSID privacy enhancement function may indicate an initial SSID to a STA by using a management frame after the STA accesses the AP for the first time. Specifically, a procedure for accessing the AP that supports the SSID privacy enhancement function by the STA for the first time may be shown in FIG. 10. For details, one may refer to the foregoing related descriptions about FIG. 10. Details are not described herein again.

Embodiment 5: A New SSID is Generated by Using a Random Number and a Key

In Embodiment 5, an STA locally maintains at least one of the following: an obfuscation library, a fifth list, and a sixth list.

In Embodiment 5, the obfuscation library may be a one-dimensional list with a length of R. At initial time, the obfuscation library includes R SSIDs, and the R SSIDs do not involve privacy information of a user corresponding to the STA, where R is a positive integer, as shown in FIG. 20. For example, R=100, or R=200, or R is another value.

In Embodiment 5, the fifth list includes initial SSIDs and current SSIDs of a plurality of APs that support an SSID privacy enhancement function, and the plurality of APs include the AP. Specifically, as shown in FIG. 11, the first row of the fifth list stores an initial SSID of an AP that supports the SSID privacy enhancement function, the second row of the fifth list stores a current SSID of the AP that supports the SSID privacy enhancement function, and a length of the fifth list is a quantity of APs that support the SSID privacy enhancement function and that are accessed by the STA.

In Embodiment 5, the sixth list includes a plurality of SSIDs of APs that do not support the SSID privacy enhancement function, and a quantity of SSIDs in the sixth list is equal to a quantity of APs that do not support the SSID privacy enhancement function and that are accessed by the STA, as shown in FIG. 21. It should be noted that an AP that does not support the SSID privacy enhancement function may be a conventional AP.

In some implementations of Embodiment 5, an SSID in a probe request frame is the current SSID of the AP, or the SSID in the probe request frame is an SSID used when the STA accessed the AP. The SSID used when the STA accessed the AP may be the initial SSID, or may be another SSID.

In some implementations of Embodiment 5, the STA receives a first frame transmitted by the AP, where an SSID element in the first frame carries the current SSID of the AP, and a transmitter address of the first frame is a current BSSID of the AP.

In some implementations of Embodiment 5, in a case in which the AP supports the SSID privacy enhancement function, the SSID element in the first frame includes a random number field, the random number field carries a random number corresponding to the current SSID, the current SSID is an initial SSID of the AP at initial time, the current SSID is generated based on the random number corresponding to the current SSID and first secret information at non-initial time, and the first secret information is common secret information between the AP and the STA. For example, the SSID element may be shown in FIG. 12.

In some implementations of Embodiment 5, the AP generates a new $SSID_{now}$ ($SSID_{now}$ is the SSID currently used by the AP) according to a specific rule. For example, a new $SSID_{now}$ may be generated in the following manner: concatenating common secret information (for example, using a network key or a key derived from a network key) between the AP and the STA that has accessed the AP with a random number (generated randomly each time $SSID_{now}$ is updated), performing hashing on a concatenating result, and using a result of the hashing as a new $SSID_{now}$ of the AP (as long as a length of the new $SSID_{now}$ is greater than 0 and less than 32 bytes), or using a part of the result of the hashing as a new $SSID_{now}$ of the AP (as long as a length of the new $SSID_{now}$ is greater than 0 and less than 32 bytes). For another example, a new $SSID_{now}$ may be generated in the following manner: using an HKDF algorithm or a PBKDF algorithm, using common secret information between the AP and the STA that has accessed the AP (for example, using a network key or a key derived from a network key) and a value of a random number (generated randomly each time $SSID_{now}$ is updated) as an input, and using an output of the algorithm as a new $SSID_{now}$ of the AP. Optionally, the output of the algorithm may be Base64 encoded into a visible character string, serving as a new $SSID_{now}$ of the AP. The common secret information between the AP and the STA that has accessed the AP ensures that a STA that fails to access the AP cannot associate a current SSID, a past SSID, and a future SSID of the AP.

In some implementations of Embodiment 5, the STA determines a plurality of SSIDs based on the random number carried in the random number field and a plurality of pieces of secret information, where the plurality of pieces of secret information is common secret information between the STA and a plurality of APs that support the SSID privacy enhancement function and that are locally stored by the STA; and in a case in which an SSID of the plurality of SSIDs is consistent with the SSID carried in the first frame, the STA associates the SSID carried in the first frame with the current SSID of the AP.

Specifically, for example, a STA generates an SSID according to a same rule as the AP. It is assumed that a random number carried in a random number field is a random number 1, and common secret information between the STA and an AP1 is secret information 1. For example, the STA concatenates the secret information 1 with a value of the random number 1, performs hashing on concatenating result, and uses a result of the hashing as an SSID of the AP1 (as long as a length of the SSID is greater than 0 and less than 32 bytes), or uses a part of the result of the hashing as an SSID of the AP1 (as long as a length of the SSID is greater than 0 and less than 32 bytes). For another example, the STA uses an HKDF algorithm or a PBKDF algorithm, uses the secret information 1 and the random number 1 as an input, and uses an output of the algorithm as an SSID of the AP1. Optionally, the output of the algorithm may be Base64 encoded into a visible character string, serving as an SSID of the AP.

In some implementations of Embodiment 5, a capability information (Capability information) element in the first frame includes a first bit, and a value of the first bit is used to indicate that the AP supports the SSID privacy enhancement function. Optionally, the first bit is a reserved bit in the capability information element of the first frame. The reserved bit in the capability information element of the first frame may be the $15^{th}$ bit and the $16^{th}$ bit.

Specifically, for example, the AP sets a value of the $15^{th}$ bit or the $16^{th}$ bit in the capability information element of the first frame to be "1", which is used to indicate that the AP is an AP that supports the SSID privacy enhancement function. Alternatively, the AP sets the value of the $15^{th}$ bit or the $16^{th}$ bit of the capability information element of the first frame to be "0", which is used to indicate that the AP is an AP that supports the SSID privacy enhancement function.

In some implementations of Embodiment 5, the first frame is a beacon frame or a probe response frame. Specifically, after updating the BSSID and the SSID of the AP, the AP always uses only the current SSID of the AP in a beacon frame or a probe response frame. In this way, an attacker cannot associate the old SSID of the AP with the new SSID of the AP, or the attacker cannot associate the old BSSID of the AP with the new BSSID of the AP.

Figure 23:
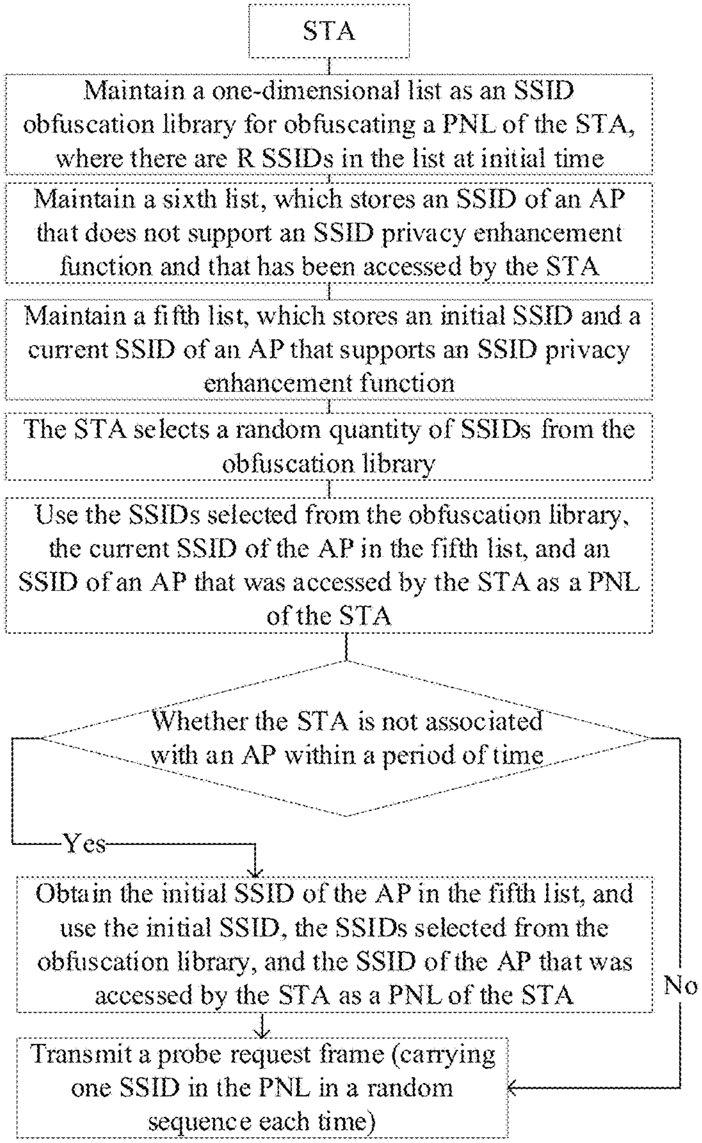
FIG. 23 is another schematic flowchart showing a process that a STA initializes a PNL and discovers an AP that supports an SSID privacy enhancement function by using the PNL according to an embodiment of this application.

In some implementations, a procedure for initializing a PNL and discovering an AP that supports an SSID privacy enhancement function by using the PNL by an STA may be shown in FIG. 23. Specifically, an STA selects a random quantity of SSIDs from an obfuscation library; the STA uses the SSIDs selected from the obfuscation library, a current SSID of an $AP_i$ in the fifth list, and an SSID of an AP that was accessed by the STA, as a PNL of the STA; and the STA checks whether the STA is not associated with an AP within a period of time. If the STA is not associated with an AP within a period of time, the STA obtains an initial SSID of an AP that implements the SSID privacy enhancement function in the fifth list, and uses the initial SSID, the SSIDs selected from the obfuscation library, and the SSID of the AP that was accessed by the STA, as a new PNL of the STA. Alternatively, if the STA is associated with the AP within the period of time, the STA does not generate a new PNL. The STA transmits a plurality of probe request frames (carrying one SSID in the PNL in a random sequence each time).

It should be noted that FIG. 23 is described by using an example in which an STA discovers an AP that supports the SSID privacy enhancement function by using a PNL. A procedure for discovering an AP that does not support an SSID privacy enhancement function by an STA by using a PNL is similar to the procedure shown in FIG. 23, and only the fifth list needs to be replaced with a sixth list. Details are not described herein again.

In some implementations of Embodiment 5, the AP checks whether the AP is set to be a hidden AP. If the AP is set to be a hidden AP, the AP does not carry the current SSID of the AP in an SSID element of a beacon frame of the AP. If the AP is not set to be a hidden AP, the AP carries the current SSID of the AP in the SSID element of the beacon frame of the AP.

In some implementations of Embodiment 5, when the AP receives a probe request frame carrying a wildcard SSID (wildcard SSID) and the AP is not set to be a hidden AP, the AP responds with a probe response frame carrying the SSID and the BSSID currently used by the AP, to indicate the presence of the AP. When receiving a probe request frame whose SSID field value is the SSID currently used by the AP, the AP responds with a probe response frame carrying the SSID and the BSSID currently used by the AP, to indicate the presence of the AP.

Specifically, for example, as shown in FIG. 6, an AP locally maintains a first list and a second list, and the AP checks whether the AP is set to be a hidden AP. If the AP is set to be a hidden AP, an SSID element in a beacon frame of the AP does not carry a current SSID of the AP. If the AP is not set to be a hidden AP, the SSID element in the beacon frame of the AP carries the current SSID of the AP. The AP sets a value of the $15^{th}$ bit of a capability information element in a frame body of a beacon frame or a probe response frame to be "1", which is used to indicate that the AP supports an SSID privacy enhancement function.

In some implementations of Embodiment 5, after the current SSID and the current BSSID are updated, the STA receives a first management frame transmitted by the AP, where the first management frame is a protected management frame, and the first management frame includes a new SSID and a new BSSID. That is, the AP generates a new SSID according to the current SSID, and the AP generates a new BSSID. After the current SSID and the current BSSID are updated, the AP indicates the new SSID and the new BSSID to the STA by using the first management frame.

It should be noted that the first management frame is a protected management frame, that is, a frame body of the first management frame is an encrypted frame body.

Optionally, the first management frame is an action (Action) frame. Because a value range "30-125" of a category (Category) field in the action frame is reserved, any value (for example, "30") is selected from the range to indicate the first management frame in this embodiment.

In some implementations of Embodiment 5, the first management frame includes a control field, a new SSID field, a new BSSID field, and an update time field. The control field includes a new SSID present field, a new BSSID present field, and an update time present field, a value of the new SSID present field is used to indicate that the first management frame includes the new SSID field, a value of the new BSSID present field is used to indicate that the first management frame includes the new BSSID field, and a value of the update time present field is used to indicate that the first management frame includes the update time field. The new SSID field carries the new SSID, the new BSSID field carries the new BSSID, and the update time field carries first duration. The STA updates a currently used OTA MAC address within the first duration; and after the OTA MAC address is updated, the STA communicates with the AP by using an updated OTA MAC address and the new BSSID, and the STA discovers the AP by using the new SSID.

Specifically, the new SSID present (New SSID Present) field is used to indicate whether the first management frame includes the new SSID (New SSID) field. Specifically, for example, the new SSID present field occupies one bit (or may occupy another quantity of bits). If the new SSID present field is set to be 1, it indicates that the first management frame includes the new SSID field; or if the new SSID present field is set to be 0, it indicates that the first management frame does not include the new SSID field. Alternatively, if the new SSID present field is set to be 0, it indicates that the first management frame includes the new SSID field; or if the new SSID present field is set to be 1, it indicates that the first management frame does not include the new SSID field.

Specifically, the new BSSID present (New BSSID Present) field is used to indicate whether the first management frame includes the new BSSID (New BSSID) field. Specifically, for example, the new BSSID present field occupies one bit (or may occupy another quantity of bits). If the new BSSID present field is set to be 1, it indicates that the first management frame includes the new BSSID field; or if the new BSSID present field is set to be 0, it indicates that the first management frame does not include the new BSSID field. Alternatively, if the new BSSID present field is set to be 0, it indicates that the first management frame includes the new BSSID field; or if the new BSSID present field is set to be 1, it indicates that the first management frame does not include the new BSSID field.

Specifically, the update time present field is used to indicate whether the first management frame includes the update time field. Specifically, for example, the update time present field occupies one bit (or may occupy another quantity of bits). If the update time present field is set to be 1, it indicates that the first management frame includes the update time field; or if the update time present field is set to be 0, it indicates that the first management frame does not include the update time field. Alternatively, if the update time present field is set to be 0, it indicates that the first management frame includes the update time field; or if the update time present field is set to be 1, it indicates that the first management frame does not include the update time field.

Specifically, for example, the first management frame may be shown in FIG. 7. A control field of the first management frame may include a new SSID present field (occupying one bit), a new SSID length field (occupying five bits), a new BSSID present field (occupying one bit), and an update time present field (occupying one bit). A value of the new SSID present field is used to indicate that the first management frame includes a new SSID field, the new SSID length field is used to indicate a new SSID length, a value of the new BSSID present field is used to indicate that the first management frame includes a new BSSID field, and a value of the update time present field is used to indicate that the first management frame includes an update time field. The new SSID field carries a new SSID, the new BSSID field carries a new BSSID, and the update time field carries first duration. An STA updates a currently used OTA MAC address within the first duration; and after the OTA MAC address is updated, the STA communicates with an AP by using an updated OTA MAC address and the new BSSID, and the STA discovers the AP by using the new SSID.

In some implementations, a procedure for updating a BSSID and an SSID by an AP may be shown in FIG. 8. For details, one may refer to the foregoing related descriptions about FIG. 8. Details are not described herein again.

In some implementations of Embodiment 5, the STA receives a second management frame transmitted by the AP, where a control field in the second management frame includes an initial SSID present field, the initial SSID present field is used to indicate whether an initial SSID field is included in the second management frame, and the initial SSID field carries an initial SSID of the AP.

In some implementations, in a case in which an SSID used by the STA when establishing an association with the AP is the initial SSID, the initial SSID present field is used to indicate that the initial SSID field is not included in the second management frame.

In some implementations, in a case in which an SSID used by the STA when establishing an association with the AP is not the initial SSID, the initial SSID present field is used to indicate that the initial SSID field is included in the second management frame.

Specifically, the initial SSID present (Initial SSID Present) field is used to indicate whether the second management frame includes the initial SSID (Initial SSID) field. Specifically, for example, the initial SSID present field occupies one bit (or may occupy another quantity of bits). If the initial SSID present field is set to be 1, it indicates that the second management frame includes the initial SSID field; or if the initial SSID present field is set to be 0, it indicates that the second management frame does not include the initial SSID field. Alternatively, if the initial SSID present field is set to be 0, it indicates that the second management frame includes the initial SSID field; or if the initial SSID present field is set to be 1, it indicates that the second management frame does not include the initial SSID field.

Optionally, the second management frame is a protected management frame, that is, a frame body of the second management frame is an encrypted frame body. The second management frame is an action (Action) frame. Because a value range "30-125" of a category (Category) field in the action frame is reserved, any value (for example, "30") is selected from the range to indicate the second management frame in this embodiment.

Specifically, for example, a second management frame may be shown in FIG. 9. A control field of the second management frame includes an initial SSID present field (occupying one bit) and an initial SSID length field (occupying five bits). The initial SSID present field is used to indicate whether the second management frame includes an initial SSID field, and the initial SSID length field is used to indicate a length of an initial SSID. In a case in which a value of the initial SSID present field is used to indicate that the second management frame includes the initial SSID field (that is, the initial SSID field occupies 32 bytes), the initial SSID length field occupies five bits. Alternatively, in a case in which a value of the initial SSID present field is used to indicate that the second management frame does not include the initial SSID field (that is, the initial SSID field occupies zero bytes), the initial SSID length field is a reserved field (that is, each bit in the field is set to be 0).

In some implementations, an AP that supports the SSID privacy enhancement function may indicate an initial SSID to a STA by using a management frame after the STA accesses the AP for the first time. Specifically, a procedure for accessing the AP that supports the SSID privacy enhancement function by the STA for the first time may be shown in FIG. 10. For details, one may refer to the foregoing related descriptions about FIG. 10. Details are not described herein again.

Embodiment 6: A New SSID is Selected from a Third List, where the Third List Includes at Least One SSID to be Used by an AP in Future In some implementations, the at least one SSID to be used by the AP in future includes but is not limited to at least one of the following:

- an SSID detected from surroundings, a randomly generated SSID, or an SSID in an SSID library provided by an upper-layer application program.

In Embodiment 6, the AP locally maintains the third list. Specifically, for example, as shown in FIG. 13, the third list may be a one-dimensional list with a length of k, and stores SSIDs to be used in future. There are k elements in total, where k is a positive integer. The elements in the third list may use an SSID detected from surroundings, or a randomly generated SSID, or an SSID in an SSID library provided by an upper-layer application program. At initial time, there are k SSIDs in the third list.

In some implementations of Embodiment 6, when the AP updates a current SSID and a current BSSID, the AP selects a new SSID (that is, a new current SSID) from the third list, and the AP generates a new BSSID (that is, a newly generated current BSSID).

In some implementations, the third list may be specified in a protocol, or the third list may be configured by the AP.

In Embodiment 6, an STA locally maintains at least one of the following: an obfuscation library, a fifth list, and a sixth list.

In Embodiment 6, the obfuscation library may be a one-dimensional list with a length of R. At initial time, the obfuscation library includes R SSIDs, and the R SSIDs do not involve privacy information of a user corresponding to the STA, where R is a positive integer, as shown in FIG. 20. For example, R=100, or R=200, or R is another value.

In Embodiment 6, the fifth list includes initial SSIDs and current SSIDs of a plurality of APs that support an SSID privacy enhancement function, and the plurality of APs include the AP. Specifically, as shown in FIG. 11, the first row of the fifth list stores an initial SSID of an AP that supports the SSID privacy enhancement function, the second row of the fifth list stores a current SSID of the AP that supports the SSID privacy enhancement function, and a length of the fifth list is a quantity of APs that support the SSID privacy enhancement function and that are accessed by the STA.

In some implementations of Embodiment 6, an SSID in a probe request frame is the current SSID of the AP, or the SSID in the probe request frame is an SSID used when the STA accessed the AP. The SSID used when the STA accessed the AP may be the initial SSID, or may be another SSID.

In some implementations, a procedure for initializing a PNL and discovering an AP that supports an SSID privacy enhancement function by using the PNL by an STA may be shown in FIG. 23. Specifically, an STA selects a random quantity of SSIDs from an obfuscation library; the STA uses the SSIDs selected from the obfuscation library, a current SSID of an $AP_i$ in the fifth list, and an SSID of an AP that was accessed by the STA, as a PNL of the STA; and the STA checks whether the STA is not associated with an AP within a period of time. If the STA is not associated with an AP within a period of time, the STA obtains an initial SSID of an AP that implements the SSID privacy enhancement function in the fifth list, and uses the initial SSID, the SSIDs selected from the obfuscation library, and the SSID of the AP that was accessed by the STA, as a new PNL of the STA. Alternatively, if the STA is associated with an AP within the period of time, the STA does not generate a new PNL. The STA transmits a plurality of probe request frames (carrying one SSID in the PNL in a random sequence each time).

It should be noted that FIG. 23 is described by using an example in which an STA discovers an AP that supports the SSID privacy enhancement function by using a PNL. A procedure for discovering an AP that does not support an SSID privacy enhancement function by an STA by using a PNL is similar to the procedure shown in FIG. 23, and only the fifth list needs to be replaced with a sixth list. Details are not described herein again.

In some implementations of Embodiment 6, the STA receives a second frame transmitted by the AP.

The second frame includes a current SSID element, the current SSID element is used to indicate that the AP supports the SSID privacy enhancement function, and the second frame carries a current SSID of the AP and a current BSSID of the AP.

In some implementations, a control field in the current SSID element includes a current SSID present (Current SSID Present) field, a value of the current SSID present field is used to indicate whether a current SSID field is included in the current SSID element, and the current SSID field carries the current SSID.

Specifically, for example, the current SSID present field occupies one bit (or may occupy another quantity of bits). If the current SSID present field is set to be 1, it indicates that the current SSID field is included in the current SSID element; or if the current SSID present field is set to be 0, it indicates that the current SSID field is not included in the current SSID element. Alternatively, if the current SSID present field is set to be 0, it indicates that the current SSID field is included in the current SSID element; or if the current SSID present field is set to be 1, it indicates that the current SSID field is not included in the current SSID element.

Optionally, in the second frame, "Element ID (Element ID)" field value equals to 255 and "Element ID Extension (Element ID Extension)" field value equals to 94 may be used to indicate that an information element is the "current SSID element (Current SSID Element)".

Specifically, the second frame (which may be a probe response frame or a beacon frame) may be shown in FIG. 15. If the value of the current SSID present field in the current SSID element is 0, it indicates that the current SSID field is not included in the current SSID element; or if the value of the current SSID present field is 1, it indicates that the current SSID field is included in the current SSID element. When "Element ID" is set to be 255, the "Element ID Extension" field ((94 to 255 are reserved and unused)) is included in the element. Herein, "Element ID" field value equals to 255 and "Element ID Extension" field value equals to 94 may be used to indicate that an information element is the "current SSID element". For example, an AP that implements the SSID privacy enhancement function carries a current SSID element in a probe response frame, and a value of the current SSID present field is 0 or 1. In a medium access control (Media Access Control, MAC) header of a probe request frame transmitted by the STA, an address 1 (which may also be referred to as a receiver address (RA)) is a broadcast address (broadcast address), an address 2 (which may also be referred to as a transmitter address (TA)) is a MAC address of the STA, and an address 3 (which may also be referred to as a BSSID) is a broadcast address (broadcast address). In a MAC header of the probe response frame transmitted by the AP, an address 1 (or referred to as an RA) is the MAC address of the STA that transmits the probe request frame, an address 2 (or referred to as a TA) is a current MAC address of the AP, and an address 3 (or referred to as a BSSID) is a current BSSID of the AP (which is generally the current MAC address of the AP).

In some implementations, in a case in which an SSID in the probe request frame is a wildcard SSID (wildcard SSID) or the SSID in the probe request frame is the current SSID, the value of the current SSID present field is used to indicate that the current SSID field is not included in the current SSID element, an SSID element in the second frame carries the current SSID, and a transmitter address of the second frame is the current BSSID; or in a case in which the SSID in the probe request frame is an SSID previously used by the AP, the value of the current SSID present field is used to indicate that the current SSID field is included in the current SSID element, an SSID element in the second frame carries an SSID that is the same as the SSID in the probe request frame, and a transmitter address of the second frame is the current BSSID.

Specifically, interaction between a probe request frame and a probe response frame of an STA and an AP may be shown in Table 1.

In some implementations, the current SSID carried in the current SSID field is an encrypted SSID, and an encryption key of the current SSID is a network key, or the encryption key of the current SSID is a key derived based on a network key.

In some implementations, the encryption key of the current SSID is stored locally by the STA, or the encryption key of the current SSID is a network key entered when the STA accesses the AP by manually entering an SSID.

In some implementations of Embodiment 6, after the current SSID and the current BSSID are updated, the STA receives a first management frame transmitted by the AP. The first management frame is a protected management frame, and the first management frame includes a new SSID and a new BSSID. That is, the AP generates a new SSID according to the current SSID, and the AP generates a new BSSID. After the current SSID and the current BSSID are updated, the AP indicates the new SSID and the new BSSID to the STA by using the first management frame.

It should be noted that the first management frame is a protected management frame, that is, a frame body of the first management frame is an encrypted frame body.

Optionally, the first management frame is an action (Action) frame. Because a value range "30-125" of a category (Category) field in the action frame is reserved, any value (for example, "30") is selected from the range to indicate the first management frame in this embodiment.

In some implementations of Embodiment 6, the first management frame includes a control field, a new SSID field, a new BSSID field, and an update time field. The control field includes a new SSID present field, a new BSSID present field, and an update time present field, a value of the new SSID present field is used to indicate that the first management frame includes the new SSID field, a value of the new BSSID present field is used to indicate that the first management frame includes the new BSSID field, and a value of the update time present field is used to indicate that the first management frame includes the update time field. The new SSID field carries the new SSID, the new BSSID field carries the new BSSID, and the update time field carries first duration. The STA updates a currently used OTA MAC address within the first duration; and after the OTA MAC address is updated, the STA communicates with the AP by using an updated OTA MAC address and the new BSSID, and the STA discovers the AP by using the new SSID.

Specifically, the new SSID present (New SSID Present) field is used to indicate whether the first management frame includes the new SSID (New SSID) field. Specifically, for example, the new SSID present field occupies one bit (or may occupy another quantity of bits). If the new SSID present field is set to be 1, it indicates that the first management frame includes the new SSID field; or if the new SSID present field is set to be 0, it indicates that the first management frame does not include the new SSID field. Alternatively, if the new SSID present field is set to be 0, it indicates that the first management frame includes the new SSID field; or if the new SSID present field is set to be 1, it indicates that the first management frame does not include the new SSID field.

Specifically, the new BSSID present (New BSSID Present) field is used to indicate whether the first management frame includes the new BSSID (New BSSID) field. Specifically, for example, the new BSSID present field occupies one bit (or may occupy another quantity of bits). If the new BSSID present field is set to be 1, it indicates that the first management frame includes the new BSSID field; or if the new BSSID present field is set to be 0, it indicates that the first management frame does not include the new BSSID field. Alternatively, if the new BSSID present field is set to be 0, it indicates that the first management frame includes the new BSSID field; or if the new BSSID present field is set to be 1, it indicates that the first management frame does not include the new BSSID field.

Specifically, the update time present field is used to indicate whether the first management frame includes the update time field. Specifically, for example, the update time present field occupies one bit (or may occupy another quantity of bits). If the update time present field is set to be 1, it indicates that the first management frame includes the update time field; or if the update time present field is set to be 0, it indicates that the first management frame does not include the update time field. Alternatively, if the update time present field is set to be 0, it indicates that the first management frame includes the update time field; or if the update time present field is set to be 1, it indicates that the first management frame does not include the update time field.

Specifically, for example, the first management frame may be shown in FIG. 7. A control field of the first management frame may include a new SSID present field (occupying one bit), a new SSID length field (occupying five bits), a new BSSID present field (occupying one bit), and an update time present field (occupying one bit). A value of the new SSID present field is used to indicate that the first management frame includes a new SSID field, the new SSID length field is used to indicate a new SSID length, a value of the new BSSID present field is used to indicate that the first management frame includes a new BSSID field, and a value of the update time present field is used to indicate that the first management frame includes an update time field. The new SSID field carries a new SSID, the new BSSID field carries a new BSSID, and the update time field carries first duration. An STA updates a currently used OTA MAC address within the first duration; and after the OTA MAC address is updated, the STA communicates with an AP by using an updated OTA MAC address and the new BSSID, and the STA discovers the AP by using the new SSID.

In some implementations, a procedure for updating a BSSID and an SSID by an AP may be shown in FIG. 8. For details, one may refer to the foregoing related descriptions about FIG. 8. Details are not described herein again.

In some implementations of Embodiment 6, the STA receives a second management frame transmitted by the AP, where a control field in the second management frame includes an initial SSID present field, the initial SSID present field is used to indicate whether an initial SSID field is included in the second management frame, and the initial SSID field carries an initial SSID of the AP.

In some implementations, in a case in which an SSID used by the STA when establishing an association with the AP is the initial SSID, the initial SSID present field is used to indicate that the initial SSID field is not included in the second management frame.

In some implementations, in a case in which an SSID used by the STA when establishing an association with the AP is not the initial SSID, the initial SSID present field is used to indicate that the initial SSID field is included in the second management frame.

Specifically, the initial SSID present (Initial SSID Present) field is used to indicate whether the second management frame includes the initial SSID (Initial SSID) field. Specifically, for example, the initial SSID present field occupies one bit (or may occupy another quantity of bits). If the initial SSID present field is set to be 1, it indicates that the second management frame includes the initial SSID field; or if the initial SSID present field is set to be 0, it indicates that the second management frame does not include the initial SSID field. Alternatively, if the initial SSID present field is set to be 0, it indicates that the second management frame includes the initial SSID field; or if the initial SSID present field is set to be 1, it indicates that the second management frame does not include the initial SSID field.

Optionally, the second management frame is a protected management frame, that is, a frame body of the second management frame is an encrypted frame body. The second management frame is an action (Action) frame. Because a value range "30-125" of a category (Category) field in the action frame is reserved, any value (for example, "30") is selected from the range to indicate the second management frame in this embodiment.

Specifically, for example, a second management frame may be shown in FIG. 9. A control field of the second management frame includes an initial SSID present field (occupying one bit) and an initial SSID length field (occupying five bits). The initial SSID present field is used to indicate whether the second management frame includes an initial SSID field, and the initial SSID length field is used to indicate a length of an initial SSID. In a case in which a value of the initial SSID present field is used to indicate that the second management frame includes the initial SSID field (that is, the initial SSID field occupies 32 bytes), the initial SSID length field occupies five bits. Alternatively, in a case in which a value of the initial SSID present field is used to indicate that the second management frame does not include the initial SSID field (that is, the initial SSID field occupies zero bytes), the initial SSID length field is a reserved field (that is, each bit in the field is set to be 0).

In some implementations, an AP that supports the SSID privacy enhancement function may indicate an initial SSID to an STA by using a management frame after the STA accesses the AP for the first time. Specifically, a procedure for accessing the AP that supports the SSID privacy enhancement function by the STA for the first time may be shown in FIG. 10. For details, one may refer to the foregoing related descriptions about FIG. 10. Details are not described herein again.

Therefore, in embodiments of this application, an STA transmits a probe request frame to an AP, where an SSID in the probe request frame belongs to a PNL, and the PNL includes at least one SSID selected from an obfuscation library, thereby preventing an attacker from identifying and tracking a user corresponding to the STA by using the PNL of the STA.

The foregoing describes method embodiments of this application in detail with reference to FIG. 2 to FIG. 23. The following describes apparatus embodiments of this application in detail with reference to FIG. 24 to FIG. 28. It should be understood that the apparatus embodiments correspond to the method embodiments. For similar descriptions, one may refer to the method embodiments.

Figure 24:
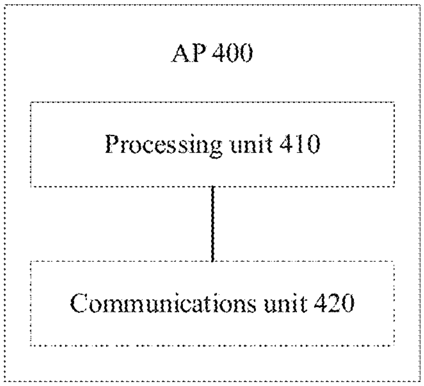
FIG. 24 is a schematic block diagram of an AP according to an embodiment of this application.

FIG. 24 is a schematic block diagram of an AP 400 according to an embodiment of this application. As shown in FIG. 24, the AP 400 includes:

a processing unit 410, configured to autonomously update a service set identifier SSID and a basic service set identifier BSSID of the AP;

where the AP locally maintains a first list and a second list, the first list includes M SSIDs, the second list includes N BSSIDs, the M SSIDs include a current SSID and at least one previously used SSID of the AP, the N BSSIDs include a current BSSID and at least one previously used BSSID of the AP, and both M and N are positive integers.

In some embodiments, the at least one previously used SSID includes at least an initial SSID, and/or, the at least one previously used BSSID includes at least an initial BSSID.

In some embodiments, the current SSID in the first list is the initial SSID at initial time, and/or, the current BSSID in the second list is the initial BSSID at initial time.

In some embodiments, the current SSID in the first list is generated based on a previous SSID of the current SSID and first secret information at non-initial time;

where the first secret information is common secret information between the AP and an STA that has accessed the AP.

In some embodiments, the STA locally maintains S SSIDs to be used by the AP in future;

where the S SSIDs are generated based on the current SSID and the first secret information, and S is a positive integer.

In some embodiments, the S SSIDs being generated based on the current SSID and the first secret information includes:

the first SSID in the S SSIDs is generated based on the current SSID and the first secret information, and the $(i+1)^{th}$ SSID in the S SSIDs is generated based on the $i^{th}$ SSID and the first secret information;

where i is a positive integer, and $1 \le i \le S-1$.

In some embodiments, the processing unit 410 is specifically configured to: when the AP updates the current SSID and the current BSSID, generate a new SSID according to the current SSID and the first secret information, and generate a new BSSID.

In some embodiments, the AP 400 further includes a communications unit 420.

The processing unit 410 is further configured to obtain the current SSID from the first list and obtain the current BSSID from the second list.

The communications unit 420 is configured to transmit a first frame to the STA, where an SSID element in the first frame carries the current SSID, and a transmitter address of the first frame is the current BSSID.

In some embodiments, the current SSID in the first list is generated based on a random number corresponding to the current SSID and first secret information at non-initial time;

where the first secret information is common secret information between the AP and the STA that has accessed the AP.

In some embodiments, the processing unit 410 is specifically configured to:

when the AP updates the current SSID and the current BSSID, generate a new SSID according to a newly generated random number and the first secret information, and generate a new BSSID.

In some embodiments, the AP 400 further includes a communications unit 420.

The processing unit 410 is further configured to obtain the current SSID from the first list and obtain the current BSSID from the second list.

The communications unit 420 is configured to transmit a first frame to the STA, where an SSID element in the first frame includes an SSID field and a random number field, the SSID field carries the current SSID, the random number field carries a random number corresponding to the current SSID, and a transmitter address of the first frame is the current BSSID.

In some embodiments, a capability information element in the first frame includes a first bit, and a value of the first bit is used to indicate that the AP supports an SSID privacy enhancement function.

In some embodiments, the first bit is a reserved bit in the capability information element of the first frame.

In some embodiments, the first frame is a beacon frame or a probe response frame.

In some embodiments, in a case in which the first frame is a probe response frame and before the first frame is transmitted, the AP 400 further includes a communications unit 420.

The communications unit 420 is configured to receive a first probe request frame transmitted by the STA, where the first frame is a response frame of the first probe request frame, and an SSID in the first probe request frame is the current SSID, or the SSID in the first probe request frame is an SSID used when the STA accessed the AP.

In some embodiments, the SSID in the first probe request frame belongs to a preferred network list PNL.

The PNL includes at least one SSID selected from an obfuscation library and an SSID of one or more APs that were accessed by the STA, or the PNL includes at least one SSID selected from an obfuscation library, an initial SSID of at least one AP, and an SSID of one or more APs that were accessed by the STA.

An SSID included in the obfuscation library does not involve privacy information of a user corresponding to the STA.

In some embodiments, the AP locally maintains a third list, where the third list includes at least one SSID to be used by the AP in future.

In some embodiments, the at least one SSID to be used by the AP in future includes at least one of the following:

an SSID detected from surroundings, a randomly generated SSID, or an SSID in an SSID library provided by an upper-layer application program.

In some embodiments, the processing unit 410 is specifically configured to:

when the AP updates the current SSID and the current BSSID, select a new SSID from the third list and generate a new BSSID.

In some embodiments, the AP 400 further includes a communications unit 420.

The processing unit 410 is further configured to obtain the current SSID from the first list and obtain the current BSSID from the second list.

The communications unit 420 is configured to transmit a second frame to an STA, where the second frame carries the current SSID and the current BSSID.

In some embodiments, the second frame is a beacon frame or a probe response frame.

In some embodiments, in a case in which the second frame is a probe response frame and before the second frame is transmitted, the AP 400 further includes a communications unit 420.

The communications unit 420 is configured to receive a second probe request frame transmitted by the STA, where the second frame is a response frame of the second probe request frame.

In some embodiments, the second frame includes a current SSID element, and the current SSID element is used to indicate that the AP supports an SSID privacy enhancement function.

In some embodiments, a control field in the current SSID element includes a current SSID present field, a value of the current SSID present field is used to indicate whether a current SSID field is included in the current SSID element, and the current SSID field carries the current SSID.

In some embodiments, in a case in which an SSID in the second probe request frame is a wildcard SSID or the SSID in the second probe request frame is the current SSID, the value of the current SSID present field is used to indicate that the current SSID field is not included in the current SSID element, an SSID element in the second frame carries the current SSID, and a transmitter address of the second frame is the current BSSID; or in a case in which an SSID in the second probe request frame is an SSID previously used by the AP, the value of the current SSID present field is used to indicate that the current SSID field is included in the current SSID element, an SSID element in the second frame carries an SSID that is the same as the SSID in the second probe request frame, and a transmitter address of the second frame is the current BSSID.

In some embodiments, the current SSID carried in the current SSID field is an encrypted SSID, and an encryption key of the current SSID is a network key, or the encryption key of the current SSID is a key derived based on a network key.

In some embodiments, the encryption key of the current SSID is stored locally by the STA, or the encryption key of the current SSID is a network key entered when the STA accesses the AP by manually entering an SSID.

In some embodiments, an SSID in the second probe request frame belongs to a PNL.

The PNL includes at least one SSID selected from an obfuscation library and an SSID of one or more APs that were accessed by the STA, or the PNL includes at least one SSID selected from an obfuscation library, an initial SSID of at least one AP, and an SSID of one or more APs that were accessed by the STA.

An SSID included in the obfuscation library does not involve privacy information of a user corresponding to the STA.

In some embodiments, an SSID in the obfuscation library includes at least one of the following:

an SSID detected from surroundings, a randomly generated SSID, or an SSID in an SSID library provided by an upper-layer application program.

In some embodiments, after the current SSID and the current BSSID are updated, the AP 400 further includes a communications unit 420.

The communications unit 420 is configured to transmit a first management frame to an STA, where the first management frame is a protected management frame, and the first management frame includes a new SSID and a new BSSID.

In some embodiments, the first management frame includes a control field, a new SSID field, a new BSSID field, and an update time field.

The control field includes a new SSID present field, a new BSSID present field, and an update time present field, a value of the new SSID present field is used to indicate that the first management frame includes the new SSID field, a value of the new BSSID present field is used to indicate that the first management frame includes the new BSSID field, and a value of the update time present field is used to indicate that the first management frame includes the update time field.

The new SSID field carries the new SSID, the new BSSID field carries the new BSSID, and the update time field carries first duration.

The STA updates a currently used over the air medium access control OTA MAC address within the first duration. After the OTA MAC address is updated, the STA communicates with the AP by using an updated OTA MAC address and the new BSSID, and the STA discovers the AP by using the new SSID.

In some embodiments, the AP 400 further includes a communications unit 420.

The communications unit 420 is configured to transmit a second management frame to an STA.

A control field in the second management frame includes an initial SSID present field, the initial SSID present field is used to indicate whether an initial SSID field is included in the second management frame, and the initial SSID field carries an initial SSID of the AP.

In some embodiments, in a case in which an SSID used by the STA when establishing an association with the AP is the initial SSID, the initial SSID present field is used to indicate that the initial SSID field is not included in the second management frame; or in a case in which an SSID used by the STA when establishing an association with the AP is not the initial SSID, the initial SSID present field is used to indicate that the initial SSID field is included in the second management frame.

In some embodiments, the AP supports an SSID privacy enhancement function.

In some embodiments, the AP is a mobile AP.

In some embodiments, the foregoing communications unit may be a communications interface or a transceiver, or an input/output interface of a communications chip or a system-on-chip. The foregoing processing unit may be one or more processors.

It should be understood that the AP 400 according to this embodiment of this application may correspond to an AP in the method embodiments of this application, and the foregoing and other operations and/or functions of units in the AP 400 are respectively used to implement a corresponding procedure of the AP in the method 200 shown in FIG. 2. For brevity, details are not described herein again.

Figure 25:
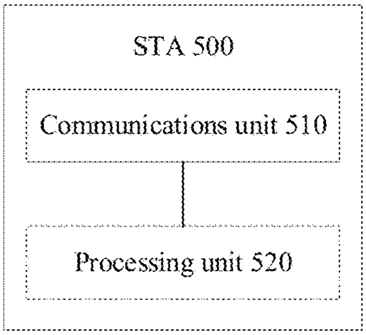
FIG. 25 is a schematic block diagram of a STA according to an embodiment of this application.

FIG. 25 is a schematic block diagram of an STA 500 according to an embodiment of this application. As shown in FIG. 25, the STA 500 includes:

a communications unit 510, configured to transmit a probe request frame to an access point AP.

A service set identifier SSID in the probe request frame belongs to a preferred network list PNL, and the PNL includes at least one SSID selected from an obfuscation library and an SSID of one or more APs that were accessed by the STA, or the PNL includes at least one SSID selected from an obfuscation library, an initial SSID of at least one AP, and an SSID of one or more APs that were accessed by the STA, where an SSID included in the obfuscation library does not involve privacy information of a user corresponding to the STA.

In some embodiments, an SSID in the obfuscation library includes at least one of the following:

an SSID detected from surroundings, a randomly generated SSID, or an SSID in an SSID library provided by an upper-layer application program.

In some embodiments, the communications unit 510 is further configured to receive a first frame transmitted by the AP.

An SSID element in the first frame carries a current SSID of the AP, and a transmitter address of the first frame is a current basic service set identifier BSSID of the AP.

In some embodiments, in a case in which the AP supports an SSID privacy enhancement function, the current SSID is an initial SSID of the AP at initial time, and the current SSID is generated based on a previous SSID of the current SSID and first secret information at non-initial time, where the first secret information is common secret information between the AP and the STA.

In some embodiments, the STA locally maintains a fourth list, where the fourth list includes at least W SSIDs of the AP, and the W SSIDs include the initial SSID of the AP, the current SSID of the AP, and S SSIDs to be used by the AP in future, where the S SSIDs are generated based on the current SSID of the AP and the first secret information, both W and S are positive integers, and W>S.

In some embodiments, the S SSIDs being generated based on the current SSID of the AP and the first secret information includes:

the first SSID in the S SSIDs is generated based on the current SSID and the first secret information, and the $(i+1)^{th}$ SSID in the S SSIDs is generated based on the $i^{th}$ SSID and the first secret information;

where i is a positive integer, and $1 \le i \le S-1$.

In some embodiments, the STA 500 further includes a processing unit 520.

The processing unit 520 is configured to compare the current SSID of the AP carried in the first frame with W SSIDs of the AP in the fourth list.

In a case in which the current SSID of the AP carried in the first frame is an SSID to be used by the AP in future in the fourth list, the processing unit 520 is further configured to convert an SSID of the AP into the initial SSID of the AP in an available network list, and the processing unit 520 is further configured to update the current SSID of the AP and the S SSIDs to be used by the AP in future in the fourth list; or in a case in which the current SSID of the AP carried in the first frame is the current SSID of the AP in the fourth list, the processing unit 520 is further configured to associate the SSID carried in the first frame with the current SSID of the AP in the fourth list.

In some embodiments, the fourth list further includes an SSID of at least one another AP that supports the SSID privacy enhancement function, and the SSID of the another AP includes an initial SSID of the another AP, a current SSID of the another AP, and a plurality of SSIDs to be used by the another AP in future.

In some embodiments, in a case in which the AP supports an SSID privacy enhancement function, the SSID element in the first frame includes a random number field, the random number field carries a random number corresponding to the current SSID, the current SSID is an initial SSID of the AP at initial time, the current SSID is generated based on the random number corresponding to the current SSID and first secret information at non-initial time, and the first secret information is common secret information between the AP and the STA.

In some embodiments, the processing unit 520 is further configured to determine a plurality of SSIDs based on the random number carried in the random number field and a plurality of pieces of secret information, where the plurality of pieces of secret information is common secret information between the STA and a plurality of APs that support the SSID privacy enhancement function and that are locally stored by the STA.

In a case in which an SSID of the plurality of SSIDs is consistent with the SSID carried in the first frame, the processing unit 520 is further configured to associate the SSID carried in the first frame with the current SSID of the AP.

In some embodiments, a capability information element in the first frame includes a first bit, and a value of the first bit is used to indicate that the AP supports an SSID privacy enhancement function.

In some embodiments, the first bit is a reserved bit in the capability information element of the first frame.

In some embodiments, the first frame is a beacon frame or a probe response frame.

In some embodiments, the communications unit 510 is further configured to receive a second frame transmitted by the AP.

The second frame includes a current SSID element, the current SSID element is used to indicate that the AP supports an SSID privacy enhancement function, and the second frame carries a current SSID of the AP and a current BSSID of the AP.

In some embodiments, a control field in the current SSID element includes a current SSID present field, a value of the current SSID present field is used to indicate whether a current SSID field is included in the current SSID element, and the current SSID field carries the current SSID.

In some embodiments, in a case in which the SSID in the probe request frame is a wildcard SSID or the SSID in the probe request frame is the current SSID, the value of the current SSID present field is used to indicate that the current SSID field is not included in the current SSID element, an SSID element in the second frame carries the current SSID, and a transmitter address of the second frame is the current BSSID; or in a case in which the SSID in the probe request frame is an SSID previously used by the AP, the value of the current SSID present field is used to indicate that the current SSID field is included in the current SSID element, an SSID element in the second frame carries an SSID that is the same as the SSID in the probe request frame, and a transmitter address of the second frame is the current BSSID.

In some embodiments, the current SSID carried in the current SSID field is an encrypted SSID, and an encryption key of the current SSID is a network key, or the encryption key of the current SSID is a key derived based on a network key.

In some embodiments, the encryption key of the current SSID is stored locally by the STA, or the encryption key of the current SSID is a network key entered when the STA accesses the AP by manually entering an SSID.

In some embodiments, the STA locally maintains a fifth list, where the fifth list includes initial SSIDs and current SSIDs of a plurality of APs that support the SSID privacy enhancement function, and the plurality of APs include the AP.

In some embodiments, the STA locally maintains a sixth list, where the sixth list includes a plurality of SSIDs of APs that do not support the SSID privacy enhancement function, and a quantity of SSIDs in the sixth list is equal to a quantity of APs that do not support the SSID privacy enhancement function and that are accessed by the STA.

In some embodiments, the communications unit 510 is further configured to receive a first management frame transmitted by the AP, where the first management frame is a protected management frame, the first management frame includes a new SSID and a new BSSID, the new SSID is obtained by updating a current SSID, and the new BSSID is obtained by updating a current BSSID.

In some embodiments, the first management frame includes a control field, a new SSID field, a new BSSID field, and an update time field. The control field includes a new SSID present field, a new BSSID present field, and an update time present field, a value of the new SSID present field is used to indicate that the first management frame includes the new SSID field, a value of the new BSSID present field is used to indicate that the first management frame includes the new BSSID field, and a value of the update time present field is used to indicate that the first management frame includes the update time field. The new SSID field carries the new SSID, the new BSSID field carries the new BSSID, and the update time field carries first duration.

The STA 500 further includes a processing unit 520.

The processing unit 520 is configured to update a currently used over the air medium access control OTA MAC address within the first duration. After the OTA MAC address is updated, the processing unit 520 is further configured to communicate with the AP by using an updated OTA MAC address and the new BSSID, and the processing unit 520 is further configured to discover the AP by using the new SSID.

In some embodiments, the communications unit 510 is further configured to receive a second management frame transmitted by the AP.

A control field in the second management frame includes an initial SSID present field, the initial SSID present field is used to indicate whether an initial SSID field is included in the second management frame, and the initial SSID field carries an initial SSID of the AP.

In some embodiments, in a case in which an SSID used by the STA when establishing an association with the AP is the initial SSID, the initial SSID present field is used to indicate that the initial SSID field is not included in the second management frame; or in a case in which an SSID used by the STA when establishing an association with the AP is not the initial SSID, the initial SSID present field is used to indicate that the initial SSID field is included in the second management frame.

In some embodiments, the foregoing communications unit may be a communications interface or a transceiver, or an input/output interface of a communications chip or a system-on-chip. The foregoing processing unit may be one or more processors.

It should be understood that the STA 500 according to this embodiment of this application may correspond to an STA in the method embodiments of this application, and the foregoing and other operations and/or functions of units in the STA 500 are respectively used to implement a corresponding procedure of the STA in the method 300 shown in FIG. 19. For brevity, details are not described herein again.

Figure 26:
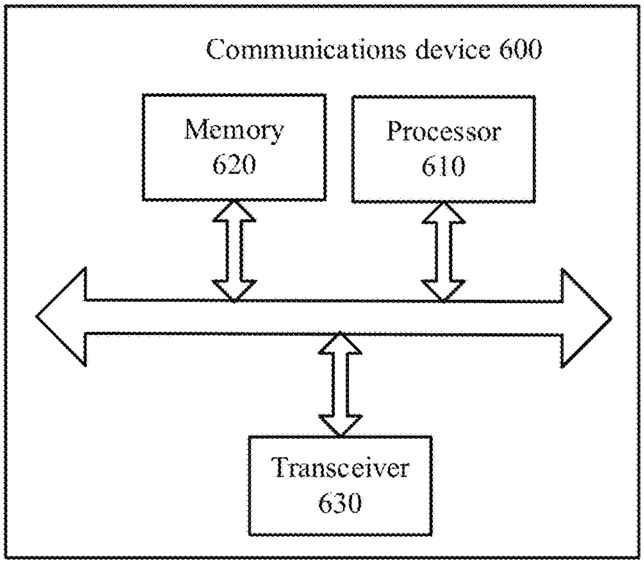
FIG. 26 is a schematic block diagram of a communications device according to an embodiment of this application.

FIG. 26 is a schematic structural diagram of a communications device 600 according to an embodiment of this application. The communications device 600 shown in FIG. 26 includes a processor 610, and the processor 610 may invoke a computer program from a memory and run the computer program to implement the method in embodiments of this application.

In some embodiments, as shown in FIG. 26, the communications device 600 may further include a memory 620. The processor 610 may invoke a computer program from the memory 620 and run the computer program to implement the method in embodiments of this application.

The memory 620 may be a separate component independent of the processor 610, or may be integrated into the processor 610.

In some embodiments, as shown in FIG. 26, the communications device 600 may further include a transceiver 630. The processor 610 may control the transceiver 630 to communicate with another device. Specifically, the processor 610 may transmit information or data to the another device, or receive information or data transmitted by the another device.

The transceiver 630 may include a transmitter and a receiver. The transceiver 630 may further include an antenna, and there may be one or more antennas.

In some embodiments, the communications device 600 may be specifically an AP in embodiments of this application, and the communications device 600 may implement a corresponding procedure implemented by the AP in the methods according to embodiments of this application. For brevity, details are not described herein again.

In some embodiments, the communications device 600 may be specifically an STA in embodiments of this application, and the communications device 600 may implement a corresponding procedure implemented by the STA in the methods according to embodiments of this application. For brevity, details are not described herein again.

Figure 27:
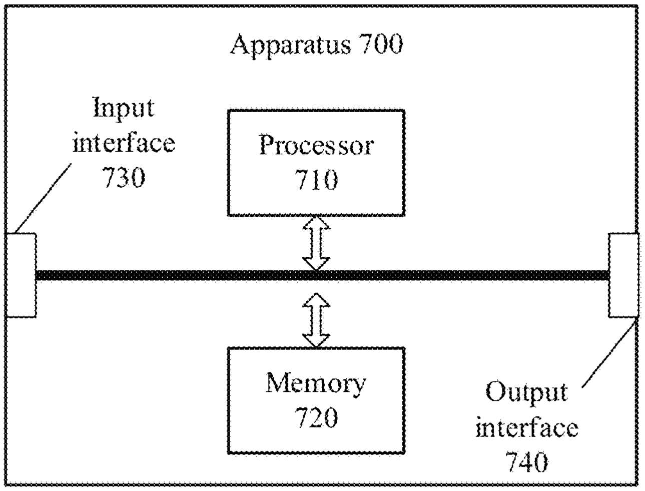
FIG. 27 is a schematic block diagram of an apparatus according to an embodiment of this application.

FIG. 27 is a schematic structural diagram of an apparatus according to an embodiment of this application. The apparatus 700 shown in FIG. 27 includes a processor 710, and the processor 710 may invoke a computer program from a memory and run the computer program to implement the method in embodiments of this application.

In some embodiments, as shown in FIG. 27, the apparatus 700 may further include a memory 720. The processor 710 may invoke a computer program from the memory 720 and run the computer program to implement the methods according to embodiments of this application.

The memory 720 may be a separate component independent of the processor 710, or may be integrated into the processor 710.

In some embodiments, the apparatus 700 may further include an input interface 730. The processor 710 may control the input interface 730 to communicate with another device or chip, and specifically, may obtain information or data transmitted by the another device or chip.

In some embodiments, the apparatus 700 may further include an output interface 740. The processor 710 may control the output interface 740 to communicate with another device or chip, and specifically, may output information or data to the another device or chip.

In some embodiments, the apparatus may be applied to the AP in embodiments of this application, and the apparatus may implement a corresponding procedure implemented by the AP in the methods according to embodiments of this application. For brevity, details are not described herein again.

In some embodiments, the apparatus may be applied to the STA in embodiments of this application, and the apparatus may implement a corresponding procedure implemented by the STA in the methods according to embodiments of this application. For brevity, details are not described herein again.

In some embodiments, the apparatus mentioned in embodiments of this application may alternatively be a chip, for example, may be a system-level chip, a system chip, a chip system, or a system-on-chip, or the like.

Figure 28:
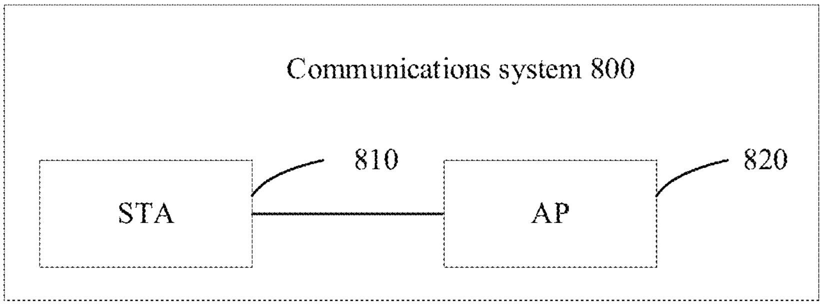
FIG. 28 is a schematic block diagram of a communications system according to an embodiment of this application.

FIG. 28 is a schematic block diagram of a communications system 800 according to an embodiment of this application. As shown in FIG. 28, the communications system 800 includes an STA 810 and an AP 820.

The STA 810 may be configured to implement the corresponding functions implemented by the STA in the foregoing methods, and the AP 820 may be configured to implement the corresponding functions implemented by the AP in the foregoing methods. For brevity, details are not described herein again.

It should be understood that, a processor in the embodiment of this application may be an integrated circuit chip having a signal processing capability. In an implementation process, the steps in the foregoing method embodiments may be performed by using an integrated logic circuit of hardware of the processor or instructions in a software form. The processor may be a general-purpose processor, a digital signal processor (DSP), an application-specific integrated circuit (ASIC), a field-programmable gate array (FPGA) or another programmable logic device, a discrete gate or a transistor logic device, or a discrete hardware component. The processor may implement or execute the methods, steps, and logical block diagrams disclosed in embodiments of this application. The general-purpose processor may be a microprocessor, or the processor may be any conventional processor or the like. The steps of the methods disclosed with reference to embodiments of this application may be directly implemented by a hardware decoding processor, or may be implemented by a combination of hardware and software modules in a decoding processor. The software module may be located in a mature storage medium in the art, for example, a random access memory, a flash memory, a read-only memory, a programmable read-only memory, an erasable programmable memory, or a register. The storage medium is located in a memory. The processor reads information from the memory, and completes the steps of the foregoing methods in combination with hardware in the processor.

It may be understood that the memory in embodiments of this application may be a volatile memory or a non-volatile memory, or may include both a volatile memory and a non-volatile memory. The non-volatile memory may be a read-only memory (Read-Only Memory, ROM), a programmable read-only memory (Programmable ROM, PROM), an erasable programmable read-only memory (Erasable PROM, EPROM), an electrically erasable programmable read-only memory (Electrically EPROM, EEPROM), or a flash memory. The volatile memory may be a random access memory (RAM), and is used as an external cache. By way of example but not limitative description, many forms of RAMs may be used, for example, a static random access memory (Static RAM, SRAM), a dynamic random access memory (Dynamic RAM, DRAM), a synchronous dynamic random access memory (Synchronous DRAM, SDRAM), a double data rate synchronous dynamic random access memory (Double Data Rate SDRAM, DDR SDRAM), an enhanced synchronous dynamic random access memory (Enhanced SDRAM, ESDRAM), a synchlink dynamic random access memory (Synchlink DRAM, SLDRAM), and a direct Rambus random access memory (Direct Rambus RAM, DR RAM). It should be noted that, the memory in the systems and methods described in this specification includes but is not limited to these memories and any memory of another proper type.

It should be understood that, by way of example but not limitative description, for example, the memory in this embodiment of this application may alternatively be a static random access memory (static RAM, SRAM), a dynamic random access memory (dynamic RAM, DRAM), a synchronous dynamic random access memory (synchronous DRAM, SDRAM), a double data rate synchronous dynamic random access memory (double data rate SDRAM, DDR SDRAM), an enhanced synchronous dynamic random access memory (enhanced SDRAM, ESDRAM), a synchlink dynamic random access memory (synch link DRAM, SLDRAM), a direct Rambus random access memory (Direct Rambus RAM, DR RAM), or the like. In other words, the memory in this embodiment of this application includes but is not limited to these memories and any memory of another proper type.

An embodiment of this application further provides a computer-readable storage medium, configured to store a computer program.

In some embodiments, the computer-readable storage medium may be applied to the AP in embodiments of this application, and the computer program causes a computer to execute a corresponding procedure implemented by the AP in the methods according to embodiments of this application. For brevity, details are not described herein again.

In some embodiments, the computer-readable storage medium may be applied to the STA in embodiments of this application, and the computer program causes a computer to execute a corresponding procedure implemented by the STA in the methods according to embodiments of this application. For brevity, details are not described herein again.

An embodiment of this application further provides a computer program product, including computer program instructions.

In some embodiments, the computer program product may be applied to the AP in embodiments of this application, and the computer program instructions cause a computer to execute a corresponding procedure implemented by the AP in the methods according to embodiments of this application. For brevity, details are not described herein again.

In some embodiments, the computer program product may be applied to the STA in embodiments of this application, and the computer program instructions cause a computer to execute a corresponding procedure implemented by the STA in methods according to embodiments of this application. For brevity, details are not described herein again.

An embodiment of this application further provides a computer program.

In some embodiments, the computer program may be applied to the AP in embodiments of this application. When being run on a computer, the computer program causes the computer to execute a corresponding procedure implemented by the AP in the methods according to embodiments of this application. For brevity, details are not described herein again.

In some embodiments, the computer program may be applied to the STA in embodiments of this application. When being run on a computer, the computer program causes the computer to execute a corresponding procedure implemented by the STA in the methods according to embodiments of this application. For brevity, details are not described herein again.

A person of ordinary skill in the art may be aware that, units and algorithm steps in examples described in combination with embodiments disclosed in this specification can be implemented by electronic hardware or a combination of computer software and electronic hardware. Whether the functions are executed by hardware or software depends on particular applications and design constraints of the technical solutions. A person skilled in the art may use different methods to implement the described functions for each particular application, but it should not be considered that the implementation goes beyond the scope of this application.

Those skilled in the art may clearly understand that, for the purpose of convenient and brief description, for detailed working processes of the foregoing system, apparatus, and unit, one may refer to the corresponding processes in the foregoing method embodiments, and details are not described herein again.

In the several embodiments provided in this application, it should be understood that the disclosed system, apparatus, and method may be implemented in another manner. For example, the described apparatus embodiments are merely examples. For example, the unit division is merely logical function division and may be other division in actual implementation. For example, a plurality of units or components may be combined or integrated into another system, or some features may be ignored or not executed. In addition, the displayed or discussed mutual couplings or direct couplings or communication connections may be implemented by using some interfaces. The indirect couplings or communication connections between apparatuses or units may be implemented in electrical, mechanical, or other forms.

The units described as separate components may be or may not be physically separated, and the components displayed as units may be or may not be physical units, that is, may be located in one place or distributed on a plurality of network units. Some or all of the units may be selected according to actual needs to achieve the objective of the solutions of embodiments.

In addition, functional units in embodiments of this application may be integrated into one processing unit, or each of the units may exist alone physically, or two or more units may be integrated into one unit.

When the functions are implemented in a form of a software function unit and sold or used as an independent product, the functions may be stored in a computer-readable storage medium. Based on such an understanding, the technical solutions in embodiments of this application essentially, or the part contributing to the prior art, or some of the technical solutions may be implemented in a form of a software product. The computer software product is stored in a storage medium and includes several instructions for instructing a computer device (which may be a personal computer, a server, a network device, or the like) to execute all or some of the steps of the methods in embodiments of this application. The foregoing storage medium includes various media that may store a program code, such as a USB flash drive, a removable hard disk, a read-only memory ROM), a random access memory (RAM), a magnetic disk, or an optical disk.

The foregoing descriptions are merely specific implementations of this application, but the protection scope of this application is not limited thereto. Any variation or replacement readily figured out by a person skilled in the art within the technical scope disclosed in this application shall fall within the protection scope of this application. Therefore, the protection scope of this application should be subject to the protection scope of the claims.

What is claimed is:

1. An access point AP, comprising at least one processor, wherein the at least one processor is configured to:

autonomously update a service set identifier SSID and a basic service set identifier BSSID of the AP;

wherein the AP locally maintains a first list and a second list, the first list comprises M SSIDs, the second list comprises N BSSIDs, the M SSIDs comprise a current SSID and at least one previously used SSID of the AP, the N BSSIDs comprise a current BSSID and at least one previously used BSSID of the AP, and both M and N are positive integers;

wherein the at least one processor is further configured to:

obtain the current SSID from the first list, and obtain the current BSSID from the second list; and transmit a second frame to a STA, wherein the second frame carries the current SSID and the current BSSID;

wherein the second frame is a beacon frame or a probe response frame;

wherein in a case in which the second frame is a probe response frame and before the second frame is transmitted, the at least one processor is further configured to:

receive a second probe request frame transmitted by the STA, wherein the second frame is a response frame of the second probe request frame;

wherein the second frame comprises a current SSID element, and the current SSID element is used to indicate that the AP supports an SSID privacy enhancement function;

wherein a control field in the current SSID element comprises a current SSID present field, a value of the current SSID present field is used to indicate whether a current SSID field is comprised in the current SSID element, and the current SSID field carries the current SSID;

and wherein in a case in which an SSID in the second probe request frame is a wildcard SSID or the SSID in the second probe request frame is the current SSID, the value of the current SSID present field is used to indicate that the current SSID field is not comprised in the current SSID element, an SSID element in the second frame carries the current SSID, and a transmitter address of the second frame is the current BSSID; or in a case in which an SSID in the second probe request frame is an SSID previously used by the AP, the value of the current SSID present field is used to indicate that the current SSID field is comprised in the current SSID element, an SSID element in the second frame carries an SSID that is the same as the SSID in the second probe request frame, and a transmitter address of the second frame is the current BSSID.

2. The access point according to claim 1, wherein for autonomously updating an SSID and a BSSID of the AP, the at least one processor is configured to:

when the AP updates the current SSID and the current BSSID, generate a new SSID according to a newly generated random number and first secret information, and generate a new BSSID;

wherein the at least one processor is further configured to:

transmit a first frame to a STA, wherein an SSID element in the first frame comprises an SSID field and a random number field, the SSID field carries the current SSID, the random number field carries a random number corresponding to the current SSID, and a transmitter address of the first frame is the current BSSID.

3. The access point according to claim 2, wherein a capability information element in the first frame comprises a first bit, and a value of the first bit is used to indicate that the AP supports an SSID privacy enhancement function;

wherein the first bit is a reserved bit in the capability information element of the first frame;

and wherein the first frame is a beacon frame or a probe response frame.

4. The access point according to claim 3, wherein in a case in which the first frame is a probe response frame and before the first frame is transmitted, the at least one processor is further configured to:

receive a first probe request frame transmitted by the STA, wherein the first frame is a response frame of the first probe request frame, and an SSID in the first probe request frame is the current SSID, or the SSID in the first probe request frame is an SSID used when the STA accessed the AP.

5. The access point according to claim 4, wherein the SSID in the first probe request frame belongs to a preferred network list PNL;

wherein the PNL comprises at least one SSID selected from an obfuscation library and an SSID of one or more APs that were accessed by the STA, or the PNL comprises at least one SSID selected from an obfuscation library, an initial SSID of at least one AP, and an SSID of one or more APs that were accessed by the STA;

wherein an SSID comprised in the obfuscation library does not involve privacy information of a user corresponding to the STA.

6. The access point according to claim 1, wherein after the current SSID and the current BSSID are updated, the at least one processor is further configured to:

transmit a first management frame to a STA, wherein the first management frame is a protected management frame, and the first management frame comprises a new SSID and a new BSSID;

wherein the first management frame comprises a control field, a new SSID field, a new BSSID field, and an update time field;

wherein the control field comprises a new SSID present field, a new BSSID present field, and an update time present field, a value of the new SSID present field is used to indicate that the first management frame comprises the new SSID field, a value of the new BSSID present field is used to indicate that the first management frame comprises the new BSSID field, and a value of the update time present field is used to indicate that the first management frame comprises the update time field;

wherein the new SSID field carries the new SSID, the new BSSID field carries the new BSSID, and the update time field carries first duration;

wherein the STA updates a currently used over the air medium access control OTA MAC address within the first duration, after the OTA MAC address is updated, the STA communicates with the AP by using an updated OTA MAC address and the new BSSID, and the STA discovers the AP by using the new SSID.

7. The access point according to claim 1, wherein the at least one processor is further configured to:

transmit a second management frame to a STA;

wherein a control field in the second management frame comprises an initial SSID present field, the initial SSID present field is used to indicate whether an initial SSID field is comprised in the second management frame, and the initial SSID field carries an initial SSID of the AP;

wherein in a case in which an SSID used by the STA when establishing an association with the AP is the initial SSID, the initial SSID present field is used to indicate that the initial SSID field is not comprised in the second management frame; or in a case in which an SSID used by the STA when establishing an association with the AP is not the initial SSID, the initial SSID present field is used to indicate that the initial SSID field is comprised in the second management frame.

8. A station STA, comprising at least one processor, wherein the at least one processor is configured to:

transmit a probe request frame to an access point AP;

wherein a service set identifier SSID in the probe request frame belongs to a preferred network list PNL, and the PNL comprises at least one SSID selected from an obfuscation library and an SSID of one or more APs that were accessed by the STA, or the PNL comprises at least one SSID selected from an obfuscation library, an initial SSID of at least one AP, and an SSID of one or more APs that were accessed by the STA, wherein an SSID comprised in the obfuscation library does not involve privacy information of a user corresponding to the STA;

wherein the at least one processor is further configured to:

receive a second frame transmitted by the AP;

wherein the second frame comprises a current SSID element, the current SSID element is used to indicate that the AP supports an SSID privacy enhancement function, and the second frame carries a current SSID of the AP and a current BSSID of the AP;

wherein a control field in the current SSID element comprises a current SSID present field, a value of the current SSID present field is used to indicate whether a current SSID field is comprised in the current SSID element, and the current SSID field carries the current SSID;

wherein in a case in which the SSID in the probe request frame is a wildcard SSID or the SSID in the probe request frame is the current SSID, the value of the current SSID present field is used to indicate that the current SSID field is not comprised in the current SSID element, an SSID element in the second frame carries the current SSID, and a transmitter address of the second frame is the current BSSID; or in a case in which the SSID in the probe request frame is an SSID previously used by the AP, the value of the current SSID present field is used to indicate that the current SSID field is comprised in the current SSID element, an SSID element in the second frame carries an SSID that is the same as the SSID in the probe request frame, and a transmitter address of the second frame is the current BSSID.

9. The station according to claim 8, wherein the at least one processor is further configured to:

receive a first frame transmitted by the AP;

wherein an SSID element in the first frame carries a current SSID of the AP, and a transmitter address of the first frame is a current basic service set identifier BSSID of the AP.

10. The station according to claim 9, wherein a capability information element in the first frame comprises a first bit, and a value of the first bit is used to indicate that the AP supports an SSID privacy enhancement function;

wherein the first bit is a reserved bit in the capability information element of the first frame;

and wherein the first frame is a beacon frame or a probe response frame.

11. The station according to claim 8, wherein the at least one processor is further configured to:

receive a first management frame transmitted by the AP, wherein the first management frame is a protected management frame, the first management frame comprises a new SSID and a new BSSID, the new SSID is obtained by updating a current SSID of the AP, and the new BSSID is obtained by updating a current BSSID of the AP;

wherein the first management frame comprises a control field, a new SSID field, a new BSSID field, and an update time field, wherein the control field comprises a new SSID present field, a new BSSID present field, and an update time present field, a value of the new SSID present field is used to indicate that the first management frame comprises the new SSID field, a value of the new BSSID present field is used to indicate that the first management frame comprises the new BSSID field, and a value of the update time present field is used to indicate that the first management frame comprises the update time field, wherein the new SSID field carries the new SSID, the new BSSID field carries the new BSSID, and the update time field carries first duration; and the at least one processor is further configured to:

update a currently used over the air medium access control OTA MAC address within the first duration, after the OTA MAC address is updated, communicate with the AP by using an updated OTA MAC address and the new BSSID, and discover the AP by using the new SSID.

12. The station according to claim 8, wherein the at least one processor is further configured to:

receive a second management frame transmitted by the AP;

wherein a control field in the second management frame comprises an initial SSID present field, the initial SSID present field is used to indicate whether an initial SSID field is comprised in the second management frame, and the initial SSID field carries an initial SSID of the AP;

wherein in a case in which an SSID used by the STA when establishing an association with the AP is the initial SSID, the initial SSID present field is used to indicate that the initial SSID field is not comprised in the second management frame; or in a case in which an SSID used by the STA when establishing an association with the AP is not the initial SSID, the initial SSID present field is used to indicate that the initial SSID field is comprised in the second management frame.

13. A wireless communication method, comprising:

autonomously updating, by an access point AP, a service set identifier SSID and a basic service set identifier BSSID of the AP;

wherein the AP locally maintains a first list and a second list, the first list comprises M SSIDs, the second list comprises N BSSIDs, the M SSIDs comprise a current SSID and at least one previously used SSID of the AP, the N BSSIDs comprise a current BSSID and at least one previously used BSSID of the AP, and both M and N are positive integers;

wherein the method further comprises:

obtaining, by the AP, the current SSID from the first list, and obtaining, by the AP, the current BSSID from the second list; and transmitting, by the AP, a second frame to a STA, wherein the second frame carries the current SSID and the current BSSID;

wherein the second frame is a beacon frame or a probe response frame;

wherein in a case in which the second frame is a probe response frame and before the second frame is transmitted, the method further comprises:

receiving a second probe request frame transmitted by the STA, wherein the second frame is a response frame of the second probe request frame;

wherein the second frame comprises a current SSID element, and the current SSID element is used to indicate that the AP supports an SSID privacy enhancement function;

wherein a control field in the current SSID element comprises a current SSID present field, a value of the current SSID present field is used to indicate whether a current SSID field is comprised in the current SSID element, and the current SSID field carries the current SSID;

and wherein in a case in which an SSID in the second probe request frame is a wildcard SSID or the SSID in the second probe request frame is the current SSID, the value of the current SSID present field is used to indicate that the current SSID field is not comprised in the current SSID element, an SSID element in the second frame carries the current SSID, and a transmitter address of the second frame is the current BSSID; or in a case in which an SSID in the second probe request frame is an SSID previously used by the AP, the value of the current SSID present field is used to indicate that the current SSID field is comprised in the current SSID element, an SSID element in the second frame carries an SSID that is the same as the SSID in the second probe request frame, and a transmitter address of the second frame is the current BSSID.

14. The method according to claim 13, wherein the autonomously updating, by an AP, an SSID and a BSSID of the AP comprises:

when the AP updates the current SSID and the current BSSID, generating, by the AP, a new SSID according to a newly generated random number and first secret information, and generating, by the AP, a new BSSID;

wherein the method further comprises:

transmitting, by the AP, a first frame to a STA, wherein an SSID element in the first frame comprises an SSID field and a random number field, the SSID field carries the current SSID, the random number field carries a random number corresponding to the current SSID, and a transmitter address of the first frame is the current BSSID.

15. The method according to claim 14, wherein a capability information element in the first frame comprises a first bit, and a value of the first bit is used to indicate that the AP supports an SSID privacy enhancement function;

wherein the first bit is a reserved bit in the capability information element of the first frame;

and wherein the first frame is a beacon frame or a probe response frame.

16. The method according to claim 15, wherein in a case in which the first frame is a probe response frame and before the first frame is transmitted, the method further comprises:

receiving, by the AP, a first probe request frame transmitted by the STA, wherein the first frame is a response frame of the first probe request frame, and an SSID in the first probe request frame is the current SSID, or the SSID in the first probe request frame is an SSID used when the STA accessed the AP.

* * * * *